United States Patent
Papile

(10) Patent No.: US 8,549,857 B2
(45) Date of Patent: Oct. 8, 2013

(54) METHODS AND/OR SYSTEMS FOR MAGNETOBARIC ASSISTED GENERATION OF POWER FROM LOW TEMPERATURE HEAT

(76) Inventor: Christopher J. Papile, Boston, MA (US)

(*) Notice: Subject to any disclaimer, the term of this patent is extended or adjusted under 35 U.S.C. 154(b) by 979 days.

(21) Appl. No.: 12/519,325

(22) PCT Filed: Dec. 14, 2007

(86) PCT No.: PCT/US2007/087683
§ 371 (c)(1),
(2), (4) Date: Dec. 2, 2009

(87) PCT Pub. No.: WO2008/076947
PCT Pub. Date: Jun. 26, 2008

(65) Prior Publication Data
US 2010/0077752 A1    Apr. 1, 2010

Related U.S. Application Data

(60) Provisional application No. 60/875,121, filed on Dec. 16, 2006, provisional application No. 60/918,787, filed on Mar. 19, 2007, provisional application No. 60/927,597, filed on May 4, 2007, provisional application No. 60/966,357, filed on Aug. 27, 2007.

(51) Int. Cl.
| | |
|---|---|
| F03G 7/00 | (2006.01) |
| F03G 6/00 | (2006.01) |
| B60K 16/00 | (2006.01) |
| B60L 8/00 | (2006.01) |
| B03C 1/00 | (2006.01) |
| B01D 59/26 | (2006.01) |

(52) U.S. Cl.
USPC ............ 60/641.2; 60/641.8; 60/645; 95/28; 95/90; 95/148

(58) Field of Classification Search
USPC .......... 60/641.1, 641.2, 641.5, 641.8, 641.15, 60/645; 95/90, 115, 148; 96/108, 143
See application file for complete search history.

(56) References Cited

U.S. PATENT DOCUMENTS

| | | | | |
|---|---|---|---|---|
| 1,575,587 | A * | 3/1926 | Haynes | 62/617 |
| 5,925,168 | A * | 7/1999 | Judkins et al. | 95/27 |
| 2002/0066368 | A1* | 6/2002 | Zornes | 96/1 |
| 2007/0089449 | A1* | 4/2007 | Gurin | 62/324.2 |

* cited by examiner

*Primary Examiner* — Kenneth Bomberg
*Assistant Examiner* — Jason Sheppard
(74) *Attorney, Agent, or Firm* — Lambert & Associates; Gary E. Lambert; David J. Connaughton, Jr.

(57) ABSTRACT

Methods and/or systems using magnetically assisted pressurization of a gas for the generation of useful power from heat transfer using heat sources at lower temperatures in a manner that does not require the emission of $CO_2$.

11 Claims, 15 Drawing Sheets

US 8,549,857 B2

METHODS AND/OR SYSTEMS FOR MAGNETOBARIC ASSISTED GENERATION OF POWER FROM LOW TEMPERATURE HEAT

RELATED APPLICATIONS

The subject application is a U.S. National Stage application that claims the priority of International Application No. PCT/US2007/087683, filed on 14 Dec. 2007, which also claims the benefit of U.S. Provisional Ser. Nos.: 60/875,121, filed 16 Dec. 2007; 60/918,787, filed 19 Mar. 2007; 60/927,597, filed 4 May 2007; and 60/966,357, filed 27 Aug. 2007.

BACKGROUND

1. Field

The subject matter disclosed herein relates to the generation of power and/or the removal of carbon dioxide from the atmosphere.

2. Information

Carbon dioxide ($CO_2$) has been implicated in creating a warming blanket over the Earth counteracting global dimming gases and creating an overall warming trend in our climate. The warming trend threatens human life on Earth, as we know it. Recycling consciousness came historically much after hydrocarbon combustive power. Whether carbon dioxide is considered a pollutant or not, recycling as a principle needs to be employed to all of our activities on the Earth, in order to create sustainable practices. Recycling and sustainability go hand-in-hand and is the way that nature functions; for example, some life forms breath oxygen and exhaust carbon dioxide, and as a counter balance some life forms do the opposite.

In the last 150 years, over a billion carbon dioxide generating power devices in automobiles, stationary power plants and portable power generators have been manufactured around the World. The guiding principles of these engines have remained within the same realm of thought since Carnot's work in the 1820's. Traditional carbon dioxide generating power devices typically impinge heat, noise, $CO_2$, NOx, SOx on surroundings, and relate fuel asymmetrically to exhaust, since fossil fuels are from ground, whereas exhaust is put in air.

A basic chemical reaction for generating power and carbon dioxide may be expressed as follows:

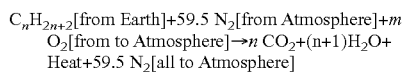

$C_nH_{2n+2}$[from Earth]+59.5 $N_2$[from Atmosphere]+$m$ $O_2$[from to Atmosphere]→$n$ $CO_2$+(n+1)$H_2O$+ Heat+59.5 $N_2$[all to Atmosphere]

In early 2007, Justice Stevens of the US Supreme Court said: "greenhouse gases fit well within the Clean Air Act's capacious definition of air pollutant." The EPA itself "does not dispute the existence of a causal connection between man-made gas emissions and Global Warming." Stevens said that Massachusetts, one of the 12 state plaintiffs, had made a case that Global Warming was raising the sea level along its coast, presenting Massachusetts with a "risk of catastrophic harm" that "would be reduced to some extent" if the government undertook the regulation the state sought.

Assessment of the impact of $CO_2$ on Global Warming has changed in 2007, and it can be anticipated that $CO_2$ emissions from vehicles, power plants and other engines will be regulated in the near future in the USA and other countries. Studies have also shown that merely keeping Green House Gas (GHG) concentration in the atmosphere stable is not sufficient to ward off temperature increases around the Globe. Such increases have already started at the poles of the Earth.

BRIEF DESCRIPTION OF THE FIGURES

Non-limiting and non-exhaustive features will be described with reference to the following figures, wherein like reference numerals refer to like parts throughout the various figures.

DETAILED DESCRIPTION

Figure 1:
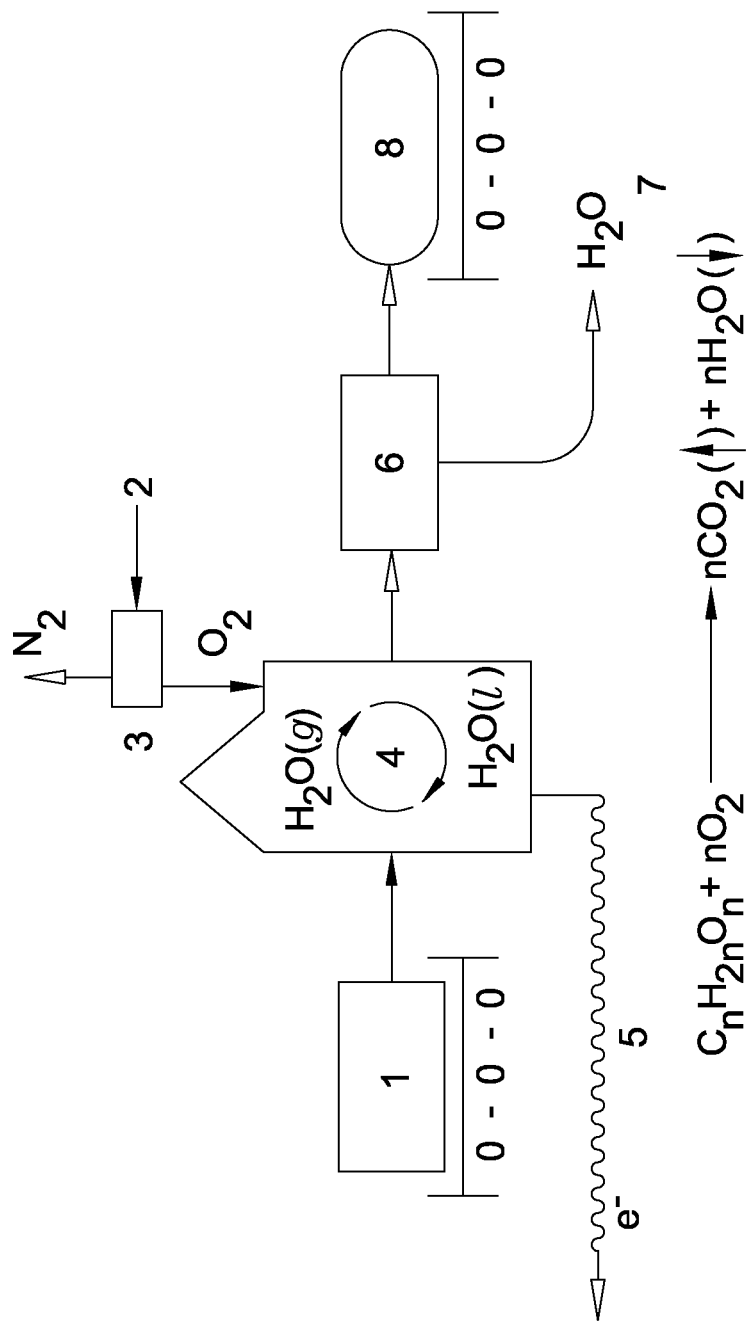
FIG. 1 is a schematic diagram of a system for converting biomass to power and collection of carbon dioxide according to an embodiment.

Reference throughout this specification to "one embodiment", "one implementation", "an embodiment" or "an implementation" means that a particular feature, structure, or characteristic described in connection with the embodiment and/or implementation may be included in at least one implementation and/or embodiment of claimed subject matter. Thus, the appearances of the phrase "in one embodiment", "an embodiment", "in one implementation" or "a feature" in various places throughout this specification are not necessarily all referring to the same embodiment and/or implementation. Furthermore, the particular features, structures, or characteristics may be combined in one or more implementations and/or embodiments.

Traditional means for generating power from fossil fuels have typically resulted in the emission of $CO_2$ into the atmosphere, contributing to the aforementioned problem of Global Warming. To address the problem at the source of Global Warming, embodiments illustrated herein relate to generation of power using methods that do not result in the emission of $CO_2$ into the atmosphere and/or remove $CO_2$ from the atmosphere.

In one particular embodiment, for example, usable power may be generated from a process that includes the disposal of bulk $CO_2$. Such bulk $CO_2$ may be produced, for example, from processes such as industrial energy production such as the conversion of biomass to usable energy. In the particular case of disposal of $CO_2$ waste from processing of biomass for energy production, an end to end process including cultivation of plant matter for biomass energy production to generation of power from disposal of resulting $CO_2$ waste may be viewed as a process to extract $CO_2$ from the atmosphere while generating power.

In another embodiment, usable power may be generated using magnetically assisted pressurization of a gas in a pressure worthy vessel. As illustrated below according to particular implementations, such magnetically assisted pressurization of a gas may decouple such a process of pressurization from temperature. This may assist, for example, in the generation of power from heat transfer using heat sources (e.g., geothermal heat sources) at lower temperatures in a manner that does not require the emission of $CO_2$.

In another embodiment, usable power may be generated from hydrocarbon deposits in an underground hydrocarbon reservoir using a process that captures resulting $CO_2$ in the hydrocarbon reservoir. Accordingly, this technique may enable the exploitation of hydrocarbon reserves for production of usable energy without the harmful effects of $CO_2$ emissions.

In another embodiment, usable power may be generated from combustion of a fuel in a heat to power process. Carbon dioxide generated as a byproduct of combustion may be further exothermically reacted to apply to additional heat for increasing power generated from the heat to power process. In one particular implementation, the carbon dioxide byproduct may be captured in solid form for disposal. In this particular implementation, accordingly, such $CO_2$ generated from combustion may be prevented from escaping into the atmosphere.

Some embodiments relate to a process of sequestering $CO_2$ such that $CO_2$ is maintained in a state an/or form that prevents the $CO_2$ from being emitted into the Earth's atmosphere to potentially contribute to Global Warming. Such a sequestered state may include, for example, maintaining $CO_2$ as a liquid and/or pressurized fluid in tanks or underground, as a solid as in compounds such as salts and/or the like. However, these are merely examples of states in which $CO_2$ may be sequestered and claimed subject matter is not limited in this respect.

In a particular embodiment, prior to sequestration $CO_2$, may be captured in a process that enables sequestration of the $CO_2$. In one particular example, such $CO_2$ capture may comprise removal of $CO_2$ from the Earth's atmosphere through life process such as photosynthesis, removal of $CO_2$ in processing biomass for fuel and processing byproducts of combustion of carbon based fuels to prevent $CO_2$ gas from entering the atmosphere. However, these are merely examples of how $CO_2$ may captured according to particular embodiments and claimed subject matter is not limited in this respect.

Deriving Power from Disposal of Carbon Dioxide in Depleted Hydrocarbon Reservoir According to an embodiment, although claimed subject matter is not limited in this respect, a fluid comprising substantially pressurized $CO_2$, such as liquid $CO_2$ for example, may be injected in a wellbore coupled to a depleted hydrocarbon reservoir. In response to geothermal heat in the wellbore, the liquid may be expanded to a pressurized gas, which may in turn be used to generate an electric current. However, this is merely an example embodiment and claimed subject matter is not limited in this respect.

In the presently illustrated embodiment, a fluid comprising substantially liquid $CO_2$ may be provided from any one of several bulk processes such as, for example, processing biomass for the production of energy, pooling of industrial waste $CO_2$ from coal power generation, just to name a few examples. Such substantially liquid $CO_2$ may be stored and/or transported in containers pressurized to about 73.0 atm. and temperatures below 304.2 K, for example. in mixtures with minority component $H_2O$, $NO_2$ and/or $SO_x$, a temperature for the $CO_2$ liquid mixture can be greater than 304.2 K.

FIG. 1 is a schematic diagram of a system for converting biomass to power and collection of carbon dioxide according to an embodiment. Here, biomass 1 transported to a biomass processing plant may comprise monosaccharide and/or carbohydrate and/or lignin which is derived from recently grown vegetation, which has recently fixed $CO_2$ from the atmosphere in the form of plant life body by the life plant growing process. As shown, byproducts from this process may include $CO_2$ 8, water and trace amounts of $NO_2$, $SO_2$ and $SO_3$. Here, using life process materials, such as plant life or animal waste, enables removing $CO_2$ from the atmosphere using a power positive process. Following a compression and cooling process, liquid waste $CO_2$ with trace amounts of other compounds may be transported away from processing plant 4 for disposal.

In one particular embodiment, substantially liquid waste $CO_2$ may be captured and disposed in a manner that also generates power as illustrated below with reference to FIGS. 2 through 5B. It should be understood, however that the processes illustrated herein for disposing of $CO_2$ while generating power may be applied to disposal of $CO_2$ in which was manufactured in other processes and claimed subject matter is not limited in this respect.

Figure 2:
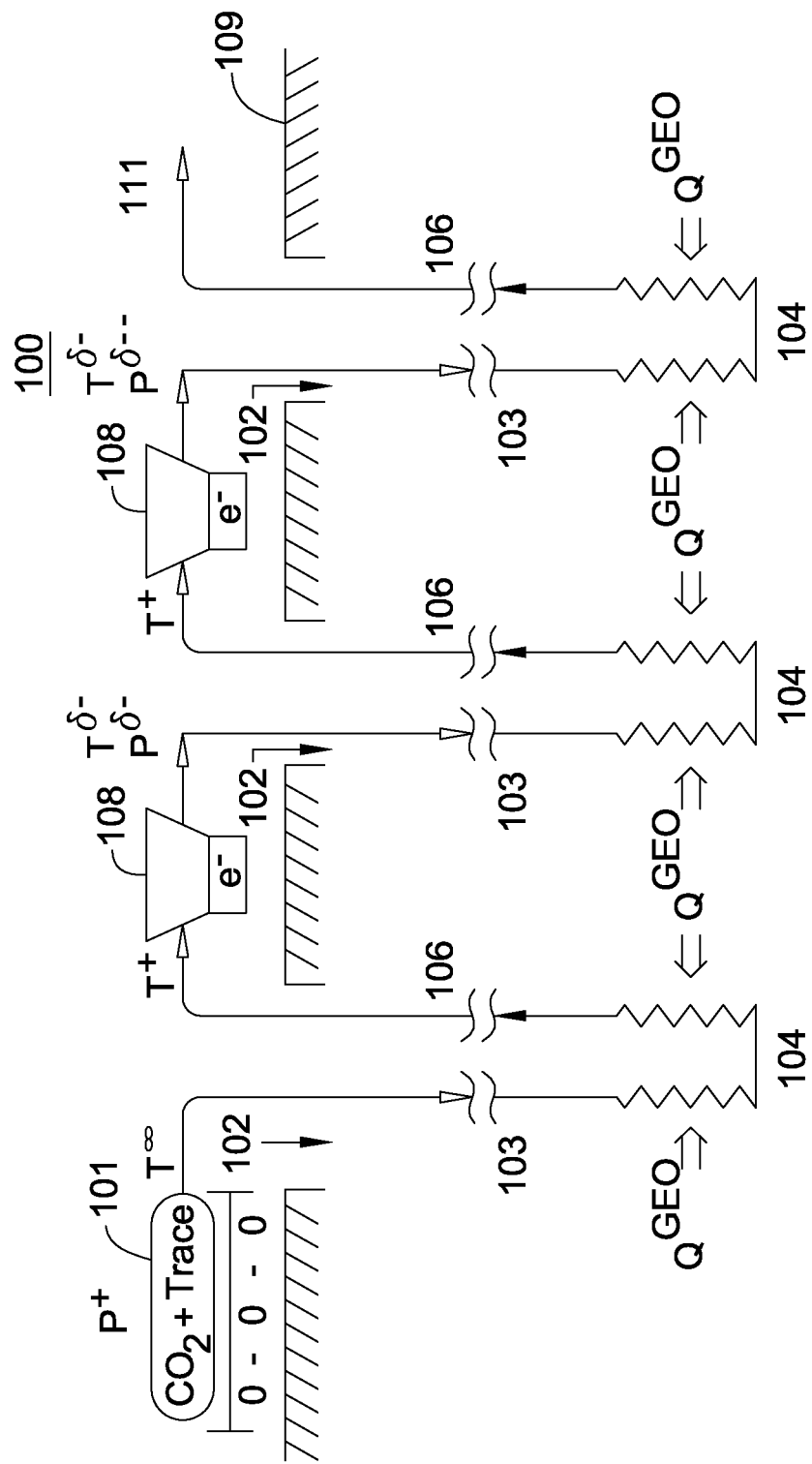
FIGS. 2 and 3 are schematic diagrams of a system for sequestering carbon dioxide while generating power according to an embodiment.
Figure 3:
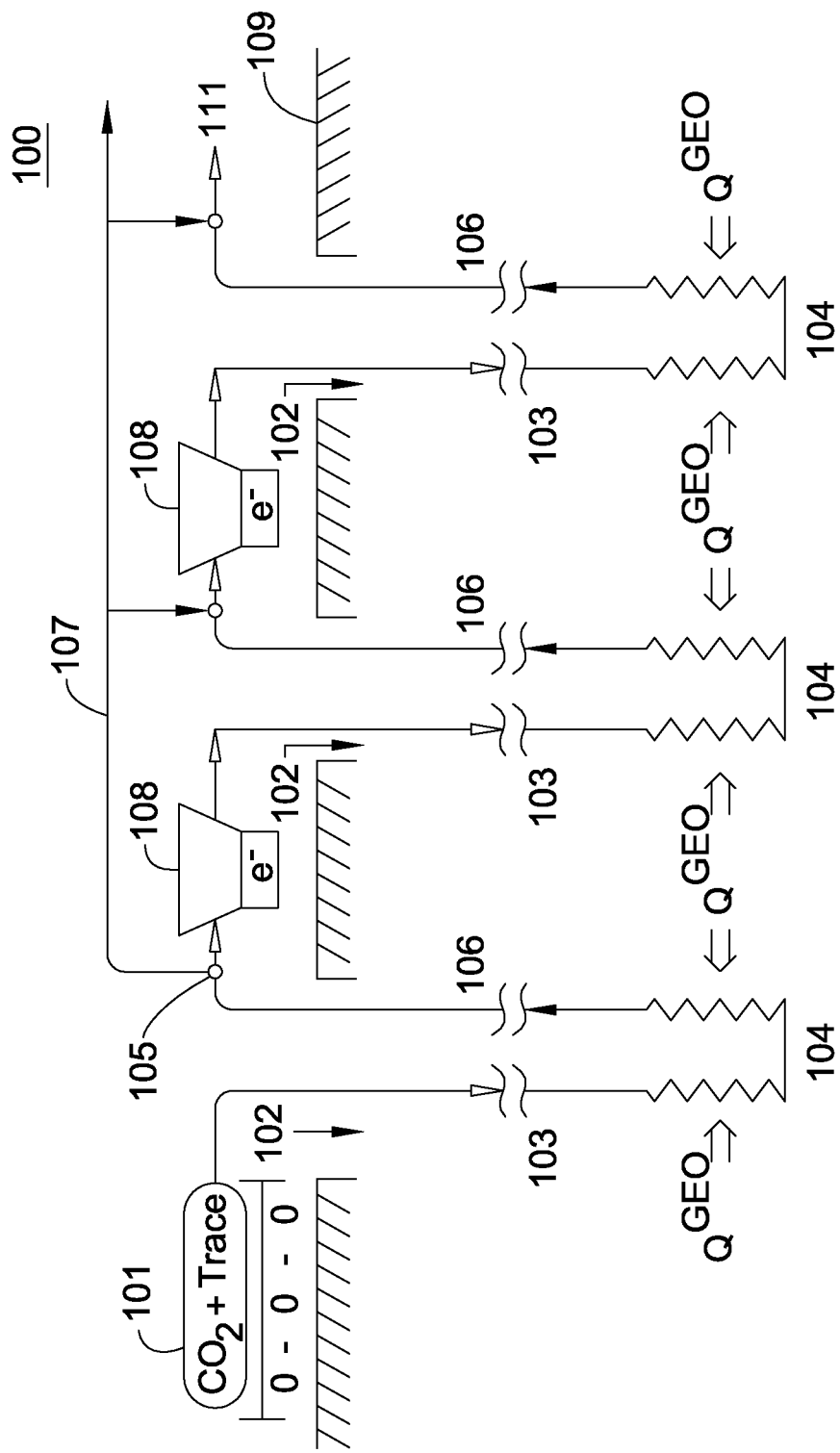

System 100 in FIGS. 2 and 3 comprises a plurality of wellbores 102 that may have been drilled for the purpose of extracting a hydrocarbon deposit such as, for example crude oil and/or natural gas. In each wellbore 102 is formed and/or placed a heat transmitting surface such as downhole exchangers (DHEs) 104 that permit geothermal heat $Q^{GEO}$ to heat $CO_2$ fluid as it is directed downward in an associated pipe 103. As the $CO_2$ fluid is heated from heat $Q^{GEO}$, the pressurized fluid continues through an associated pipe 106 for driving an associated gas turbine 108 to generate electricity.

Beginning in substantially liquid form in pressurized tank 101, a fluid comprising pressurized $CO_2$ (e.g., also including trace compounds such as) is released into a first wellbore 102 at a pressure $P^{3o}$ and temperature ambient $T^\infty$. As the $CO_2$ fluid receives heat $Q^{GEO}$ at DHEs 104 and continues through pipe 106, the fluid temperature is raised to $T^+$. After passing through a turbine 108 above ground 109, the fluid pressure and temperature drop to $P^{\delta-}$ and $T^{\delta-}$, respectively. At a final wellbore (not shown), the $CO_2$ may be deposited in a depleted and pressure worthy hydrocarbon reservoir, where it remains out of the atmosphere. As $CO_2$ fills the depleted and pressure worthy reservoir, pressure in the reservoir may increase. As the pressure increases during sequestration, the number of gas turbines that can be used may be decreased. As shown in FIG. 3, bypass valve 105 can be used to remove a successive gas turbine from process flow through bypass 107.

Figure 4:
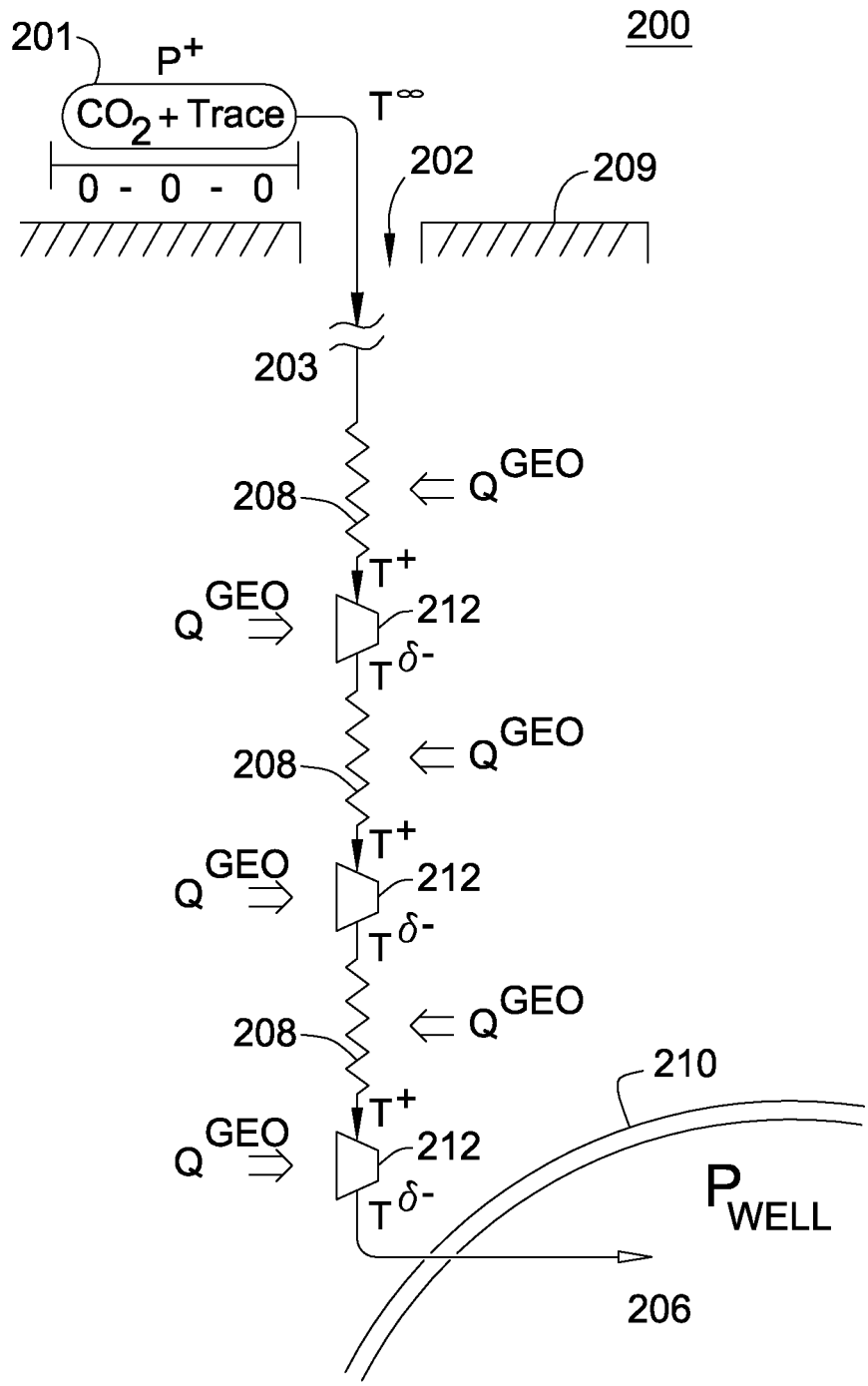
FIGS. 4 and 5A are schematic diagrams of a system for sequestering carbon dioxide while generating power according to an alternative embodiment.
Figure 5A:
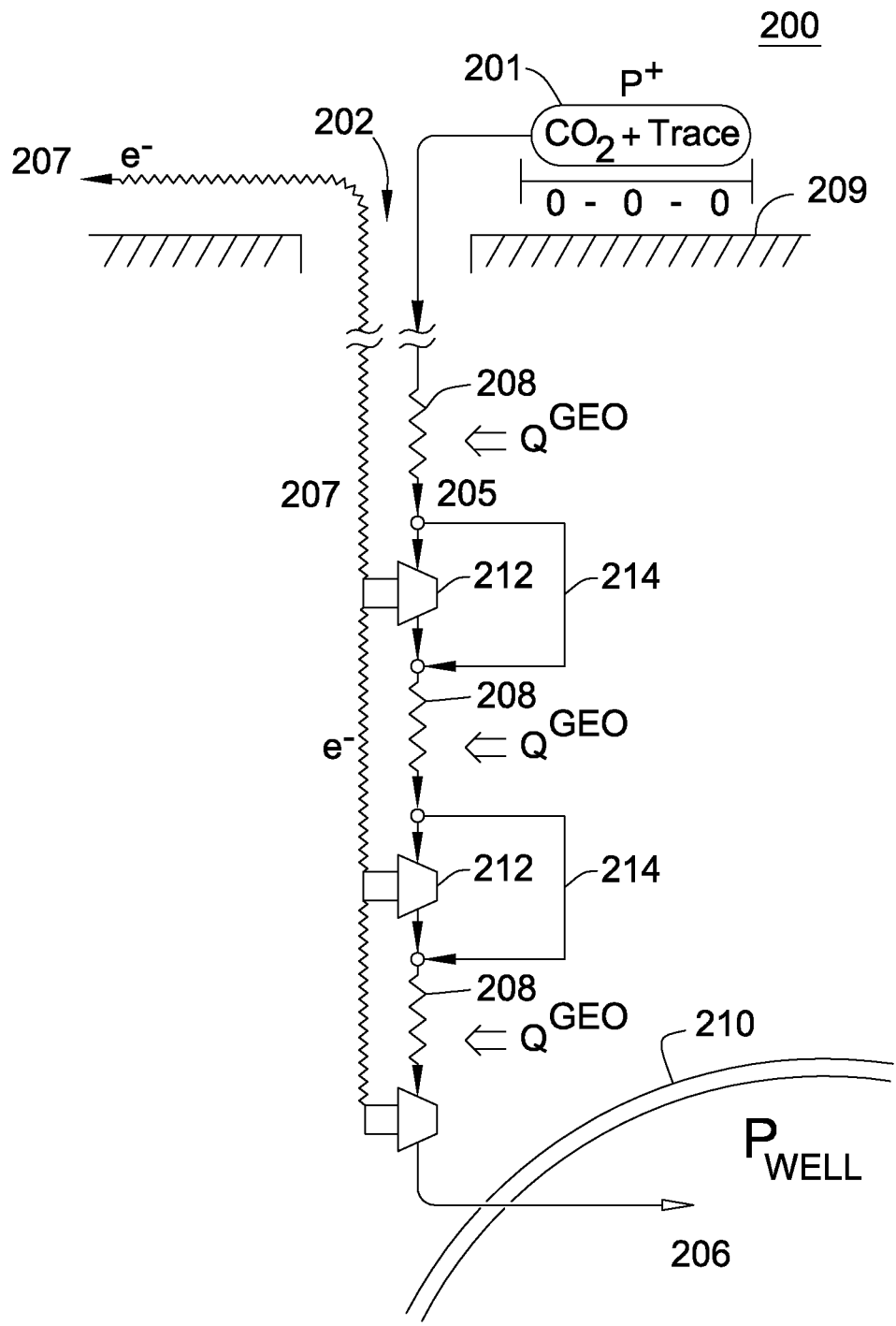

In an alternative implementation as shown in FIGS. 4 and 5A, a series of gas turbines 212 may be placed below ground in a single wellbore 202. Pressurized $CO_2$ is directed from pressurized tank 201 at pressure $P^+$, and through a series of DHEs 208 to receive geothermal heat $Q^{GEO}$ and raise to temperature $T^+$. At the intake of each gas turbine 212, fluid now at temperature $T^+$ passes through the gas turbine 212, which generates power and cools the $CO_2$ fluid to a temperature $T^{\delta-}$. Accordingly, as illustrated in the presently illustrated embodiment, each gas turbine 212 is paired with a successive DHE 208 so as to capture geothermal heat prior to a successive gas expansion. Following a final gas turbine 212, $CO_2$ may be directed to a pressure worthy cavity 206 through non-porous rock 210 for permanent storage. Here, pressure worthy cavity 206 may comprise, for example, a depleted hydrocarbon reservoir (e.g., depleted of crude and/or natural gas deposits) can withstand containment of a pressurized fluid. As shown in FIG. 5A, a cable 207 for an electrical current generated by gas turbines 212 may transmit electricity to the top of wellbore 202. As $CO_2$ is added to pressure-worthy underground cavity 206, the pressure in cavity 206 may increase with filling. Gas turbines 212 may be one after another bypassed using associated bypass pipes 214 to reflect a matching of the outlet pressure of the last gas turbine (e.g., closest to cavity 206) with the pressure of cavity 206.

As illustrated above according to particular embodiments, pressurized $CO_2$ and can be used as a geothermal gas turbine working fluid upon adding enthalpy from a geothermal source. Since $CO_2$ condenses at below room temperature, even a low-temperature well may provide an effective geothermal heat source. For example, it is possible for $CO_2$ gas to expand and drop in temperature below room temperature, but still be a gas, which can adsorb heat from a room temperature source. Wellbores of mature oil wells are typically above room temperature, and often >140 C.

An ideal power obtained either by isothermal turbines or turbines with intermittent alternating heat exchangers can be approximated by an infinite series of gas turbine heat exchanger combinations. In one stage, after a partial expansion of a pressurized $CO_2$ source, a heat exchange takes place between geothermal heat of the well and the expanded $CO_2$. A long length of a drilled wellbore may allow for ample area for geothermal heat exchange.

Heat exchange between the geothermal source and the intermittent heat exchanger can be facilitated by contact material such as, for example, liquid metals, Woods Metal, and/or metals including combinations of Bismuth, Lead, Tin, and Indium or other suitable heat exchange material capable of transmitting wellbore geothermal heat to walls of intermittent heat exchangers.

The number of n stages of polytropic turbine and heat exchangers to approach maximum power may be derived starting from infinitesimal stages of expansion and heat exchange summed to infinity. Starting with power law relationships between pressure and volume during various types of expansion, a number of stages to obtain power may be determined as follows:

$$p_+ V_+^\alpha = p_- V_-^\alpha = pV^\alpha = \text{const.}$$

$\alpha = 1$ for isothermal $$dU = dQ - dW$$

Define W+ for work done by the system and W− for work done to the system. Heat, dQ is not immediately set to zero, since this is the generalized case, and heat can enter or leave the system. Pressure and volume, as contained in density $\rho$ may be coupled by the ideal gas law.

$$W - \int_{p_+}^{p_-} d\left(\frac{P}{\rho}\right)$$

Where p+ is a high pressure in an expansion process and p− is a low pressure of the expansion, and p is a generalized pressure term. The minus sign arises from inverting the integral from high pressure to low pressure. Where $\rho$ is generalized density that is paired with a given pressure, p, and $\alpha$ is the polytropic power function of p to $\rho$.

$$1 \leq \alpha \leq \gamma$$

isothermal ≤ polytropic ≤ adiabatic $$\frac{p}{\rho^\alpha} = \frac{p_+}{\rho_+^\alpha}$$

$$\rho = \frac{\rho_+}{p_+^{\frac{1}{\alpha}}} p^{\frac{1}{\alpha}} = \rho_+ \left(\frac{p}{p_+}\right)^{\frac{1}{\alpha}}$$

$$\rho_+ = \frac{p_+}{RT_+}$$

Normalize pressure variable, p, to pressure ratio $$\left(\frac{P}{P_+}\right)$$

$$dp = p_+ d\frac{p}{p_+}$$

$$W = -\int_{p_+}^{p_-} \frac{dP}{\rho_+} = -\left(\frac{p_+}{\frac{p_+}{RT_+}}\right) \int_1^{\frac{p_-}{p_+}} \frac{d\frac{p}{p_+}}{\left(\frac{p}{p_+}\right)^{\frac{1}{\alpha}}} = -RT_+ \int_1^{\frac{p_-}{p_+}} \frac{d\frac{p}{p_+}}{\left(\frac{p}{p_+}\right)^{\frac{1}{\alpha}}}$$

We have defined work going out of the system as positive, W(+); and arrive at the polytropic power equation.

$$W = \frac{\alpha RT_+}{(\alpha-1)}\left[1 - \left(\frac{p_-}{p_+}\right)^{\frac{\alpha-1}{\alpha}}\right]$$

As $\alpha$ goes to 1, the work equation seemingly goes to infinity times zero, but it can be shown that the above equation goes to the isothermal, maximum power case.

(isothermal case, $\alpha \to 1$)

$$\lim_{\alpha \to 1} W = \frac{\alpha RT_+}{(\alpha-1)}\left[1 - \left(\frac{p_-}{p_+}\right)^{\frac{\alpha-1}{\alpha}}\right]$$

$$W_{total} = \frac{Z^1 \alpha RT_+}{Z^0 (\alpha-1)}\left[1 - \left(\frac{p_-}{p_+}\right)^{Z^0 \frac{\alpha-1}{\alpha}}\right] \to \infty 0$$

L'Hospital's Rule $$\frac{RTd\left[1 - \left(\frac{p_-}{p_+}\right)^{\frac{\alpha-1}{\alpha}}\right]}{d\left(\frac{\alpha-1}{\alpha}\right)} = \frac{RTd\left[1 - \left(\frac{p_-}{p_+}\right)^u\right]}{d\left(\frac{\alpha-1}{\alpha}\right)}$$

$$\frac{df}{du}\frac{du}{d\alpha} = \frac{df}{d\alpha}$$

-continued $$u = 1 - \frac{1}{\alpha}$$

$$\frac{du}{d\alpha} = \alpha^{-2}$$

$$\lim_{\delta\alpha \to 1} \frac{RT\alpha^{-2}\left(\frac{p_-}{p_+}\right)^{1-\frac{1}{\alpha}} \ln\left(\frac{p_-}{p_+}\right)}{-\alpha^{-2}} = -RT(1)\ln\left(\frac{p_-}{p_+}\right)$$

$$p_+ > p_-; W(+)$$

$$\lim_{\alpha \to 1} W = W = RT \ln \frac{p_+}{p_-}$$

The approach to isothermal can be accomplished practically by a series of polytropic expansions followed by heat exchange. The number of n stages needed to approach the maximum obtainable power, the isothermal geothermal power, can be estimated by a similar procedure to the above, as follows.

Normalize p ratio, and let the expander/heat exchanger be n stages in series.

$$\left(\frac{p_+}{p_-}\right)_{total} = \frac{p_{\delta_1+}}{p_-} \frac{p_{\delta_2+}}{p_{\delta_1+}} \cdots \frac{p_+}{p_{\delta_{n-1}+}}$$

$$\left(\frac{p_+}{p_-}\right)_{total}^{\frac{1}{n}} = \frac{p_+}{p_{\delta_{n-1}+}}$$

$$W = \frac{\alpha RT_+ n}{(\alpha - 1)}\left[((1)^{\frac{1}{n}})^{\frac{\alpha-1}{\alpha n}} - \left(\left(\frac{p_-}{p_+}\right)^{\frac{1}{n}}\right)^{\frac{\alpha-1}{\alpha}}\right]$$

$$W_{total} = \frac{n\alpha RT_+}{(\alpha - 1)}\left[1 - \left(\frac{p_-}{p_+}\right)^{\frac{\alpha-1}{\alpha n}}\right]$$

Practically, the higher the pressure ratio, the more n stages are needed to maximize the work obtained.

$$W_{total} = \lim_{\delta n \to \infty} W_{n \, stages} \to \infty 0$$

L'Hospital's Rule $$\frac{-\frac{\alpha RT_+}{(\alpha-1)} d\left[1 - \left(\frac{p_-}{p_+}\right)^{\frac{\alpha-1}{\alpha n}}\right]}{d\frac{1}{n}}$$

$$\frac{du}{dn} = -\frac{\alpha-1}{\alpha} n^{-2}$$

$$u - \frac{\alpha-1}{\alpha n}$$

$$\lim_{\delta n \to \infty} W = \frac{(-) - \frac{\alpha RT_+}{(\alpha-1)} \frac{\alpha-1}{\alpha} n^{-2} \left(\frac{p_-}{p_+}\right)^{\frac{\alpha-1}{\alpha n}} \ln \frac{p_-}{p_+}}{-n^{-2}}$$

$$\lim_{\delta n \to \infty} W_{n \, stages} = \lim_{\delta n \to \infty} \frac{n\alpha RT_+}{(\alpha-1)}\left[1 - \left(\frac{p_-}{p_+}\right)^{\frac{\alpha-1}{\alpha n}}\right] = -RT \ln \frac{p_-}{p_+}$$

$$p_+ = P_H > p_- = P_L; W(+)$$

$$Power = W^* = F_{CO_2}^*(R)T_{Well} \ln \frac{P_H}{P_L}$$

Where $F_{CO_2}^*$ is the molar flow rate of sequestered $CO_2$ flowing downhole through turbines, R is the ideal gas constant, $T_{well}$ the temperature of the well, $P_H$ is the high pressure, and $P_L$ is the low pressure outlet. The critical pressure of $CO_2$ is 72.9 atm, however, if small amounts of $H_2O$ are added the cricondenbar pressure of the mixture may be altered. Using 70 atm and a $CO_2$ polytropic constant of 1.3, the number of n turbine/heat exchange stages can be estimated as follows:

$$n\left[1 - \left(\frac{1}{70}\right)^{\frac{0.3}{1.3}}\right] = -\frac{0.3}{1.3} \ln \frac{1}{70}$$

$n \to 5$ stages 10% error $n \to 40$ stages 1% error

In 2006, drilling costs in dollars to transverse 12,500 feet was approximately two million; and the 5 to 40 stages would need to be of length that fit within the bottom hot zone of the 12,500 feet in accordance with the embodiment show in FIGS. 4 and 5A, for example. The long length of a wellbore may provide ample heat exchange contact area. As a well fills with $CO_2$ the low-pressure outlet may approach the high-pressure source, therefore, fewer and fewer stages may be needed. In an expression for maximum obtainable power, $W_{max}^*$, an outlet low pressure $P_L$ may be variable and may approach $P_H$. A functional relationship of $P_L$ to other sequestration variables may be as follows:

$$P_L = f\left(\frac{\tau_{fill} F_{CO_2}^*}{V_{well}}\right)$$

$P_L$ is a function of the flow rate of $CO_2$, fill time, $\tau$, and the volume of the geological cavity, $V_{well}$. The process may employ a bypass of stages as $P_L$ increases, until finally all stages are bypassed, removed from the wellbore, and the wellbore is sealed to withstand pressure.

Diameters of oil well boreholes at the top can start at 30 inches and at the bottom can be as narrow as <11 inches. There may be space, or space can be made, to embed a series of gas turbines, with intermittent heat exchangers. Geothermal wells are often larger in diameter than oil wells. In one embodiment, neither heat exchanger nor gas turbine is required to be underground. If a heat exchanger is above ground, another fluid, such as hot water may be brought up from the underground well and used to heat the $CO_2$ above ground. In another embodiment, heat exchange can be underground while gas turbines can remain above ground.

Micro-turbines, defined as dimensions on the order of a cm or mm, move gases within the turbine at very high Reynold's Numbers [Proceedings of ASME Turbo Expo 2003 Power for Land, Sea, and Air Jun. 16-19, 2003, Alan H. Epstein, et. al and Science 23 May 1997: Vol. 276. no. 5316, p. 1211]. High Reynold's Number flows enhance heat transfer properties and allow for through wall heat exchange between the turbine and the external heat source.

Results above show that thermodynamic characteristics of $CO_2$ invite a practical configuration of six 2x expansions ($2^6 < 70$ atm) to make power, with five heat exchanges.

As the pressure in the depleted hydrocarbon cavity increases, sequentially an expander/heat exchange pair will be by-passed, until the underground pressure in the cavity is similar to the starting $CO_2$ pressure; at that time the boreholes may be sealed for pressure resistance.

In embodiments described herein, electric power may be made as $CO_2$ is sequestered. Since vegetation obtained the $CO_2$ from the atmosphere, and that $CO_2$ may be placed underground, an overall process may remove $CO_2$ from the atmosphere, counteracting Global Warming. Processes described above with reference to FIGS. 1 through 5A may generate power, while removing $CO_2$, therefore termed Power-Positive, $CO_2$-Negative. An overall power may be limited by the steady increase of $P_L$.

This process operates whether the well was originally sulfur sour or sweet. Underground fossil fuel impurities are not an issue if using turbines to generate power while sequestering $CO_2$ into depleted oil and gas cavities. The critical temperature of $CO_2$ is 31 C, but it small amounts of $H_2O$ are added, the cricondentherm temperature of the mixture is >31 C. In $CO_2$ water mixtures may be maintained underground in a liquid form, if the well temperature is relatively low In one embodiment, a process may use wells that are pressure and substantially hydrocarbon depleted; therefore, a secondary financial benefit from the investment in drilling can be obtained by the $CO_2$ power with sequestration process. The price of the power generated by the $CO_2$ geothermal power with sequestration may be less than zero, if carbon trading value is assigned to the $CO_2$ sequestered.

Figure 5B:
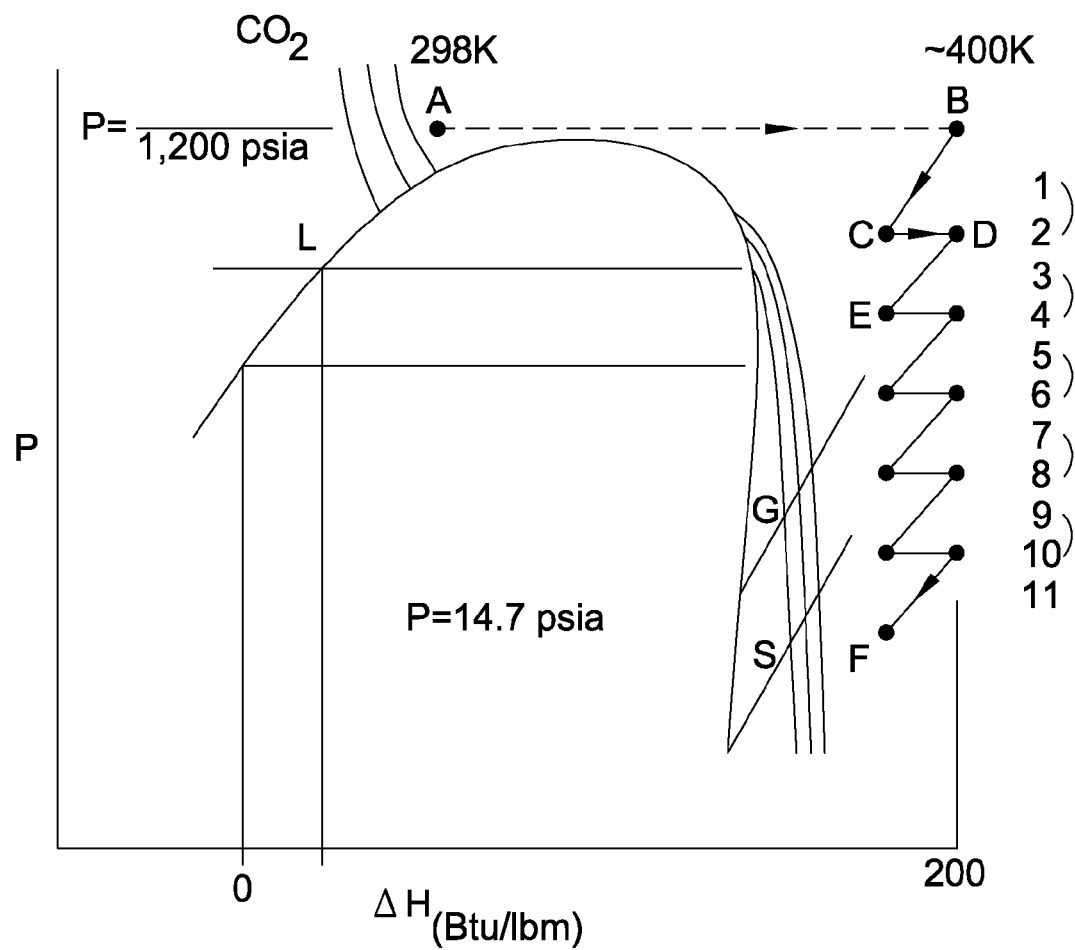
FIG. 5B is an enthalpy pressure diagram illustrating behavior of carbon dioxide according to an embodiment.

FIG. 5B is a pressure enthalpy diagram illustrating behavior of $CO_2$ fluid according to particular embodiments illustrated above with reference to FIGS. 2 through 5A. In one example, point A, high-pressure $CO_2$ liquid (e.g., at 1200 psia) may be initially allowed to flow from a pressurized tank. Following an initial heat exchange from a geothermal source at 400 K (e.g., from a DHE as illustrated above), the $CO_2$ fluid transitions to a new enthalpy and temperature at point B while maintaining pressure. Here, an x-axis represents enthalpy, which may be increased by a geothermal heat source, while a y-axis represents pressure, P. Region G below the critical pressure of $CO_2$ to the right of the phase envelope is a gaseous phase for $CO_2$. A region L represents a liquid phase for $CO_2$. Adiabatic expansion may take place along a constant entropy line, S. In this particular example, there are six expansion stages shown in this chart, each represented by an odd number from 1 to 11, falling in pressure. The direction of the arrows in the diagram between A and B and down from 1 to 11 indicates the direction of the process which is decreasing in pressure, until it reaches the pressure of the sequestration underground cavity at point F. Here, there are five heat exchanges, represented by even numbers between 1 and 11, which are horizontal lines, accepting geothermal heat, at constant pressure to increase the enthalpy.

Processes described above with reference to FIGS. 2 through 5B relate to the piping of fluid $CO_2$ in wellbores into heat exchangers below ground, and then using expansion of such $CO_2$ to drive one or more turbines that are either above ground or placed in a wellbore. In alternative embodiments, however, steam or hot water may be generated using a geothermal source to apply heat to fluid $CO_2$ in a heat exchanger that is positioned above ground. The expansion of $CO_2$ fluid may then be used to generate power through turbines positioned above ground.

Instead of transmitting electricity for use as a stationary power process, generated electricity could be converted to hydrogen by electrolysis onsite above ground; thus generating a transportation fuel, e.g., $H_2$.

Bulk $CO_2$ could in-principle be purchased from FutureGen power plants (USA program to make coal fired power with carbon capture) or the Australian version called ZeroGen. This $CO_2$ could have a negative price, considering the exchange of carbon emission credits. The process of coal mining on average emits one atom of carbon as methane for every 100 atoms of carbon in coal that end up as $CO_2$. Leaving this point aside, generally $CO_2$ purchased from FutureGen coal would be a $CO_2$ neutral fuel, if sequestered.

In some cases, if crude oil is still underground in a reservoir where $CO_2$ is deposited, the deposited $CO_2$ can be sparged and retained by solubility in the heavy crude. A $CO_2$ capturing biomass plant with geothermal $CO_2$ turbine sequestration power may make an overall process that removes up to one million metric tons a year of $CO_2$ in one MW power plant with $CO_2$ geothermal power. If existing drilled boreholes are used without widening, then the size of turbines and flow rate that can be accepted by one wellbore, may be less than the $CO_2$ output of a typical biomass power plant; therefore, more than one wellbore for $CO_2$ geothermal power may be used.

Although $CO_2$ could be converted to methanol, ethanol or formaldehyde before sequestration, in order to reduce the volatility of the sequestrate, each of these potential $CO_2$ forms can contaminate ground water, combust, and importantly may not afford a power generation by a gas turbine heat exchange alternating series, just described.

In particular embodiments, $CO_2$ geothermal power may be made more efficient than a water/steam geothermal, since water condenses at a much higher temperature than $CO_2$. Since $CO_2$ may condense at below room temperature, lower temperature wells can be used as geothermal sources, more shallow wells can be used as geothermal sources, and less thermal stress may be put on the geology by $CO_2$ geothermal power compared to a water/steam geothermal process.

Using direct underground power $CO_2$-sequestration, in a well of 150 C, at first approximately 15 $kJ/CO_2$ may be generated, and as the well filled this power would approach zero. The $CO_2$ removed from the atmosphere may be both the $CO_2$ avoided by not building a fossil fuel power plant and the $CO_2$ sequestered downhole that was derived from atmospheric $CO_2$ fixed in the body of the plant life.

Magnetobaric Assisted Power Generation

In one embodiment, a gas is adsorbed onto magnetically susceptible adsorbent as induced by the presence of a magnetic field. Upon removing the magnetic field, the adsorbed gas may be released into a pressure-worthy isothermal vessel, then directed over a heat source, and then directed to drive a gas turbine generator. As illustrated below, such magnetic adsorption and desorbtion enables a decoupling of temperature from pressure in a power generation process. In one particular implementation, for example, this may permit generating power from geothermal sources at lower temperatures. Here, use of a mechanical compressor in generating power from a low-temperature geothermal source may be enough.

Figure 6:
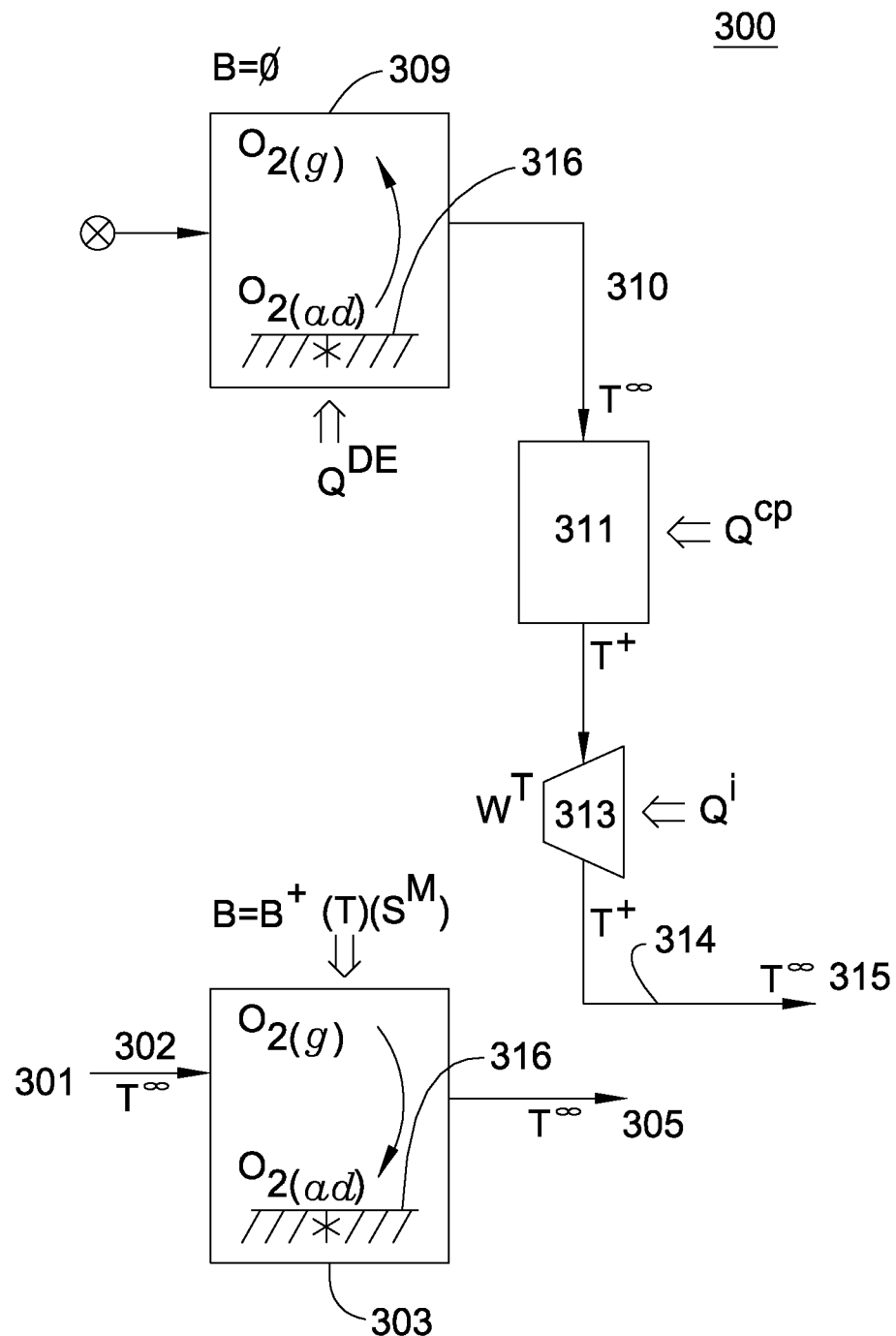
FIG. 6 is a schematic diagram of a system for magnetobaric assisted generation of power according to an embodiment.

Referring to FIG. 6, a pressure vessel 303 may contain a suitable magnctic adsorbent solid material, 316, suitable for binding with oxygen tein response to application of a magnetic field B=B+, with associated magnetic entropy, $S^M$, to adsorb, some oxygen $O_{2(ad)}$ from oxygen gas, $O_{2(g)}$, from air 301, which flows through tubing, 302, in this embodiment at temperature of the ambient, $T^\infty$. This may be accomplished at room temperature and nitrogen-rich air 305 may be permitted to escape.

According to an embodiment a magnetic absorbent material for adsorbing oxygen in vessel 303 may comprise any solid material suitable for binding with oxygen in response to a magnetic field such as, for example, magnetically susceptible adsorbent materials such as Ferri, Ferro, or Anti-Ferromagnetic Transition Metals, including:

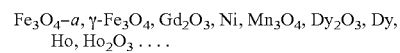

However, these are merely examples of a magnetic absorbent material and claimed subject matter is not limited in this respect.

Following adsorption of oxygen in vessel 303, vessel 303 may be closed off from surrounding air and placed in flow communication with heat exchanger 311 and gas expander 313. In one embodiment, vessel 303 may become vessel 309 when undergoing a desorption step. Alternatively, the material adsorbent/adsorbate pair may be moved from 303 to 309. Upon removal of a magnetic field, setting magnetic inductance to zero, B=0, adsorbed oxygen may be desorbed to pressurize isothermal pressure vessel 309, allowed to re-equilibrate to room temperature, then directed in tubing 310 into a heat exchanger 311, where it is heated to a higher temperature, $T^+$, and then directed to drive a turbine 313 for the generation of electrical current, for example. The temperature at 310 is indicated as $T^\infty$ in the embodiment of FIG. 6, since heat $Q^{DE}$ may be induced from ambient heat, but in an alternative embodiment, heat used for the desorption process can come from the heat generated in the adsorption process.

Following adsorption, adsorbent material is removed from the magnetic field, B=0. Oxygen may then be desorbed from the magnetically susceptible adsorbent in pressure vessel 309. Here, desorption may be caused by an entropic alteration of the activation energy of adsorption compared to desorption in which desorption is favored if the magnetic field is removed.

If oxygen is adiabatically desorbed, the gas may cool as it leaves the adsorbed state and fills pressure vessel 309. The process is analogous to known adiabatic demagnetization often found in ferromagnetic gadolinium solids with Curie temperatures near room temperature, for example. If oxygen is isothermally desorbed, the gas may have a tendency to cool as it leaves the adsorbed state and fills pressure vessel 309. Doing so, however, may create a heat flow from the surroundings to pressure vessel 309 (e.g. $Q^{DE}$. A process according to one embodiment may have alternating substantially similar adsorption beds. While 303 is loading oxygen a substantially similar bed 309 is unloading oxygen. Then the beds may be alternated; the newly loaded vessel 303 is then unloaded in position 309. Simply moving the vessel or adsorbent in and out of the magnetic field and opening and closing values to allow and disallow flow is utilized to alternate the adsorption and desorption beds. The process can be called "Magnetobaric", since pressure is raised in a vessel 309 is made possible by changing the magnetic field and cooling is induced.

Magnetically susceptible adsorber (*) in contact with air may take up $O_2$. Such $O_2$-adsorption may be enhanced by a magnetic field at some elevated magnetic inductance, B=B+. According to an embodiment, heat $Q^{DE}$ may be induced into the desorption process from ambient heat, for example. In one alternative, heat used for the desorption process can come from the heat generated in the adsorption process. In another alternative, heat used for the desorption process can come from the ambient and the heat generated in the adsorption process can be expelled to the surroundings. In yet another example, geothermal heat can be used to supply heat $Q^{DE}$.

Magnetically facilitated adsorption in the presently illustrated embodiments solid adsorbent material to undergo a temperature swing; therefore, saving the energy cost of adsorbent heat-up (used in temperature swing adsorption (TSA) processes) and allowing a wide range of room temperature stable transition metals. Vessel 303, used for adsorption may be exchanged for similar or identical vessel, designated vessel 309 after each bed loads up and discharges. Using magnetic adsorption/desorption requires no bed cooling, as is needed in TSA, therefore, the rate of cooling may not impact the process.

According to an embodiment, spin topology and magnetic exchange coupling magnitude of paramagnetic adsorbate and magnetically susceptible adsorbent may be quantified by partial molar magnetic moments. The equilibrium of adsorption/desorption is shifted in the same way that applying mechanical pressure can shift equilibrium. Ozeki, et, al [J. Phys. Chem. 1991, 95, 7805-7809 7805, Magnetoadsorption and Magnetodesorptlon of NO on Iron Oxides: Role of Magnetism and Surface Structures of Solids, Sumio Ozeki, Hiroyuki Ucbiyama, and Katsumi Kaneko] obtains for NO(g). ($\chi_m$=+ $1,461 \times 10^{-6}$ cm$^3$ mol$^{-1}$) clear desorption and adsorption magnetic enhancement using <1 Tesla fields on ferrimagnetic and anti-ferromagnetic iron oxides. The magnetic adsorption/desorption for NO(g) on ferrimagnetic and anti-ferromagnetic iron oxides has an upward trend with increased magnetic field strength.

Both NO(g) and $O_2$ have compressibility factors near unity at elevated pressures and sub-room temperature, which may be beneficial for operating ideal gas expansion processes near room temperature. This may not be possible with $H_2O$, nor $NO_2$.

As pointed out above, gas desorbed from pressure vessel 309 may be directed to a heat exchanger 311 for driving turbine 313. Here, heat $Q^{cp}$ applied to heat exchanger 313 may be provided from large steam condensers in fossil fuel steam cycle processes, at near 100 C, or from geothermal sources or from any heat source, such as magnified photons, otherwise known as concentrated solar energy using concave mirrors, to generate high temperature from sun light. Such a geothermal source of $Q^{cp}$ may allow for a process to produce power without $CO_2$ addition to the atmosphere.

Heat $Q^i$ applied to turbine 313 may comprise heat that is adsorbed from the surroundings, through a wall, in an isothermal expander. Addition of through-wall geothermal heat to the expander would greatly increase the power generated by the expander per $O_2$ molecule expanded.

The geothermal source of $Q^{cp}$ may be oriented in such a way that portions of system 300 may be placed above ground. Heat exchanger 311 and expander 313 may both be above ground, if hot water is brought up from underground to supply $Q^{cp}$. Heat exchanger, 311, may be below ground, (so called DHE), while the expander 313, is above ground. In another alternative embodiment, both the heat exchanger and expander may be in a borehole directly receiving geothermal heat. Oxygen can be taken from air on site and exhausted to air on site, causing a zero air pollution process. Such a process may have higher power density as compared to solar power, making more power faster in a smaller space. The $CO_2$ Neutral, Magnetobaric Geothermal Power Process may not require special siting, since power can be obtained from even heat sources as low as 373 K, which is much more prevalent compared to current restrictions in geothermal power siting.

If the expander 313 of system 300 is aboveground, $Q^i$ may add no additional heat to power. If the isothermal expander and heat exchange unit 311 are both near the geothermal source, then heat can be added to the process at both $Q^{cp}$ and $Q^i$ at the geothermal maximum temperature, $T^+$. In alternative embodiments, any source of heat may be applied to heat exchange unit such as, for example, industrial manufacturing waste heat. Accordingly, the process may improve efficiency of heat to power processes regardless of the heat source.

In particular implementations, potential inefficiency of magnetic absorbent material from magnetic moment hysteresis is material-dependent. In particular embodiments, superconducting magnets may be used to assist in the adsorption process illustrated above. Alternatively, permanent solid magnets may be used. High-temperature superconducting magnets may be cooled and may require power for providing work to the magnetic desorption or adsorption process. This process may substantially return power to achieve magnetic desorption. In particular implementations, such power to enable magnetic desorption may be provided from an electric source such as a current generated from geothermal energy or other energy source that does not emit $CO_2$. Here, it can be shown that the magnetic desorption or adsorption power may be small compared to the process power output and is specifically given back to the process by the adsorption of heat into vessel 309 during isothermal demagnetization desorption.

According to an embodiment, system 300 may be described as "Magnetobaric", since the pressure raised in vessel 303 is made possible by the magnetic field and cooling is induced. Internal energy, U, by definition is not a function of body forces (B), such as gravitation, radiant heat and magnetic field [G. Astaria. Thermodynamics, 1989 Plenum Press], expressed mathematically as:

$$U \neq f(B) \tag{1}$$

Differential internal energy defined as the difference between the differential work and differential heat as follows:

$$dU = dQ - dW \tag{2}$$

Work leaving the system is defined as positive, and work entering the systems is defined as negative. Also, work is a function of body forces expressed as:

$$W = f(B) \tag{3}$$

To satisfy the previous three properties (1), (2) and (3), if body force work is performed on an isothermal system, heat, $-Q$, necessarily is induced out of the system. Here such a process must be isothermal, since heat must be able to be added or subtracted from the surroundings. The foregoing can be summarized by the simple expressions.

$$\frac{dU}{dB} = 0$$

$$\left(\frac{\partial Q}{\partial B}\right)_T = \left(\frac{\partial W}{\partial B}\right)_T$$

An action of demagnetization, may remove previous work put on the system at vessel 303. Qualitatively examining changes in work and heat may be instructive for visualizing the partial differential above.

$$\frac{\Delta W}{\Delta B} = \frac{\Delta Q}{\Delta B}$$

$$\frac{0 - (-W)}{0 - (+B)} = \frac{+Q}{0 - (+B)}$$

$$\frac{+W}{-B} = \frac{+Q}{-B}$$

+Q indicates heat induced into the system, upon demagnetization, −B.

Three other rules of body force heat and work may also apply. One of the other three options may include isothermal magnetization of a material such as ferromagnetic gadolinium near its Curie temperature. Adiabatic magnetization may heat a ferromagnetic gadolinium system, but an isothermal process may induce heat to leave the system to the surroundings. In this case, magnetization may be represented as work done on the system (−dW) and induces heat leaving the system (−dQ), since $(\partial B)_T$ is positive. While magnetization is described herein as one example of a body force according to a particular embodiment, it should be understood that other body forces may be used in alternative embodiments without deviating from claimed subject matter. For example, other types of body forces may include, for example, a change in a magnetic field, gravity, gamma rays, microwave energy, photons such as from sunlight, radiant heat, just to name a few examples.

In Molecular Thermodynamics, heat Q may describe a population of species over quantum mechanical energy states [Donald McQuarrie, Statistical Mechanics, University Science Books, 2000, page 44]. If a narrow population distribution broadens, heat Q is positive. If magnetic induction of field B, is removed from system 300, for example, alignment of ferromagnetic adsorbent and paramagnetic adsorbate with the field orientation is no longer the tendency. The narrow population distribution around that energy state may broaden and induce heat flux into an isothermal system necessarily, since the population of energy states increases making heat Q positive.

In system 300 are two cooling events to consider. First, desorption may require heat to compensate the lose of the gas' solid physical interaction. Secondly, in a similar analysis to a converging/diverging nozzle, cooling may arise from expansion of the gas from adsorbent surface to free volume. Cooling may be caused by the expansion of oxygen from nearly two dimensions near the surface of the adsorbent to three dimensions of pressure vessel 309, thereby filling the available volume. Here, cooling can be quantitatively estimated upon consideration of the kinetic energy of the desorbed oxygen molecules.

If oxygen desorption is isothermal, heat $Q^{DE}$ can be extracted from the surroundings. A driving force to bring heat into the system may be derived from temperature gradient of warmer surroundings temperature compared to surface-to-free-volume expansion cooling. Isothermal pressure vessel 309 may be no greater than the temperature of the surroundings, if the surrounding is the source of heat. The heat of adsorption from vessel 303 can also be a source of heat, the solid adsorbent may cause thermal mass drag.

In some embodiments extraction of heat $Q^{DE}$ in an adiabatic desorptive expansion may be applied to refrigeration of a different system (not shown), for example. Here, extraction of heat $Q^{DE}$ in the other system may have a cooling effect on the other system.

In an alternative embodiment, a Magnetobaric Effect may be related to the Magnetocaloric Effect. However, the Magnetobaric Effect, until now, has not been described in patent literature.

According to an embodiment, particular design of a void volume of pressure vessel 309 and expander 313 may determine the resulting pressure of oxygen in heat exchanger 311. The exiting pressurized oxygen may then heated by a geothermal source (denoted as $Q^{cp}$ in FIG. 6) to a desired high temperature, T+ in heat exchanger 311.

The heated oxygen may then be expanded adiabatically, isothermally or polytropically in turbine 313 to generate work, $W^T$. Isothermal and polytropic expansion may obtain more heat from some the geothermal heat source (or any heat source), whereas, adiabatic expansion may not draw any new heat into the system.

Oxygen may be finally expelled from turbine 313 back to the atmosphere. Depending on whether the expansion is adiabatic, isothermal or polytropic and the starting pressure compared to the geothermal heat added, the exit temperature exit tubing 314 can be below (this embodiment not shown in FIG. 6), above (this embodiment shown in FIG. 6) or equal to the temperature of the surroundings, indicates as $T^\infty$. This is an advantage as compared to a steam loop power processes, which necessarily have an exhaust temperature higher than the surroundings temperature, and generally at around 373 K. Since steam processes are stuck at 373 K, the high temperature, $T^+$, may likely be higher for a steam loop power process, as compared to the Magnetobaric Power process. In the embodiment of FIG. 6, the gas stream, which passed through the Heat Exchanger 311 and Turbine 313 finally returns to the surroundings, indicated at 315. In the embodiment 300 of FIG. 6, oxygen is used in an open loop power cycle, in an alternative embodiment a closed loop cycle can be used.

In the presently illustrated embodiment, oxygen may comprise a unique high paramagnetic gas $\chi_m = +3,449 \times 10^{-6}$ cm$^3$ mol$^{-1}$, literature shows that if $O_2$ is adsorbed on hemoglobin has a $HbO_2$, per heme magnetic susceptibility of $2,460 \times 10^{-6}$ cm$^3$ mol$^{-1}$ at room temperature [Protein Sci. 1993 2: 1975-1986, M. A. LOPEZ and P. A. KOLLMAN]. In narrow slit-space graphitic nano-particles, a unique potential field may interact with $O_2$ at coverage showing an antiferromagnetic $O_2$ adsorbate phenomenon [Inorg. Chem. 1999, 38, 5755-5768].

Reversible $O_2$ binding is known for many molecular transition metals complexes including Co, Mn, Fe, La, Pt, Rh, Cu, and Ir; $O_2$ adsorption near room temperature is common (for example, hemoglobin). In strong magnetic fields, $O_2$ has a well-known boiling point depression from 90 K down to 77.4 K [A. J. Meachin and M. W. Biddulph, The Effect of High Magnetic Fields on the Vapor Pressure of Nitrogen, Oxygen and Argon, Cryogenics, 18, 29-32 (1978)]. For the purpose of this work, $O_2$ can be used at room temperature by adsorption on a magnetically susceptible adsorbent.

Typical magnetically susceptible adsorbent materials are Ferri, Ferro, or Anti-Ferromagnetic Transition Metals, including, for example:

$Fe_3O_4$–$a$, $\gamma$-$Fe_3O_4$, $Gd_2O_3$, Ni, $Mn_3O_4$, $Dy_2O_3$, Dy, Ho, Ho $O_3$ . . .

Magnetically susceptible adsorbates may include, for example, $O_2$, Nitric Oxide (NO), NIT, Fe carbonyl hydride, Ni carbonyl hydride, just to name a few examples. In an example, assuming 1.5 moles of oxygen is desorbed from one kilogram of magnetically susceptible $Fe_3O_4$ that has a specific heat of 0.18 kcal/kg, and assuming 5 kcal per mole of oxygen binding energy to the $Fe_3O_4$, the heat drawn into the system may generate an estimated cooling of 41 Kelvin. A. M. Tishin [Nature, Magnetocaloric effect: Current situation and future trends A. M. Tishin, 12 Mar. 2007] describes that first-order magnetic phase transition materials yield the strongest cooling effect, but that these materials suffer from significant hysteretic properties, which deteriorate magnetocaloric cooling. The type of first order phase transitions that have been examined for Magnetocaloric Effects center on solid lattice geometry transformation, such as ferromagnetic cubic austenite phase converting to tetragonal martensite phase induced by a magnetic field. Movement of atoms in a solid lattice typically has high hysteretic properties. The Magnetobaric Effect, described here in at least one embodiment, involves a pseudo-phase transition, the desorption of a gas, which does not necessarily require solid lattice reorientation; therefore offering a possibility of reduced hysteretic properties.

Volatile gases can be adsorbed at large moles per volume of adsorbate at room temperature. Carbon dioxide offers a good example, since many adsorbents that can adsorb up to six moles $CO_2$/kg-adsorbent at room temperature [Energy & Fuels 2003].

The magnetobaric geothermal process described herein may be a $CO_2$ neutral geothermal process; it does not involve $CO_2$ but it does not necessarily evolve $CO_2$ during a power making process. Since fossil fuel processes typically add $CO_2$ to the atmosphere, replacing a fossil fuel process with a magnetobaric geothermal process, avoids further increase in atmospheric $CO_2$ levels.

Unlike water injection steam geothermal processes, which may be limited by the condensation temperature of water, a particular magnetobaric geothermal power process illustration herein according to one embodiment uses oxygen, which is immune to condensation at any pressure at room temperature. Such a $CO_2$-neutral magnetic geothermal turbine power may decouple pressure and temperature variables, and therefore allows for extraction of power from heat without a heat sink and power from so called "low-grade" heat (T<400 K). Other low temperature geothermal processes, for example, iso-pentane cycles, require a heat sink to condense the iso-pentane.

Experience in the geothermal power plants shows that water-injection steam geothermal processes can over-cool a geothermal source and can create pressure hammers on the steam turbines. Pressure hammers and over-cooling of geothermal source can be avoided by use of this new Magnetobaric Geothermal Process.

Subsurface, temperature gradient changes are steep in the upper mantle and more gradual in the deeper mantle (400-670 km and below). At reasonable (economically and technically) drilling depths, the first 16 miles subsurface has a steeper gradient in temperature with depth.

A $CO_2$ neutral magnetic geothermal turbine power process may allow for obtaining geothermal heat at shallower depths, therefore saving drilling costs, which are typically non-linear with depth. Augustin, et. al. [7PROCEEDINGS, Thirty-First Workshop on Geothermal Reservoir Engineering Stanford University, Stanford, Calif., Jan. 30-Feb. 1, 2006SGP-TR-179, Chad Augustine, Jefferson W. Tester, Brian Anderson] describes the non-linearity of cost with depth as primarily a function of increased casing (and cementing) and drill rotating required at deeper depths. A magnetobaric geothermal process may allow for shallower drilling and less casings, since the process is able to extract low-grade heat.

A $CO_2$ neutral magnetic geothermal turbine power process can obtain higher efficiency as compared to water/steam geothermal process at the same geothermal temperature.

Work consumed from a magnetic field may depend on an electron coupling interaction between the oxygen and magnetically sensitive adsorbent.

A high over-pressure in the vicinity of the adsorption, vicinity may encourage re-adsorption. A limited over-pressure with volume expansion work generation may be used, for example.

Oxygen has a compressibility factor near unity even at elevated pressure and below room temperature. Another suitable paramagnetic gas may be nitric oxide. Nitric oxide needs to be contained in a closed loop cycle, whereas, oxygen can be used in a open loop power cycle. Any paramagnetic or magnetic gas that adsorbs and desorbs from Ferri/Ferro/Anti-Ferromagnetic Transition Metals are suitable.

Adsorption enhancement by the magnetic field compared to desorption is the best option, since oxygen is very volatile. A difference in the activation energy of adsorption/desorption kinetics may be realized when the magnetic field is changed.

Generating Power from Hydrocarbon Deposits While Capturing Carbon Dioxide

As indicated above, use of hydrocarbon fuels for energy has vastly contributed to emission of $CO_2$, which is believed to be a significant cause of Global Warming. According to an embodiment, hydrocarbons may be used for the production of energy while capturing some or all of $CO_2$ generated in the process.

According to an embodiment, crude oil reserves can be categorized as category 1P, 2P or 3P reserves. Proven reserves can be designated 1P, defined as those that, to a high percent certainty are recoverable with relatively little risk and known methods. For the purpose of illustration herein, a sub-category of 1P may be designated as 1P-R, defined as geological gaps underground where crude oil has been recovered and offers a potential resting place for $CO_2$ in particular embodiments illustrated herein.

Geological formations that held crude oil and natural gas over long timeframes in some instances may offer a naturally occurring storage place for $CO_2$. Cavities for 1P-R may be formed from a layer of porous rock with a layer of non-porous rock above such that the non-porous layer forms a dome that geologically, in the past had trapped a hydrocarbon deposit at a natural pressure. Here, the intact dome may provide pressure worthy cavity that can potentially encapsulate $CO_2$. 1P-R cavities may also contain various amounts of not yet recovered hydrocarbon deposit, which can be made use of using one or more embodiments illustrated herein.

Commercial practitioners of enhanced oil recovery (EOR) may operate their injections with the goal of minimizing the amount of $CO_2$ left in the ground so that the $CO_2$ can be used for another well. In contrast, in at least one embodiment, a goal is to sequester $CO_2$. It is believed that more than 82.4 billion metric tons of sequestration potential exists in mature oil and gas reservoirs [US D.O.E National Energy Technology Laboratory, NETL]. Merely removing one billion metric tons of $CO_2$ from the atmosphere a year could significantly slow the aforementioned effects of Global Warming. Accordingly, the potential in 1P-R mature oil and gas underground cavities is tremendous. In alternative embodiments, unmineable coal beds could also be used to store $CO_2$. Here, it is estimated [NETL] that >180 billion metric tons of $CO_2$ sequestration potential exists in unmineable coal seams. Unmineable coal seams may also contain significant energy potential from coal bed methane that is currently difficult economically unfeasible to access.

Proven plus Probable reserves, known as category 2P reserves, are those reserves that from known geological and engineering techniques are likely recoverable, but with some risk of unrecoverability. Proven, Probable plus Possible reserves, known as category 3P reserves, are those reserves that, to a low degree of certainty (10% confidence), are recoverable. There is relatively high risk associated with these reserves. Particular implementations may enable some 2P and 3P reserves to generate useful power, without ever removing hydrocarbon out of the ground.

A look at one region's oil fields gives an indication that 2P and 3P reserves are significant. For example Timano-Pechora region oil fields are only 23% proven and 33% 3P. Demand on hydrocarbon fuel resources drives interest in deeper and hotter wells. Hotter holes are typically more expensive to drill and bring increased safety and economic risks as well. As illustrated herein according to particular embodiments, hydrocarbon may be recovered from deeper and hotter wells, which might not have been otherwise accessible or recoverable without considerable cost.

It is estimated that over 1.3 Trillion Barrels of oil are under the ocean floor. Some embodiments may make it easier to make use of such difficult to reach hydrocarbon. In the United States, the contribution of natural gas to the nation's gas supply from three specific unconventional resources—gas shales, coal seams, and tight sands—has grown significantly during the past 20 years. These resources have been highlighted by the Energy Information Administration (EIA) and others as critical supply sources during the next 20 years. The National Petroleum Council (NPC 2003) estimates the volume of technically recoverable gas from these three resources in the lower 48 states is in excess of 293 trillion cubic feet (TCF).

It is also know that around the world, and particularly in Venezuela, Alberta and Mountain Zone USA there are vast reserves of shale oil and tars. Particular implementations described herein may be beneficial, to some extent, to all of these geological situations. Methods and processes to exploit category 2P and 3P oil reserves, already tapped 1P-R wells, difficult hot wells, under ocean reserves, gas shales, and coal seam methane would vastly increase the World's obtainable hydrocarbon reserves enabling tremendous benefit to the World economy.

Conventional techniques to exploit underground hydrocarbon deposits have included, for example, extraction of deposits above ground, transportation of extracted deposits, refining extracted deposits into useful fuel products and shipping of such fuel products to customers for combustion, which may then result in the production of $CO_2$. Previous attempts to address the source of Global Warming have focused on the sequestration $CO_2$ that is created from combustion. As illustrated herein according to particular embodiments, underground hydrocarbon deposits may be exploited for energy production without extraction of underground hydrocarbon deposits above ground and while sequestering $CO_2$ beneath ground. As such, expensive crude oil refining can be avoided, bringing into play hydrocarbon reserves that until now where too expensive to extract from under ground, and enabling sequestering $CO_2$ without building a pipeline for $CO_2$, or maintaining structural integrity and pressure worthiness of the underground natural cavity In one particular implementation, a fuel cell is inserted into a natural underground hydrocarbon reservoir from above ground and an anode of the fuel cell may be positioned to be in contact with a hydrocarbon deposit in the hydrocarbon reservoir. The anode may then react with the hydrocarbon deposit to generate electrical current, $H_2O$ and $CO_2$. Here, some or all of the $CO_2$ generated in this reaction may remain captured in the hydrocarbon reservoir. However, this is merely a sample embodiment and claimed subject matter is not limited in this respect.

As illustrated herein according to particular embodiments, with drilling into difficult to reach fossil fuel reserves and contacting the underground fuel with a fuel cell, such as solid oxide fuel cell (SOFC), oxygen may be brought into contact with a hydrocarbon deposit via an SOFC ceramic membrane and generating electromagnetic force (EMF). Alternative embodiments may employ different types of fuel cells such as, for example, molten carbonate fuel cells (MCFCs). A majority of $CO_2$ formed in the process may remain underground in the same location that the hydrocarbon deposit resided. Here, pressure in a well, as well as the pressure of the well in relation with other wells within a given hydrocarbon field, may be maintained.

In one embodiment, electricity generated from this process may be transmitted above the ocean and/or land surface and to a location to provide power to a utility grid, for example. In an alternative embodiment, electricity generated from this process may be used to manufacture high-pressure $H_2$ from the electrolysis of water. Such hydrogen may be used as a transportation fuel and may be transported to end users (e.g., using transportable pressure tanks by ship, rail, or truck) without the need for refining. Also, and as described below, oxygen generated from the electrolysis process, along with oxygen from the air, may be transported into the hydrocarbon reservoir to a cathode side of an SOFC, for example, to aid in the cycle of generating electricity along with makeup air oxygen to be sent downhole for completion of the cycle, for use on the cathode side of the SOFC. The enriched oxygen at the cathode may improve performance of the SOFC in certain embodiments.

Figure 7A:
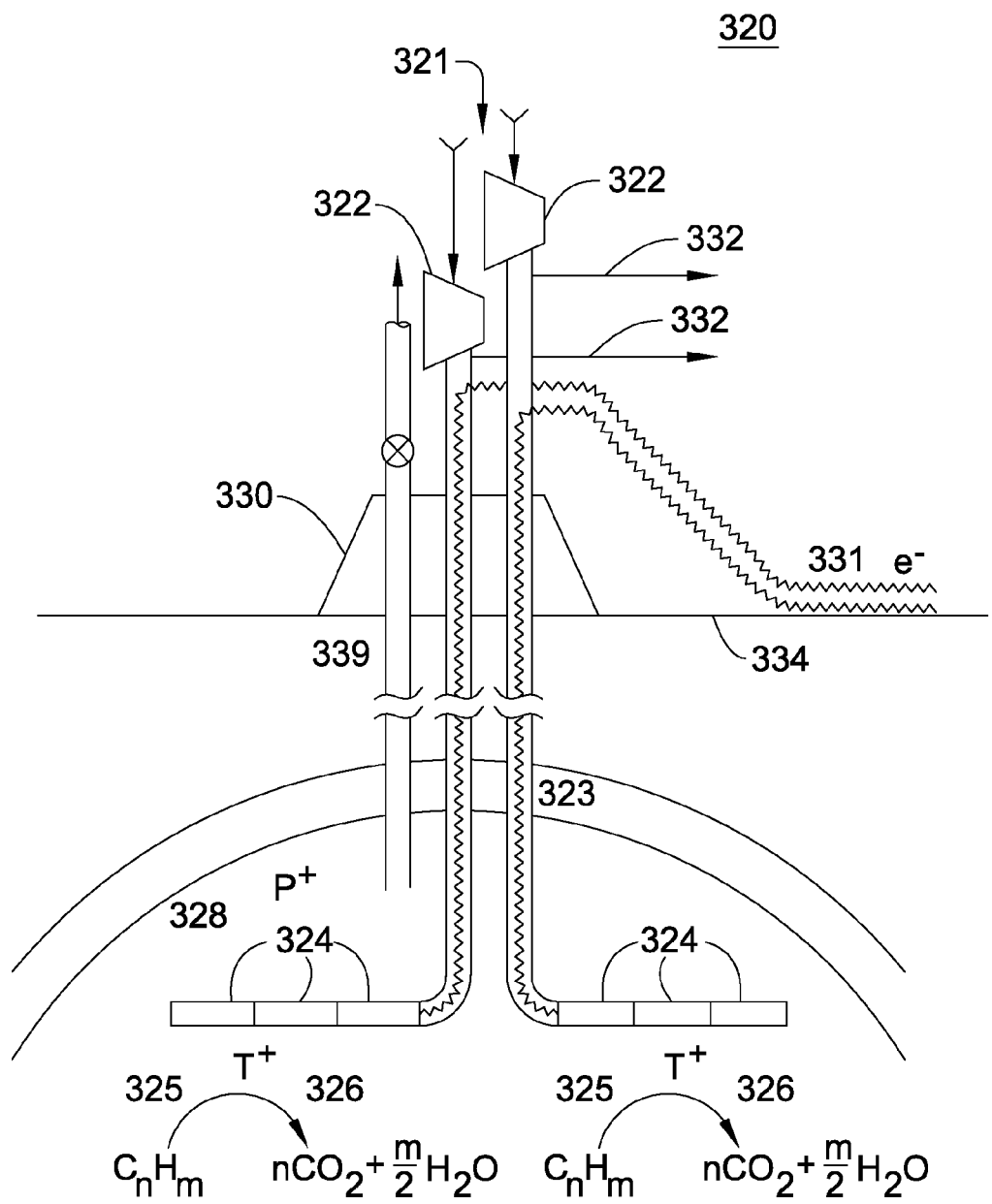
FIGS. 7A, 7B and 7C are schematic diagrams of systems for generation of power from hydrocarbon deposits while capturing carbon dioxide according to one or more embodiments.

FIG. 7A shows a system 320 for generating power from hydrocarbon deposits without removing hydrocarbon deposits from the ground. Such hydrocarbon deposits may include, for example, natural gas, coal bed methane and/or comprises raw sweet crude, for example. In the particularly illustrated embodiment, hydrocarbon deposits in hydrocarbon reservoir 328 are accessed by drilling through non-porous rock 323 from above ground 334. In alternative embodiments, however, such a reservoir may be located under the ocean floor and accessed drilling through the ocean floor. In the presently illustrated embodiment, anodes of fuel cells 324 may be brought into contact with hydrocarbon deposits $C_nH_m$ to generate electricity for transmission through cables 331 according to the following reaction (5):

$$C_nH_m + (n+m)O_2 \rightarrow nCO_2 + m/2H_2O \qquad (5)$$

Here, this reaction is facilitated by fuel cells 324 that provide oxygen from any one of several sources such as, for example, oxygen from air 321, which may drawn downward to fuel cells 324 by blowers 322. Additionally, inert nitrogen 332 may be exhausted from fuel cells and released as shown. In the particular embodiment using SOFCs, however, blowers 322 need not build pressure since an SOFC can build pressure across a ceramic membrane. This feature of an SOFC allows for using atmospheric pressure oxygen from air to oxidize a naturally pressurized underground hydrocarbon deposit without the power consumption of a compressor. Oxygen in the air feed may be direct to flow past in intimate contact with SOFC cathodes at a high rate to achieve good mass transfer. In alternative embodiments, as discussed above, pure oxygen may be transported to cathodes of SOFCs 324 from a pressurized tank (not shown). An air inlet may be positioned in the borehole to bring oxygen into the SOFCs while allowing nitrogen rich air exhaust from the SOFCs and flow to the atmosphere.

Nonporous rock 323 may provide a cap to naturally hold underground pressure, $P^+$, in hydrocarbon reservoir 328. Fuel cells 324 formed into long tube arrays may fed into hydrocarbon deposits and gradually brought to a temperature $T^+$. Such hydrocarbon deposits may be any one of several hydrocarbon deposits such as, for example, natural gas or low-sulfur crude. Prior to introduction of a fuel cell 324, hydrocarbon deposits in hydrocarbon reservoir 328 may be de-sulfurized using any one of several in-situ ways techniques, cleaned-up of minerals and lowered in viscosity. Hydrocarbon deposit 325, written symbolically as $C_nH_m$, may have its viscosity further lowered by the heat in the vicinity of fuel cell 324 at temperature $T^+$. Viscosity may also be lowered by lowering the average molecular weight of hydrocarbon deposits in-situ. Here, viscosity may be lowered in-situ by enzymatic, catalytic and/or bacteriological action on high molecular weight hydrocarbon to lower molecular weight hydrocarbon. Hydrogen may be injected into a well to enhance this molecular weight lowering process. In another embodiment, biocatalysts based on bacterial strains designated as extremophiles because of their ability to function in extreme conditions—are capable of converting heavy hydrocarbons to cleaner feedstocks. Lab-scale tests have shown adding such biocatalysts to crude may reduce organic sulfur and nitrogen concentrations by up to 40 percent, and metals by up to 50 percent [Eugene Premuzic and Mow Lin, 1999]. Preparation of new microorganisms, metabolically weaned through challenge growth processes biochemically transform solid carbonaceous materials at extreme temperatures, pressures, pH, salt and toxic metal concentrations [U.S. Pat. No. 6,294,351]. A high temperature of an SOFC may possibly destroy and combust the extremophiles. As such, use of such biocatalysts may be performed in two steps. First extremophiles may perform in-situ collection of anode fouling material. Second, extremophiles may be gathered away from the SOFC during its high temperature operation. Alternatively, such extremophiles may be absorbed by another medium placed underground and away from the SOFC location. Action of such extremophiles may also lower viscosity of the original raw crude deposit [Brookhaven National Laboratory News Release Dec. 11, 2001]

As shown, hydrocarbon deposit 325 may react at an anode of a fuel cell 324 according to the above referenced reaction to form by products $CO_2$ and $H_2O$. Here, the difference between densities of raw crude and water may naturally separate the two. Water near fuel cell 324 may be in the form of steam, and tend to move away from fuel cell 324 to become liquid water in cooler locations of the geological cavity forming hydrocarbon reservoir 328. That moving away and condensing may reduce the oxidizing effect of water on anodes of fuel cells 324.

A pressure release 339 may release some $CO_2$ and/or hydrocarbon deposit if the pressure under non-porous rock 323 becomes substantially higher than the natural safe and sustainable pressure of hydrocarbon reservoir 328. Here, geologists and engineers may perform tests on non-porous rock 323 to determine whether pressure higher than the natural pressure holding capacity of a geological cavity is possible. Since such a geological cavity held high pressure of millions of years, it can be considered pressure worthy to its natural occurring virgin pressure, so long as the well is minimally breached, for example. In embodiments of processes described herein, minimally breach a geological cavity may provide a suitable location for underground sequestration of $CO_2$. A base and/or platform 330 may be positioned to assist drilling into hydrocarbon reservoir 328. Cables 331 may be used to transmit electricity to a utility power grid. Alternatively, electricity from cables 331 may be used to manufacture hydrogen onsite using electrolysis, as pointed out above.

According to an embodiment, $CO_2$ generated in the reaction of hydrocarbon deposits in hydrocarbon reservoir 328 may be trapped and/or sequestered beneath the dome formed by non-porous rock 323 where the natural pressure $P^+$ of reservoir 328 is maintained. In one embodiment, such $CO_2$ may be stored in hydrocarbon reservoir 328 in gas or liquid forms, or combinations thereof. Alternatively, such $CO_2$ may be stored in hydrocarbon reservoir 328 in a liquid mixture with water and/or unrecovered hydrocarbon deposits, for example.

While FIG. 7A shows that oxygen may be transported to a cathode of fuel cells 324 from air 321, in alternative embodiments, fuel cells may instead receive oxygen from a pressurized oxygen storage tank above ground and/or from a pipe. Here, such use of concentrated stored oxygen may facilitate an under-ocean process, for example. Further, such an under ocean may be facilitated by the absence of a requirement to extract and handle raw crude under the ocean, since simple electricity or hydrogen may be produced instead of such extraction and handling. Additionally, processes herein described may avoid unfortunate spilling of crude oil in the ocean. Using such a system may enable providing pure oxygen to fuel cell cathodes. Again, as illustrated above, electricity generated from a reaction of hydrocarbon deposits and fuel cells 324 may by used for manufacturing $H_2$ on-site using electrolysis. The $O_2$ by product of this electrolysis may then be provided to fuel cell cathodes to be used in generation of additional power. In one example, such $O_2$ made by this reaction be combined with stored $O_2$ to be provided to the cathodes of fuel cells 324. Such make-up oxygen may reduce a possible requirement to produce pressurized oxygen for; thus improving economic feasibility.

Figure 7B:
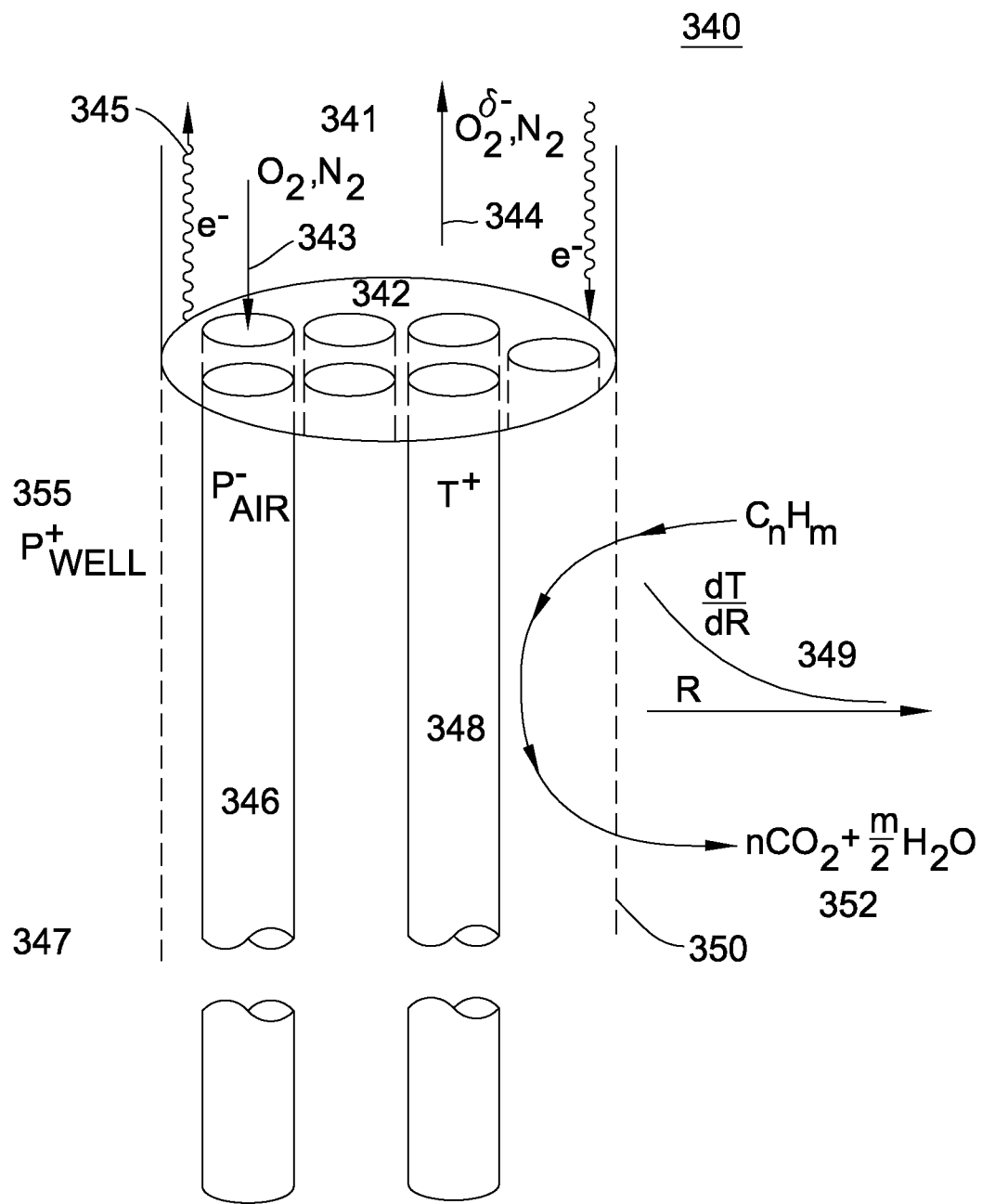

FIG. 7B is a schematic diagram of an array of SOFCs that may be implemented as fuel cells 324 in the embodiment shown in FIG. 7A. Here, such an array may comprise a plurality of tubular shaped SOFCs that may be placed through a borehole into a hydrocarbon reserve to place anodes in contact with a hydrocarbon deposit. As shown, several small diameter tubes may be packed in an array within a casing 350 that fits within the diameter of a wellhole. Here, borehole tubing may extend upward toward direction 341 to the atmosphere and through the Earth to bring air to and from the series of SOFCs, and electric current to and from the series of SOFCs. Open SOFC tubes 342 with airflow may receive air from above ground down to individual SOFC tubes 342. As illustrated above, according to an alternative embodiment, oxygen may be transported to SOFC tubes 342 from a pressurized source rather than air. Airflow may be made turbulent as it contacts an SOFC cathode. Likewise air comprising, partially oxygen depleted air may leave from the top of SOFC tubes 342. Current 345 comprises electrons from the anode and toward the cathodes. An EMF circuit is completed as electrons move down from the borehole to the cathode of each of SOFC tubes 342.

In reference to particular single SOFC tube 346, a long cylindrical shape of a bore hole may suit the long cylindrical shape of SOFC tube 346. Pressure of the air in SOFC tube 346 on the cathode side may be atmospheric, P. In a particular embodiment where a hydrocarbon reservoir is undepleted, pressure in hydrocarbon reservoir at location 355 may be higher, at $P^+$. In a particular embodiment, SOFC tubes 342 may operate at a high temperature $T+$. Here, such a high temperature of SOFC tube 342 may set up a radial temperature gradient extending into the hydrocarbon reservoir at location 349, as $dT/dR$. Here, hydrocarbon deposits in the radial vicinity of SOFC tube 348 may have its viscosity lowered by the high temperature of SOFC tube 348 and react at the anode of SOFC tube 348 with $O2^-$ ions that permeate a ceramic membrane of SOFC tube 348. The product of the reaction is $CO_2$ and $H_2O$. Here, both of these products are less dense than raw crude, and may tend to move away from SOFC tubes 342 as crude flows toward the anode. Again, raw crude or natural gas deposits may be pre-de-sulfurized before contacting an SOFC anode with the hydrocarbon. As pointed out above according to a particular embodiment, pre-de-sulfurization may be performed in-situ. However, pre-de-sulfurization may also be above or ex-situ in alternative embodiments. Here, ex-situ desulfurization may allow removal of natural gas at location and at well pressure, direct the natural gas with sulfur impurity to absorbent material, absorb the sulfur impurity at well pressure, and then return cleaned-up natural gas to the original reservoir at pressure. To maintain this process, a blower or low-pressure differential compressor may be used to make up the pressure loss during the sulfur absorption process. SOFC tubes 342 may be disposed within a casing 350 that is porous and allows flow of sulfur-reduced and/or naturally low sulfur hydrocarbon deposits in a radial direction.

In particular embodiments, SOFC tubes 342 may reach high temperatures (650 to 1000 C) and are highly oxidizing ($O_2^-$ ions at 100% purity may emerge on the anode side of a ceramic membrane), which is helpful considering the aromatic nature of unrefined heavy crude. Air 343 may be drawn to the cathode side of SOFC tubes 342 using any one of several techniques such as techniques to draw air for burning crude in-well to make it hot and decrease its viscosity including, for example, Conventional Fire flooding (CFF) and the THAI™ process [www.petrobank.com/hea-thai-image-1.html].

As illustrated, SOFC tubes 342 may be compactly packaged in casing 350 to fit the long cylindrical shape created by a drill bit or future laser drilling. The use of a combustion based engine to generate electricity under ground is impractical, because the (1) engine is too big, (2) could not conform to the shape of a long cylindrical drilling, and (3) can not burn unrefined oil in any practical manner. In contrast an SOFC tubes 342 may provide high power per small volume, can be shaped in a cylindrical long manner, (3) can in-principle combust unrefined sweet crude, (4) generate electricity without moving parts, which is better for underground, (5) requires no cooling, which is practical if encased underground, and (6) may produce some high temperature waste heat that can help the movement of hydrocarbon underground toward the SOFC tubes 342.

According to an embodiment, SOFC tubes 342 can be used underground, with direct placement in the oil reservoir to generate electricity by bringing oxygen underground to the cathode side of the SOFC. As mentioned above, use of SOFCs may be particularly effective in exploiting deep off-shore reservoirs. Electricity can be conveniently transmitted to a nearby power grid by laying cable on the floor of the ocean. Deeper ocean drilling could be facilitated by the downhole SOFC process. Here, since electricity is the product rather than extracted hydrocarbon deposits, the drilling apparatus, the power treatment, and the cables to transport the power, may all be maintained on the ocean floor. This may alleviate the need for a platform about the ocean, since no hydrocarbon deposits need be collected and transported. Submarine drilling rigs have been developed and can be used more simply if subterranean SOFC electricity is generated. Also, deep ocean drilling may be made more environmentally safe if subterranean SOFC electricity is the product as opposed to collection of crude oil on the ocean top and transport by tanker.

In particular embodiments, SOFC tubes 342 may be power dense, requiring a small about of space per power output. The majority of the volume of any of today's functioning SOFC systems is related to the co-generation of heat, and/or recuperation of exhaust heat, fueling mechanisms and storage, and electrical conditioning. A tubular SOFC assembly itself may be small. Numerous prototypes have shown that SOFC systems can have extraordinarily good longevity of performance without degradation. Siemens SOFC systems have been operated for 20,000 hours at electrical efficiencies of >46%.

Although drilling costs increase as the diameter of the hole increases, significant SOFC surface area contact of anode with underground fuel could be achieved by using the extraordinary long length of the borehole. Drilling diameter and available volume underground is a surmountable challenge. Geothermal wells are usually completed with 10¾" or 8½" bits and 9⅝" or 7" casing or liner which is generally slotted or perforated, not cemented. [7PROCEEDINGS, Thirty-First Workshop on Geothermal Reservoir Engineering Stanford University, Stanford, Calif., Jan. 30-Feb. 1, 2006, SGP-TR-179, Chad Augustine, Jefferson W. Tester, Brian Anderson].

Siemens Westinghouse has demonstrated SOFC tubular diameters <2.2 cm and lengths of SOFC tubing of >150 cm [Fuel Cells by Supramanian Srinivasan, Springer, 2006]. SOFC power densities of >1.8 watts/cm$^2$. SOFC down-hole would be able to increase cm$^2$ of contact area by an increased length of contact at constant diameter.

Drilling costs in 2006 dollars to transverse 12,500 feet is approximately 2 million USD. A 10¾" bore hole could fit a nine tube SOFC assembly and could be used to submerge SOFC tubes 342 into hydrocarbon deposits as illustrated above. Geothermal boreholes can be over 36 cm (14.4 inches) [Brochure of Gordon Gene Culver Geo-Heat Center Klamath Falls, Oreg.]. In one example, according to literature citing SOFC power densities, in order to achieve 1.0 MW in an SOFC assembly, approximately 500 SOFC tubes that are 150 cm long or a total of 2,430 feet length of SOFC tubing may be used needed for a 10¾" borehole, comprising 20% of the length of drilling. Here, such tubes may be arranged in groups in long series extending from the bottom to the length of the borehole. Five hundred such SOFC tubes at 150 cm long and arranged in groups may extend approximately 20% of the length of drilling. Alternatively, the SOFC assembly may be sacrificed to the well, and simply pushed all the way out of the borehole into the geological fossil fuel cavity.

Underground hydrocarbon deposits may have low enough viscosity to continually approach an SOFC anode using techniques illustrated above. Resulting $CO_2$ may move away from the anode. For hydrocarbon deposits comprising natural gas and/or coal bed methane, viscosity may not be an issue. For hydrocarbon deposits comprising crude, crude viscosity centipoises greater than 2,000, movement of the hydrocarbon may be assisted by heating the crude using techniques such as the aforementioned THAI™ process discussed earlier. Also, hot combustion of an SOFC may also decrease local viscosity of the underground hydrocarbon deposit, allowing it to move towards the SOFC anode while $CO_2$ moves away from the anode.

To date Siemens-Westinghouse have built and durability tested SOFC power plants up to ¼ MW (250 KW) operating on natural gas. It has been show that raw, unrefined hydrocarbon deposits may have impurities such as, for example, high levels of transition metals, sulfur, HCl, nitrogen and other impurities. For example, sulfur impurities may adsorb on to a nickel anode catalyst that is commonly used in SOFCs. In particular embodiments, an SOFC anode may be configured and/or adapted to address fouling of the SOFC with such impurities.

Sulfur resistant anodes are under successful development. A pyrochlore-based anode material, $Gd_2Ti_{1.4}Mo_{0.6}O_7$, showed remarkable tolerance to sulfur-containing fuels. The anode/electrolyte at 950° C. in a fuel gas mixture containing 10% $H_2S$ demonstrated a peak power density of 342 mW cm−2. The fuel cell operated under these conditions continuously for six days without any observable degradation, suggesting that $Gd_2Ti_{1.4}Mo_{0.6}O_7$ anode exhibits not only excellent stability but also good catalytic activity toward the oxidation of hydrogen sulfide. Such sulfur resistant anodes may be used in conjunction with the aforementioned underground in-situ desulfurization process.

Special bacterial biocatalysts have been shown to remove up to half of the impurities like sulfur, nitrogen and metals from crude oil either before or after it is removed from the ground as discussed above. If injected directly into oil wells, such biocatalysts may contribute to the breakdown of the crude for easier extraction—a form of microbially enhanced oil recovery.

In particular embodiments, processes described here may be applied to many qualities of crude, and may open up new oil reserves that have not been economically accessible and/or at deep ocean. SOFC direct underground power process may leave $CO_2$, $NO_x$ and $SO_x$ in the underground well; thus zero or near zero emissions. Such a process may offer a way to make use of oil reserves that have been otherwise written off as too heavy, too deep, and too inaccessible, in the ocean, heavy oil, tar, coal bed methane and shale oil. A surprising percent of all the known fossil fuel reserves belong to these categories.

Figure 7C:
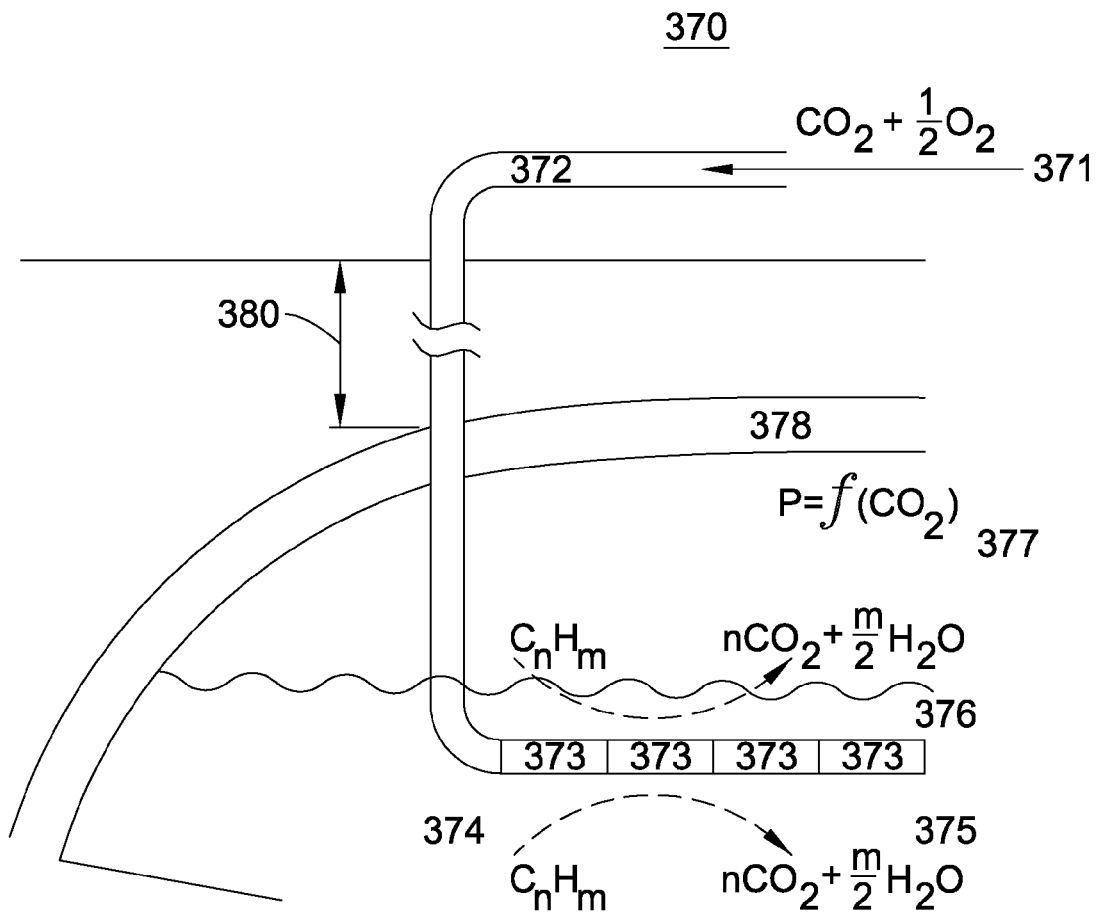

FIG. 7C is a schematic diagram of a system according to an alternative embodiment which uses an MCFC to react with hydrocarbon deposits in a hydrocarbon reservoir. MCFCs are useful since they offer a means to transport $CO_2$ into depleted oil wells, where there is some hydrocarbon to react with, but there is also a cavity of space underground that is depleted in pressure, but able to hold pressure. $CO_2$ liquid mixed with some water requires about 1000 psi and <100 F to be a simple liquid. Such $CO_2$ may be derived from carbon capture for biomass production, for example.

Here, MCFCs 373 may be formed to fit through a bore hole in non-porous rock 378, forming a hydrocarbon reservoir storing hydrocarbon deposits 374. MCFCs 373 may comprise reinforced molten membranes to withstand differences between pressure at the cathode and pressure in the reservoir.

With the use of MCFCs, $CO_2$ derived from vegetation-based biomass can be transported across a membrane together with oxygen. MCFCs can operate at 700 C, which is sufficient for a significant number of hydrocarbon oxidation reactions. Since $CO_2$ came from vegetation, which captured the $CO_2$ from the atmosphere and is ultimately sequestered underground, processes according to particular embodiments may comprise a $CO_2$ atmospheric removal processes. For example, MCFCs 373 may be used to both generate electrical power and sequester $CO_2$ of input fluid 371 that was derived from a biomass power plant carbon capture process. In that case, hydrocarbon reservoir 377 may be pressure depleted but contain some difficult to recover hydrocarbon. Reaction at the anode takes place with the difficult to recover hydrocarbon and $CO_2$ fills the pressure-depleted cavity.

In a particular embodiment, an MCFC 373 may have a half mole of oxygen reacting with a mole of $CO_2$ and transport the carbon across a membrane as carbonate ion ($[CO_3]^{2-}$). Carbonate is driven across the membrane because it reacts in a REDOX cycle on the other side of the membrane. Here, this reaction strips away electrons that are sent back to the cathode creating EMF. $CO_2$ may be liberated on the anode side, as the oxygen in the $[CO_3]^{2-}$ reacts with something.

In principle, the $CO_2$ and ½ in fluid 371 can move against a pressure gradient, since the reaction driving force can be much stronger than opposing pressure on the anode. In practice for MCFCs, due to mechanical stress, it may be more convenient to maintain the cathode and anode isobaric.

A biomass process using an ASU and a steam cycle may provide a mixture of pressurized $CO_2$ and amounts of $H_2O$ and $O_2$ of any of several amounts, depending on how the biomass power plant process with carbon capture is operated. For example, if excess ASU oxygen is fed to the biomass process some oxygen can be captured with the exhaust $CO_2$ and sent by pipeline as a pressurized gas mixture to an underground partially depleted hydrocarbon reservoir. An amount of water in the piped carbon dioxide and oxygen may be controlled by a simple condensation process, using river water or air to cool the exhaust and condense out any amount of water or substantially all the water from the exhaust. If desired the SOx and NOx from a solid biomass that contains sulfur and nitrogen atoms burning process could be absorbed before the carbon dioxide and oxygen are sent to the cathode of the underground MCFC. At ½ $O_2$ to 1 $CO_2$ the ingredients would be well-suited as a feed stream to a MCFC. While collecting $CO_2$, $H_2O$ and $O_2$ may decrease the biomass power process efficiency by >21% [calculations from H. Herzog, MIT Energy Laboratory, 1999 show this for coal power], such a biomass power process may still produce valuable power, despite the carbon capture losses, while preparing the ingredients for MCFC cathodes. Again, biomass captured $CO_2$ came from vegetation that obtained the $CO_2$ from the atmosphere, which sets-up the potential of a $CO_2$ atmospheric removal system.

Where Kyoto CERs are available, for example, piping can direct pressurized $CO_2$, and ½ $O_2$ underground into a substantially recovered oil reserve. Since some crude has already been removed the pressure in the well will be at least partially depleted, but the well itself will have the capability of withstanding pressure similar to the naturally occurring pressure of that well pre-crude removal. According to an embodiment, the above described down-hole MCFC power system can be used as a secondary and tertiary hydrocarbon recovery technique. If the temperature of hydrocarbon reservoir is below approximately 100 F, it may be possible to sequester $CO_2$ as a liquid in depleted cavity in locations that are far removed from the hot MCFC.

The pressure of liquefied $CO_2$ with $O_2$ may be higher than the well pressure. Firstly, some power could be obtained from isothermal turbines that absorb some heat from the well as the liquids/gas is allowed to expand as illustrated above. Alternatively, the $CO_2$, $H_2O$ and $O_2$ may be directed to a series of MCFCs 373 that protrude into the heavy oil. Here, $O_2$ may drag $CO_2$ as $[CO_3]^{2-}$ across a molten carbonate membrane, since the ½ $O_2$ has a chemical potential to react with hydrocarbon drawn forward in reaction by the high stability of the $CO_2$ molecules produced. While an MCFC may operate optimally at 600 C.° in some embodiments, and if the well is only 150 C.°, a reaction of $O_2$ with heavy crude may create heat sufficient to raise the local temperature and to produce molten carbonate.

As $[CO_3]^{2-}$ moves in one direction, the same amount of electrons move in the opposite direction and create EMF. The electric current can be sent above ground and transmitted to a local power grid or converted to $H_2$ to be used for fuel as illustrated above.

In one particular embodiment, an overall process may have two power generation points, an ASU biomass carbon capture plant and a hydrocarbon fuel cell power underground process. Therefore more power is made than would otherwise, and $CO_2$ has in effect been removed from the atmosphere and put underground.

Typically, significant amounts of hydrogen are required to be added to heavy crude to be useful as fuel, since a lot of aromatic bounds are present. Hydrogen is at deficit in heavy refining processes, and costly to generate. Using MCFCs may provide a more cost effective technique to extract energy from such heavy crude. Here, $CO_2$ that moves across a membrane from a biomass process plus the new $CO_2$ created from the heavy crude combustion, plus smaller hydrocarbon fragments may remain trapped under ground in hydrocarbon reservoir 377. This may therefore eliminate the need to transport $CO_2$ from combustion, remove heavy hydrocarbon above ground, refine extracted crude or generate hydrogen.

In particular implementations, there may be a geological limit as to how much $CO_2$ can be left underground, since the presence of heavy crude helps make soluble and hold the $CO_2$ underground. But just as natural gas can be kept underground, $CO_2$ at some pressure can be kept underground. It will depend on the temperature and pressure of reservoir and the geological encapsulation of the reservoir.

Consuming Carbon Dioxide to Generate Heat to Assist in Generation of Power

According to embodiment, sequestration of $CO_2$ may take place at near atmospheric pressure, and can be done either by containing $CO_2$ in a solid form and/or by injecting $CO_2$ in underground brine or salt deposits that react with $CO_2$. Here, in particular implementations, such $CO_2$ forms may be generated from making power from above ground. The sequestered $CO_2$ may then be disposed as an atmospheric pressure gas, or in a solid form, such as a carbonate, for example.

According to an embodiment, an engine may employ an open Brayton power cycle consuming energy in two stages: the compression of air, which includes nitrogen and the expelling of waste heat into the environment. Here, air used in combustion may include nitrogen gas. A typical combustion engine may compress a substantial amount of nitrogen, which is a loss in energy and allows for the possibility of the nitrogen to make undesirable nitrogen oxide compounds such as, for example, $N_2O$, $NO$, and $NO_2$.

Nitrogen may also limit the energy potential in internal combustion engines. The expansion of nitrogen in the open Brayton cycle is a benefit in that it creates power, but the temperature rise that can be achieved by the burning of fuel is decreased by the presence of nitrogen. Further, since nitrogen reacts with oxygen to make $NO_x$ at high temperatures if nitrogen is present, engine designs typically limit maximum engine temperatures to avoid the creation of $NO_x$. In particular embodiments illustrated herein, the elimination or very large decrease of the use of atmospheric air as a reactant improves functioning of a combustion process and/or system that may be used in any one of several engine applications such as, for example, a mobile transport engine.

According to one embodiment, a system and/or method is used for combusting a fuel to generate combustion heat and carbon dioxide where such combustion heat is used for generating power. Carbon dioxide generated in this combustion enables a reaction for generating additional heat. The additional heat may then be applied in the same combustion process to assist in increasing the generation of power in an overall heat to power transformation.

In another embodiment, a system and method is used for combusting a carbohydrate fuel to generate heat and carbon dioxide. Carbon dioxide generated in this combustion enables a reaction for generating substantially pure oxygen. Here, combustion of the carbohydrate fuel includes combining the carbohydrate fuel with the substantially pure oxygen and the substantially pure oxygen is generated in an amount substantially equal to oxygen consumed in combustion.

In this context, "substantially pure oxygen" and/or "substantially pure $O_2$" relates to a gas having oxygen and/or $O_2$ in a concentration to substantially optimize combustion of a fuel such as a carbon based fuel, for example. Here, while such substantially pure oxygen may have trace amounts of other gases such as nitrogen and $CO_2$, for example, such trace amounts do not substantially hinder combustion of a fuel if the substantially pure oxygen is combined with the fuel for combustion.

Carbon dioxide output from the burning of a vegetation-derived fuel, for example, is captured in a process for later sequestration. In addition, reaction of the carbon dioxide with an oxygen generating sequestration material, such as a solid superoxides (or peroxide), may also release oxygen that is recycled back to a combustion stage. Such recycled oxygen has several beneficial effects to the overall process of transforming heat to power.

Recycled oxygen may increase temperatures reached by combustion of vegetation derived fuel, thus increasing the pressure that can be obtained in an internal combustion engine, for example. Additionally, nitrogen may be prevented from being in the combustion process. Use of oxygen generating carbon capture material may also generate heat when reacting with carbon dioxide. According to a particular embodiment, and as shown in expressions (6), (7) and (8) below, solid superoxide (or peroxide) reactions may be used to create a second source of heat, since the reactions of the superoxides (or peroxide) with carbon dioxide is exothermic.

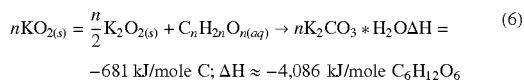
$$nKO_{2(s)} = \frac{n}{2}K_2O_{2(s)} + C_nH_{2n}O_{n(aq)} \rightarrow nK_2CO_3 * H_2O \Delta H = \quad (6)$$
$$-681 \text{ kJ/mole C}; \Delta H \approx -4{,}086 \text{ kJ/mole } C_6H_{12}O_6$$

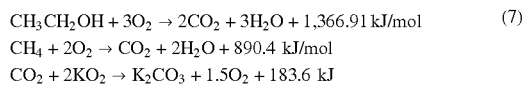
$$CH_3CH_2OH + 3O_2 \rightarrow 2CO_2 + 3H_2O + 1{,}366.91 \text{ kJ/mol} \quad (7)$$
$$CH_4 + 2O_2 \rightarrow CO_2 + 2H_2O + 890.4 \text{ kJ/mol}$$
$$CO_2 + 2KO_2 \rightarrow K_2CO_3 + 1.5O_2 + 183.6 \text{ kJ}$$

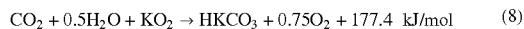
$$CO_2 + 0.5H_2O + KO_2 \rightarrow HKCO_3 + 0.75O_2 + 177.4 \text{ kJ/mol} \quad (8)$$

Figure 8:
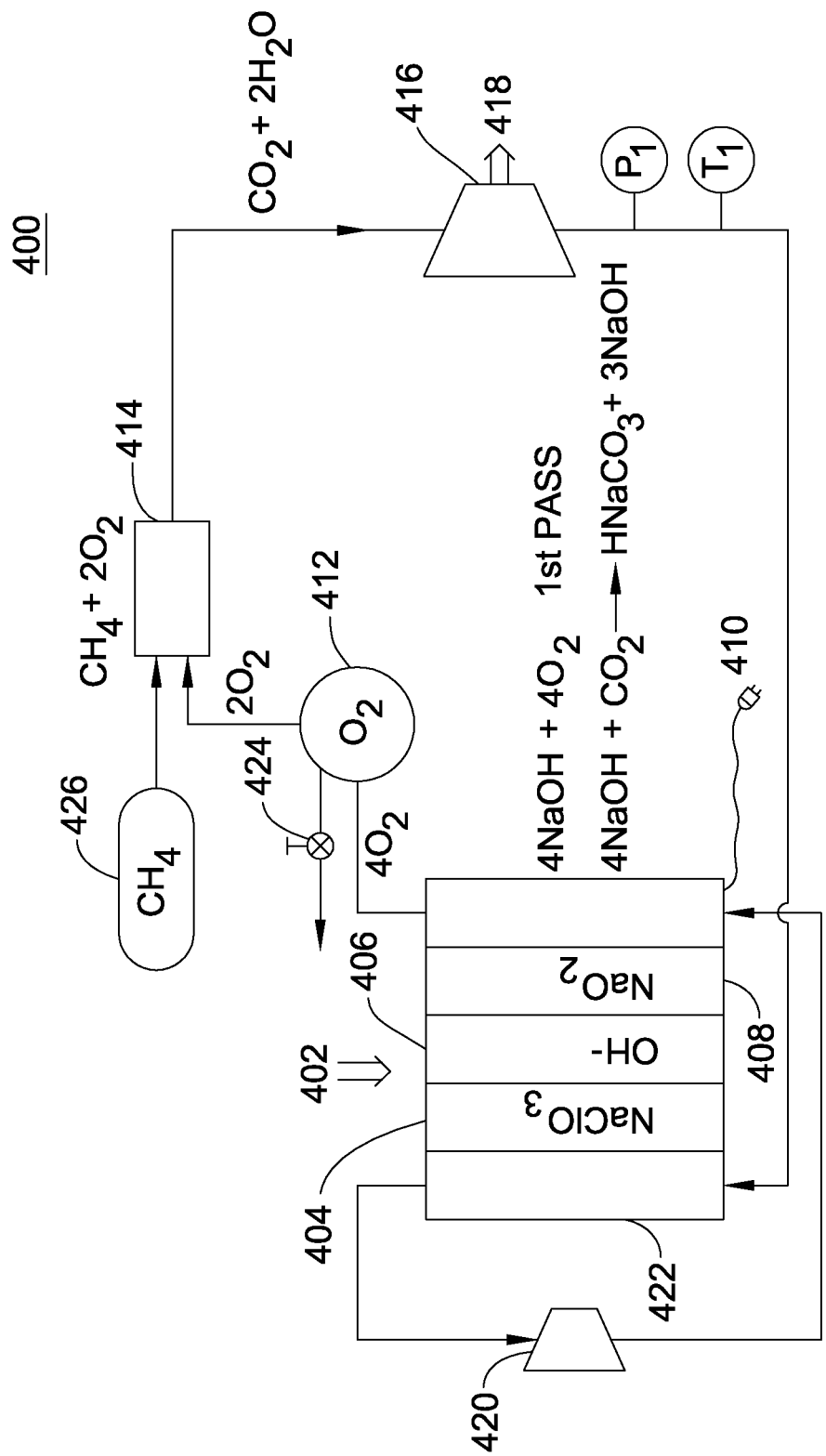
FIG. 8 is a schematic diagram of a system to consume carbon dioxide in a process to generate oxygen for combustion in generation of power according to an embodiment.

FIG. 8 is a schematic diagram of a system to consume carbon dioxide from combustion to be used in creating substantially pure oxygen for combustion according to a particular embodiment. Methane fuel 426 may be normally pressurized in a tank such that no compressor is needed to have it enter system 400 for combustion. Here, mass flow controllers (not shown) may be sufficient for controlling the flow of methane fuel for entering combustion stage 414. According to an embodiment, methane fuel 426 may be derived from biological waste such as, for example, municipal waste or bovine digestive waste. In particular, methane derived from municipal waste, may have had much of its carbon come into being from carbon dioxide fixation from the atmosphere. For example, such municipal waste may comprise food waste, plant waste, or human and animal waste. Methane may also be derived from agricultural animal waste such as chicken liter and bovine-based methane. With bovine-based methane, for example, the animal in question may eat grass and the grass itself has snatched carbon dioxide from the atmosphere to grow. The animal then makes methane from the food, and the methane can be captured and used as a fuel. Similarly, human waste originates from eating food, such as vegetables or milk products, which was created by consuming its carbon dioxide from the atmosphere. While a portion of human food is ultimately deposited as a solid human waste, which upon optimal decomposition conditions, methane can be extracted as methane fuel using well known processes.

In a cold start, methane fuel 426 may react in combustion stage 414 with an amount of stored pressurized oxygen from pressurized tank 412. Combustion stage 414 may comprise any one of several fuel engines for generating heat from combustion of fuel such as, for example, a rotary engine, a reciprocating engine (such as a four piston-cylinder crank shaft engine) and/or the like. However, these are merely examples of systems capable of combusting fuel according to particular embodiments and claimed subject matter is not limited in this respect. In the particular embodiment of FIG. 8, heat from combustion in combustion stage 414 is then directed to turbine 416 for generation of electrical current 418, for example.

As illustrated in FIG. 8, combustion stage 414 may make one mole of carbon dioxide and two moles of steam for every mole of methane. Some carbon monoxide may be produced in small amounts too. In a particular embodiment where combustion stage 414 comprises a rotary engine, combustion may occur faster than a rotor can turn, so that a high pressure is reached a the moment of combustion and that high pressure is relieved by the rotor turning into an expanded volume, creating power. In the embodiment of FIG. 8. residual pressure can make additional power in turbine 416. Alternatively, there need be no turbine 416 and all the power may be produced in combustion stage 414, for example. In yet another alternative, combustion stage 414 may only comprise a combustion chamber such that all the power is produced in turbine 416. Here, an initial pressure in methane 426 and $O_2$ from storage tank 412 may assist in combustion at combustion stage 414. Also, initial pressure in methane 426 and/or $O_2$ from storage tank 412 may be increased by gas compression, prior to combustion.

Since essentially no nitrogen enters combustion stage 414, gases in combustion may reach a very high temperature because there is no nitrogen in the system to absorb any heat. Accordingly, multiple turbines 416 may be used to sufficiently extract power from combustion stage 414 such as, for example, a sequence of multiple turbines such that pressure and temperature of the steam and carbon dioxide reach a point on a water steam diagram that starts to condense a small amount of water (e.g., at temperature $T_1$ and pressure $P_1$). Alternatively, heat generated in combustion chamber 414 may be used to drive an external combustion water/steam cycle power process. In such an embodiment, the heat of combustion may vaporize water that has been increased in pressure by a water pump. Steam generated may be directed through a steam turbine to generate power. A resulting low pressure steam or steam water liquid mixture may then be condensed using river water or air to complete the cycle.

In the presently illustrated embodiment, both the steam and carbon dioxide leaving turbine stage 416 may be captured into a solid at fuel cell 422. In one particular implementation, fuel cell 422 may comprise an alkaline fuel cell. The resulting pressure ($P_1$ of FIG. 8) can be low (e.g., at atmospheric pressure or a vacuum).

In a particular embodiment in which fuel cell 422 comprises alkaline fuel cell (AFC), steam entering such an AFC configuration need only be gas, since the heat of reaction with $NaClO_3$ will make membrane 406 of the AFC hot enough to transport $OH^-$ ions for providing an EMF to generate electricity at terminal 410. Depending on the membrane, this temperature can be as low as 50 to 250 C. Since the reactions are exothermic, to take advantage of heat generated by fuel cell 422 may be at temperatures as high as 250 C. However, material that captures $CO_2$ while producing oxygen such as superoxides and peroxides may become unstable as temperature increases. $KO_2$ may remain a stable solid at temperatures below 420 C.

However, $P_1$ and $T_1$ of FIG. 8 may be quite low, allowing significant power derived in expanders (not shown) following combustion stage 414, since the temperature and pressure at combustion in this embodiment may be higher than that of other engines burning the same fuel while temperature and pressure after the several expansions may be lower.

Carbon dioxide and steam may enter fuel cell 422 to react with cathode 404 to create oxygen on anode 408 from the decomposition of a solid superoxide (e.g., $NaO_2$ as shown), which may be used for combusting fuel with substantially pure oxygen. In particular implementations, some steam may be permitted to condense at a condenser (not shown) if the process being described makes more oxygen than needed to sustain combustion (e.g., for methane as in the presently illustrated embodiment). Also, relief valve 424 may release excess oxygen that is not needed for combustion of fuel 426. Temperature $T_1$ may be determined in a case by case analysis depending on how low a temperature can be tolerated and still react with cathode 404. In one particular embodiment, cathode 404 may comprise $NaClO_3$, for example. However, different materials may be used. Once carbon dioxide and steam react with the $NaClO_3$ cathode, gaseous water may be consumed and, therefore, nearly vacuum, accept for the one mole of carbon dioxide. This low pressure means that the turbine stage 416 may provide an exhaust of carbon dioxide and steam at a low pressure $P_1$, and therefore generation of extra power.

According to an embodiment, although claimed subject matter is not limited in this respect, fuel cell 422 may comprise "stack" of a plurality of cells comprising anode/cathode pairs. Following reaction of the steam with $NaClO_3$ at a cathode, low-pressure remaining carbon dioxide can be directed to a cell in the stack having an alkali hydroxide, for example. In the presently illustrated embodiment, since $CO_2$ may not pass through membrane 406, pump 420 may draw $CO_2$ to react with NaOH to form $HNaCO_3$ to capture $CO_2$ in sodium bicarbonate. In a particular implementation, fuel cell 422 may comprise cells, and a computer control device (not shown) to monitor pressure and temperature in the cells.

According to an embodiment, $CO_2$ can be directed to cells that are not simultaneously in service (e.g., not anodes that are currently in communication with an associated cathode that is transporting gaseous water). Since anodes are positioned opposite the steam that is being transported as $OH^-$ in membrane 406, pressure may tend to build on cathode 408 as oxygen is released from $NaO_2$. By letting pressure build on the anode side by the process of oxygen gas release from oxygen in solid, no compressor 420 may be needed to bring the oxygen up to the same pressure as the compressed methane.

Remaining low-pressure carbon dioxide may be prevented from being redirected to a cell that is building pressure, since it is at low pressure and may cause a back flow. Rather, as a computer system (not shown), for example, turns series and parallel cells on and off to adjust temperature and pressure in the cells, it may redirect low pressure $CO_2$ to a cell that is off, so that the $CO_2$ may simply react with NaOH as shown in the particular example in FIG. 8 and as indicated above. However, $CO_2$ may similarly react with any one of several peroxides or superoxides and claimed subject matter is not limited in this respect.

According to an embodiment, and as illustrated below, $CO_2$ may react, become solid and release some heat, but otherwise cause a low pressure pull to the $CO_2$, therefore the compressor 420 may be implemented solely as a one way valve. Accordingly, instead of a compressor, a simple release of the oxygen that is the only component of the atmosphere above the cell in a sleeping state. In that way, a compressor may be avoided.

Oxygen created by the reaction of $OH^-$ with a superoxide may build in pressure which may be stored in a vessel since more may be made than needed if a helping material such as $NaClO_3$ is used. Also once a storage tank 412 is filled, more steam may be condensed at points of $T_1$ and $P_1$ in system 400. Storage tank 412 may be allowed to reach the same pressure as methane fuel 426 to be mixed and combusted in some type of internal combustion engine, for example, to repeat the cycle. Membrane 406 may be mechanically reinforced to withstand a pressure differential across the membrane 406.

In the presently illustrated embodiment, creating $O_2$ from solid capture of $CO_2$ may not be sufficient to combust methane in system 400. Here, it should be observed that the oxygen to carbon dioxide ratio for methane, requires an additional input of oxygen for combustion from air, since a super oxide material would not generate enough oxygen from the resulting $CO_2$.

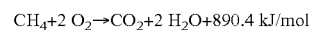

$CH_4 + 2\ O_2 \rightarrow CO_2 + 2\ H_2O + 890.4\ kJ/mol$

$O_2/CO_2 = 2/1$

Heat of reaction of a superoxide reaction in fuel cell 422 may be given partly to the oxygen exiting fuel cell 422, and partly to external cooling 402. According to an embodiment, although claimed subject matter is not limited in this respect, such heat from fuel cell 422 may be used to pre-heat oxygen and/or methane prior to combustion at combustion stage 414. Such preheating may allow methane fresh fuel 426 to flow in some of fuel cell 422 cooling channels, so that as much of the heat of reaction of the superoxide or oxide will remain in the system. This creates more overall power by increasing the maximum temperature at the time of combustion, thereby increasing power in a heat to power transformation.

Table I below shows that substantial electromotive force (EMF) power can be obtained by the movement of the electrons in fuel cell 422 in particular implementations. Such DC power does not follow the Carnot Efficiency limitation and can contribute a large fraction of power to a hybrid engine. Thus, in the case of a vehicle, some of its motor power may be derived from the combustion of methane, heat from the superoxide reaction with carbon dioxide and/or DC electric power of fuel cell 422.

TABLE I

| Anode Reaction | $O_2/CO_2$ | $e-/CO_2$ | Exotherm |
|---|---|---|---|
| $2NaO_2 + [CO_3]^{2-} \rightarrow Na_2[CO_3] + 2\ O_2 + 2\ e-$ | 2 | $2\ e-/CO_2$ | −213 |
| $2KO_2 + [CO_3]^{2-} \rightarrow K_2[CO_3] + 2\ O_2 + 2\ e-$ | 2 | $2\ e-/CO_2$ | −203 |
| $6(NaO_2 + OH- \rightarrow e- + NaOH + O_2)$ | 3 | $3\ e-/CO_2$ | — |

Embodiments described herein may have one or more of the following advantages: (1) minimal compression of gas losses; (2) minimal or no making $NO_x$ nor $SO_x$; (3) little loss of heat to the environment (a small amount in the air cooling, but most going to preheat the methane and the oxygen before combustion); and/or (4) a large range of expansion from very high temperature and pressure to very low temperature and pressure.

As shown above, methane and oxygen start out at high pressure and temperature, since they are both at pressure and preheated, and then react in the absence of nitrogen to inhibit the temperature rise, thus reaching a very high temperature. Since pistons may not move fast enough compared to combustion, an engine may reach a very high internal pressure (albeit in a small safe volume), which is then relieved to create power in one or more isentropic expansions, starting in the internal combustion portion of the engine itself. Since high internal temperatures and pressures may be reached, combustion stage 414 may use special materials that are able to withstand high pressure while at high temperature my be used, for example Hastelloy steel, Titanium alloy T1-6A1-4V, Molybdenum or Tantalum, Inconel 600, or a non-brittle ceramic engine, just to name a few examples.

An anode may comprise depleted superoxide or peroxide in the form of $Na_2CO_3$ (as in the particular embodiment of FIG. 8), NaOH, HNaCO₃. However, other compounds capable of capturing carbon dioxide while generating oxygen may also be used without deviating from claimed subject matter. An AFC may be made in such a way that individual cells can be removed so that new cells capable of sequestration can be introduced.

Densities of NaCl, Na₂CO₃, and NaOH are is 2.163, 2.533 and 2.130 g/mL, respectively. In contrast, octane has a density of is 0.703 g/mL. The molecular weight of NaCl is only 58.5 compared to octane at 114; therefore the sequestration cells may require substantially less volume than equal amount of moles of fuel conventionally used in cars. Such a new power device may operate at higher temperatures as illustrated above, and thus higher efficiency. The new device will may take advantage of the EMF in a fuel cell configuration.

According to an embodiment a membrane in a fuel cell may be 8-12 M KOH, which is not very expensive. But the cells could be designed in such as way that only the NaCl, HNaCO₃ and NaOH are shed from the cell and new NaClO₃ and NaO₂ (or Na₂O₂ or KO₂ or K₂O₂) is coated back on the anode and cathode. According to an embodiment, an anode in a fuel cell, such as an AFC, can be made of Pt/C, which has too much value to be land filled and furthermore will be attacked by the superoxide or peroxide.

Superoxide has been known to be used as a semiconductor. [Journal of Chemical Physics, Vol 63, No. 6, 15 Sep., 1975]. Also, superoxide may be implemented in physical contact with an anode. Such superoxide may be enhanced as an anode by being a in two phase solid mixture with another material that conducts better than the superoxide, but is not oxidized by the superoxide.

Figure 10:
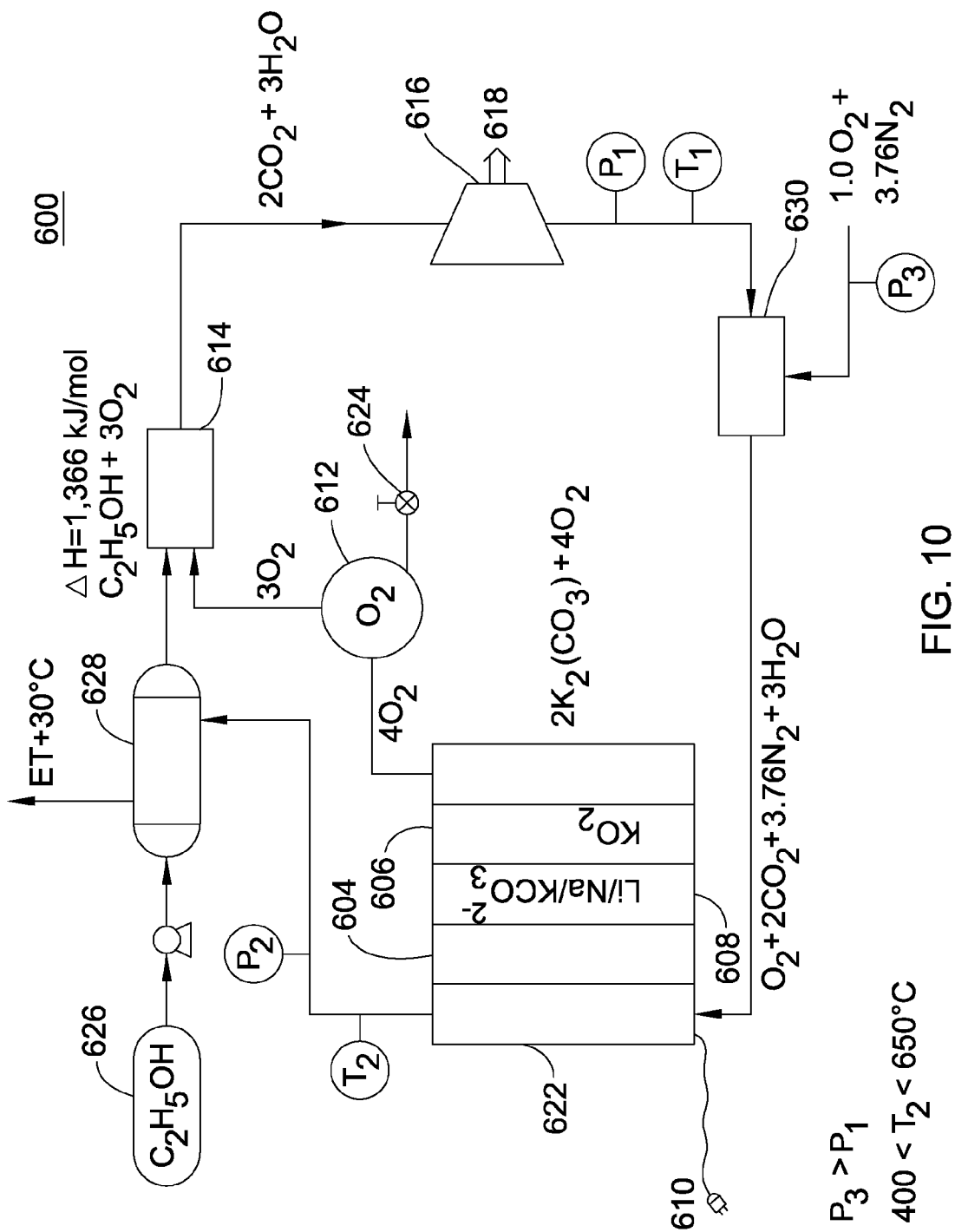
FIG. 10 is a schematic diagram of a system to consume carbon dioxide to generate heat to assist in generation of power according to an alternative embodiment.

The particular embodiment of FIG. 10 comprises a system 600 for the combustion of ethanol. In this particular example, a molten carbonate fuel cell (MCFC) is used. However, other types of fuel cells may be used. In this particular implementation, NaClO₃ is used, but oxygen may assist in transporting carbon dioxide across membrane 608. Accordingly, oxygen may be introduced from the atmosphere. Accordingly, there may be some nitrogen brought into cathode 604 of fuel cell 622. However, such nitrogen may be exhausted back to the atmosphere and not be involved with the combustion process. This nitrogen may assist in will help to pick up the heat of reaction of the sequestration reaction (for example, 2 KO₂+ CO₂→K₂[CO₃]+1.5 O₂) and then deposit that heat into a preheating of the liquid fuel, such as ethanol (e.g., derived from crops).

Ultimately the nitrogen introduced may be discarded to the atmosphere along with some water that is a mixture of liquid water and gaseous water, depending on the environmental temperature shown as exhaust steam ET above vaporizer and preheater 628. In one embodiment, the lower the temperature of the exhausted nitrogen and water, the better the overall efficiency of the system.

FIG. 10 is a schematic diagram of a system 600 which combusts ethanol according to a particular embodiment. Liquid ethanol 626 may be derived from crops that were grown and harvested in such a way that the ethanol has in balance removed carbon dioxide from the atmosphere. However, ethanol derived using other processes also may be used. Ethanol 626 may be pumped into vaporizer and preheater 628 at various pressures. In at least one embodiment, power to pump ethanol 626 may require little power to operate compared to the power produced in system 600.

A mole of vaporized ethanol may then combusted with three to four moles of substantially pure oxygen in many ways. In one embodiment, a mixture of ethanol and oxygen may be combusted in an internal combustion engine of several forms such as, for example, a piston and cylinder array of 2, 4, 6, 8 or more cylinders that are attached in a crank shaft systems as common internal combustion (IC) engines operate, or in a rotary engine. Alternatively, ethanol 626 may be combusted first and immediately sent through a gas turbine such as turbine 616. In one particular embodiment, ethanol 626 may include water, thus allowing turbine 616 to be a steam turbine. However, these are merely examples of systems that may be used to convert combustion of ethanol into power according to particular embodiments and claimed subject matter is not limited in this respect.

Combustion of ethanol may also be used as an external combustion source to drive a water/steam power cycle. Here, heat created in combustion stage 614 is used in part to vaporize water which was initially pumped up as a liquid in pressure. Pressurized and heated steam generated by the heat of combustion stage 614 is then directed through gas turbine 616 to generate power. Following turbine 616, a resulting low pressure steam is then condensed to start the power cycle over. Following combustion stage 614, there may still be useful energy in the exhaust gases which may be further expanded in a series of expanders or turbines at turbine 616, such as Scroll expanders, and any type of expander that is both efficient and can tolerate the onset of water condensation.

In one particular embodiment, pressure $P_1$ following expanders or turbines 616 may be around 14.7 psi while temperature $T_1$ may be around 100 C. However, other lower or higher pressures and temperatures are possible without deviating from claimed subject matter. A condenser (not shown) may initially pre-cool process gases so as to condense steam to water with the incoming atmospheric air and or excess air from the environment, before eventually the equivalent of one mole of oxygen for every two moles of carbon dioxide is added to the process stream from atmospheric air at mixer 630, along with an unavoidable amount of nitrogen of about 3.76 moles. It should be noted, however, that some of the steam may have been condensed and removed as liquid water before mixer 630 and after turbines or expanders 616.

A resulting oxygen/carbon dioxide mixture (with other constituents) may enter cathode 604 of fuel cell 622. In the particularly illustrated embodiment, fuel cell 622 comprises a molten carbonate fuel cell (MCFC) with cathode and anode reactions as follows.

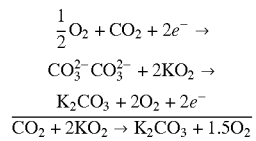

In alternative embodiments, however, fuel cell 622 may be replaced with an alkaline fuel cell system if a cathode has intimately in contact with it had a sufficient amount of NaClO₃ which would react with the CO₂ to form $[CO_3]^{2-}$. In this particular embodiment, a reaction of NaClO₃ with CO₂, may be represented as follows:

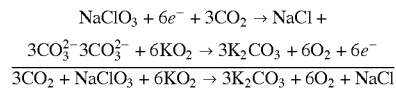

Figure 9:
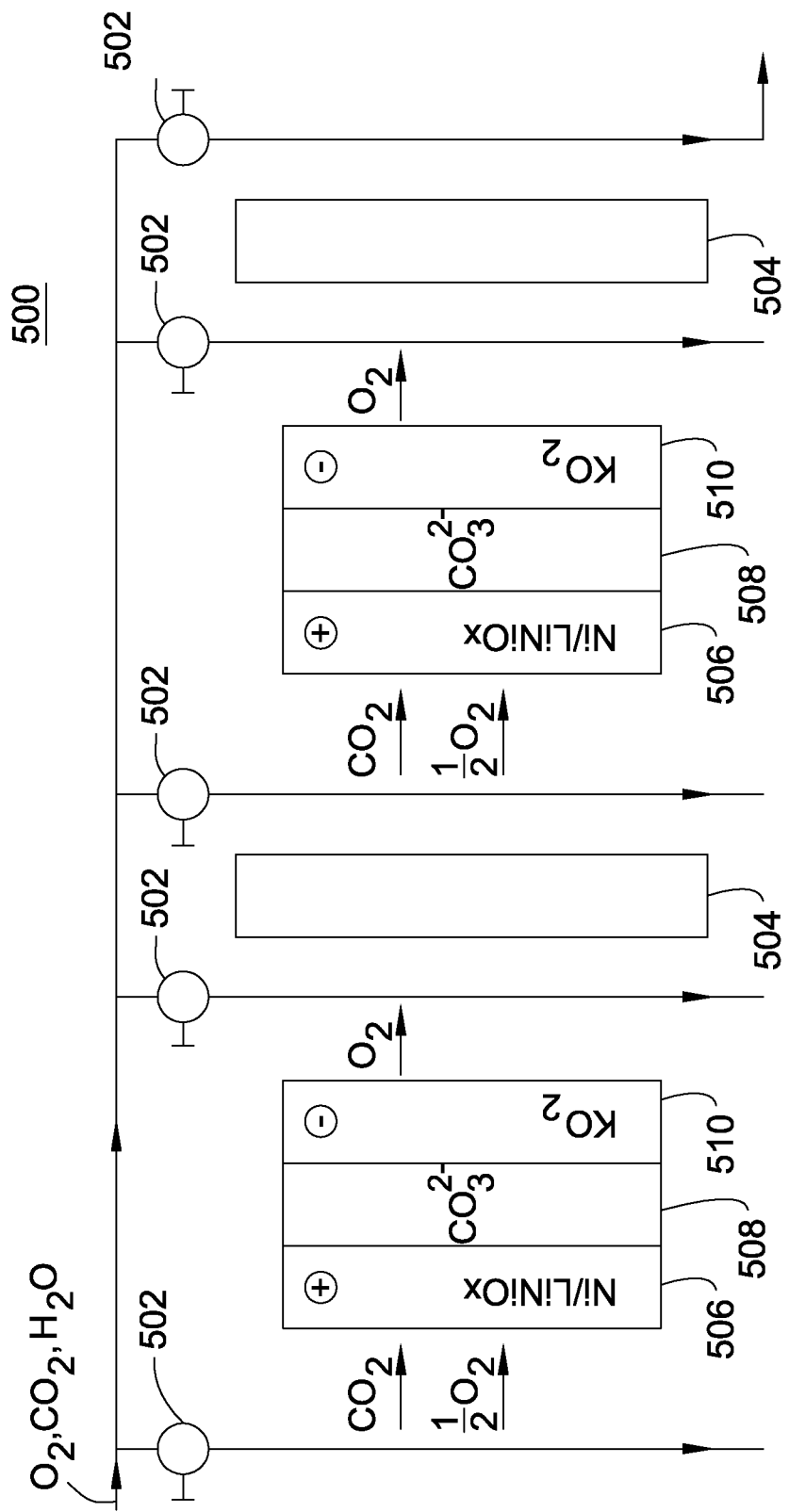
FIG. 9 is a schematic diagram of a fuel cell comprising an anode comprising a superoxide according to an embodiment.

If NaClO$_3$ is used there may be no need to bring in air at mixer 630. Without adding atmospheric air, temperature T$_1$ and pressure P$_1$ may be allowed to fall lower, allowing for more steam condensation prior to fuel cell 622. In the particular embodiment where atmospheric air is received at mixer 630, however, oxygen and CO$_2$ may react at cathode 604 to form [CO$_3$]$^{2-}$, which in turn transverses membrane 608, which may be made of a mixture of Li/Na/K carbonate in the presently illustrated embodiment. Membrane 608 may be heated to 400 C or more to be mobile, so the heat of reaction of the overall MCFC may be used to bring the MCFC to temperature. For start up something else can be used like a start battery, or the diversion of the combustion gases first through the MCFC in interstage heater/coolers (e.g., coolers 504 as shown in FIG. 9, for example). This may be performed at the start of an MCFC to bring it to temperature. The temperature of the MCFC may then be cooled somewhat with interstage cooling from the atmospheric air. However, incoming process stream to cathode 604 may be cool, and heat may exit fuel cell 622 by the hot gases at point T$_2$ and P$_2$ as hot oxygen leaves anode 606 for storage in tank 612. As carbonate ions move through membrane 608, a resulting EMF may provide electricity to terminal 610.

As carbonate ions transverse an MCFC membrane they may reach to the anode side, which will contain some solid superoxide or solid peroxide or a mixture of the two to react with and create sufficient amount of oxygen to complete the cycle of combusting the next amount of ethanol. If only superoxide is used, as shown in one particular example as KO$_2$, then excess oxygen may be created. Some of this excess oxygen could be stored in storage tank 612 at pressure to be used in cold starts, for example. So long as excess oxygen is in storage tank 612, more than three moles of O$_2$ going to combustion stage 614 (since it is difficult to have an exact combustion of the exact molar amount of oxygen per mole of ethanol). Since ethanol contains some oxygen and if one mole extra of oxygen is added to combustion stage 614, coking can be deterred. Such oxygen may tend to burn the coke. Since excess oxygen can be added to combustion stage 614 as just described, some unburnt oxygen may come around the expansion system to again meet mixer 630 and thus increase the concentration of oxygen in process stream to a number greater than one mole O$_2$ to two moles CO$_2$. Finally, while not shown in FIG. 10, a small amount of oxygen may exhaust the system following vaporizer and preheater 628. Here, the amount of oxygen exhausted may be dependant on how much oxygen is chosen to be stored in storage tank 612 as opposed to consumed at combustion stage 614.

At point pressure P$_1$ and temperature T$_1$, if some of the steam is condensed by a pre-cooling of air in for example the tubes of a shell and tube condenser with the process stream in the shell, pressure in the shell could drop below 14.7 psi, since some of the gas may be converted to liquid. However, since the whole process from the exit of the expansion turbines 616 to exhaust ET is open to the atmosphere at the exhaust in particular embodiments, air mixed at mixer 630 may bring the process back to approximate atmospheric pressure. In places that the atmospheric pressure is low, overall performance of the device may be improved in efficiency since the delta pressure across the expansion system may increase.

According to an embodiment, ethanol 626 may be derived from crops. Either starch or cellulosic ethanol is one of the possible fuels to be used. Using ethanol derived in this manner may remove a substantial amount of carbon dioxide from the air during the growth of plant life consumed in producing the ethanol. Although some crops do require the emission of some carbon dioxide from the farming equipment, other perennial crops such as switchgrass require little to no fossil fuel burning to tend to their growth. Much cellulosic ethanol would be wasted if not used for fuel, and other perennial energy crops remove more carbon dioxide than they put back in the air from processing equipment if the farming is done properly, in a sustainable-minded manner. Combustion of plant-derived ethanol may be expressed as follows:

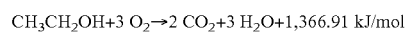

$$CH_3CH_2OH + 3\ O_2 \rightarrow 2\ CO_2 + 3\ H_2O + 1{,}366.91\ kJ/mol$$

$$O_2/CO_2 = 3/2$$

As illustrated above according to a particular embodiment, oxygen needed per CO$_2$ produced is expressed as O$_2$/CO$_2$. Not only is carbon dioxide captured in this process, oxygen and power are created during that carbon dioxide capture process. Accordingly, it is observed here that the amount of oxygen produced by carbon dioxide capture may be equal to or greater than the amount of oxygen needed to burn combust fuel to the CO$_2$ that in-turn makes the oxygen.

While FIGS. 8 and 10 are directed to using methane and ethanol as combustion fuel, it should be understood that features and aspects of these systems may be applied to the use of other fuels without deviating from claimed subject matter. Without significant modification of such systems, for example, different types of combustion fuels may used in a system to generate combustion heat and carbon dioxide where such combustion heat is used for generating power, where carbon dioxide generated in this combustion enables a reaction for generating additional heat, and where additional heat is then applied to assist in increasing the generation of power in an overall heat to power transformation.

Ethanol may be manufactured from sugars by, for example, include extra oxygen atoms (sugars are one oxygen per carbon and ethanol is one oxygen for every two carbons). According to an embodiment, sugars may be derived using known processes from plant material including biomass, dry plant material from sugar cane, barley, soybeans, rapeseed, cotton seed, corn oil, beef tallow, microalgal mass culture, switch grass, corn stover, wheat straw, rice hulls and/or urban waste wood material, just to name a few examples. Sugars may also be manufactured using known processes from animal waste such as pig manure and/or chicken litter.

According to an embodiment, sugars (such as Xylose, Glucose and Cellobiose) may be used as fuels for combustion as they carry much of their own oxygen for a combustion reaction in a closed-circuit combustion process as illustrated above with reference to FIGS. 8 and 9. In this particular implementation, however, sugars consume six moles of O$_2$ and make six moles of CO$_2$ for each mole of fuel combusted. In contrast, gasoline consumes 12.5 moles of O$_2$ to makes eight moles of CO$_2$ for each mole of fuel combusted. Accordingly, inlet oxygen needs of combusting gasoline and the outlet CO$_2$ sequestration needs of gasoline are much higher than those of combusting sugars. If CO$_2$ is used to react with an oxygen generating CO$_2$ capturing material as illustrated above, the amount of CO$_2$ created compared to the amount of O$_2$ consumed is out of balance for gasoline and substantially in balance for sugars. In particular embodiments, sugars are technically an effective fuel to use if the oxygen is made on-board and the carbon dioxide is captured on-board, as in a closed-loop system as illustrated above with reference to FIGS. 8 and 10. Gasoline, however, would typically require 33% more capture material for performing the same work performed by using glucose as a fuel, for example. Gasoline may also consume 2.0833 additional moles of oxygen, which may be difficult to generate from an on-board source. In this way, sugars (e.g., monosaccharides) may be an effective choice for fuel for a closed-loop combustion system according to embodiment based on the natural amount of oxygen generated by an oxygen generating $CO_2$ capturing material comprising a solid superoxide, such as $KO_2$, with resulting exhaust $CO_2$.

Accordingly, sugars have significant advantages for use in closed-circuit combustion in vehicles over use of other types of fuels such as gasoline since they require less oxygen and make less $CO_2$. Also, in particular embodiments carbon in sugars is derived from plants that had taken $CO_2$ from atmosphere recently while carbon in gasoline typically comes from carbon that was sequestered out of the atmosphere in a pre-historic era—$CO_2$ from past eons on the Earth, which have contributed to Global Warming. While gasoline carries tremendous enthalpy, it is possible to have similar kJ/Carbon using the heat of carbon capture (the reaction of $CO_2$ with a sequestration material).

Solid superoxide, semi-peroxides (for example, $Na_2O_{2.68}$), and peroxide reactions, as discussed above according to particular examples of reactions with oxygen generating capturing materials as implemented in a closed-loop combustion system according to particular embodiments, can create oxygen that may be used for combustion by their reaction with the "exhaust" $CO_2$ or self-decomposition. As illustrated above in particular examples shown in FIGS. 8 and 10, a closed-circuit power generation system may employ $CO_2$ exhaust capturing material to create oxygen to send back to the inlet of the combustion. Such a process may be performed without using a fuel cell system as illustrated below with reference to FIG. 12. If such material also captures $CO_2$ it is performing two functions in one material. If such material also performs an exothermic carbon dioxide capture, it may be performing three functions in one material. If such a material generates pure oxygen without using a power consuming ASU device, then that material is performing four functions in one material. Accordingly, a particular embodiment is directed to systems and methods for closed-circuit combustion of a carbohydrate by using an exothermic, $CO_2$ capturing, that creates oxygen to close the circuit of the combustion process.

According to an embodiment, sugars such as Xylose, Glucose and Cellubiose may be created in the pretreatment of carbohydrates, such as starch and cellulose. Grinding of starch materials from plants and chemical/enzymatic pretreatment is the first steps in ethanol processes, such as the sugarcane bagasse process from Celunol Process. Here, such a pretreatment process may have between 82 to 96% efficiency, depending on the process, some of which include any of the next list followed by hydrolysis: dilute acid treatment, $SO_2$ steam explosion, AFEX, ARP, and lime treatment.

To make a carbohydrate fuel according to a particular embodiment, a process to make ethanol may be terminated at a point where sugars are created, since continuing the process to create ethanol may waste energy content (e.g., liquid ethanol production from solid glucose releases 68.9 kJ/mol Glucose) and puts $CO_2$ in the atmosphere (see equation below showing two moles of $CO_2$ released to the atmosphere for every one mole of glucose created from cellulose).

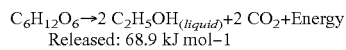
Released: 68.9 kJ mol−1

Cellulose may be processed in supercritical water in a non-isothermal tubular reactor, entering at room temperature and exiting at temperatures in the range of 200-400° C. Products may include, for example, oligosaccharides, monosaccharides, and other small molecules. As pressure is increased, the monosaccharide yield may increase. Here, the yield at the highest pressure of 7500 psig may be about 60% at 280° C. with a reactor residence time of less than one minute. [Taiying Zhang, poster, 2006, AICHE meeting.]

As pointed out above, using carbohydrate based fuels such as sugars for combustion may be more effective at sequestering $CO_2$ than using gasoline, diesel, fuel oil or coal as a fuel for combustion. Carbohydrates have their origin in the photosynthesis of plants. By the process of photosynthesis, $CO_2$ may be captured from the atmosphere without power input (from fossil fuels or other human effort). Two issues with taking $CO_2$ from the atmosphere are that $CO_2$ comprises a very small percentage of atmospheric gases and synthetically converting $CO_2$ to a carbohydrate such as cellulose or lignin is thermodynamically unfavorable (e.g., requiring heat input). Using plant-life derived carbohydrates allows for an overall Global sequestration process that is both power producing and $CO_2$ negative.

Methanol is another fuel that may be combusted in a closed-loop combustion system and may be produced in a manner that removes carbon dioxide from the atmosphere. Here, combustion of methanol (e.g., derived from biological means) in the aforementioned closed-loop combustion system may consume an extra oxygen input since solid super oxide materials may not produce enough oxygen by the reaction with methanol's $CO_2$ exhaust as indicated below:

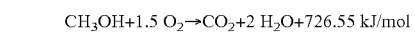

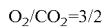

Butanol derived from carbon capturing technology could be used with extra oxygen as well as indicated below:

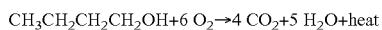

According to an embodiment, synthetically produced Fischer Tropsch hydrocarbons, which were made by a method that has a net removal of carbon dioxide from the air is also a viable fuel for combustion according to embodiments of a closed-loop combustion system illustrated above. This can be facilitated by a Fischer Tropsch thermal section to a biorefinery plant; for example the heavies made, mostly from Lignin in a biorefinery that produces ethanol, can be made into Syn Gas ($CO+H_2$) and then converted catalytically to gasoline or diesel fuel. Since the carbon source would have derived from plants farmed in a way that removed more carbon dioxide from the air than it put into the air, this may be used as a transportation fuel.

As shown below, Fischer Tropsch Fuel From a biorefinery that had a source, which removed $CO_2$ from the air may consume more oxygen than oxygen generated by the reaction of solid superoxide with carbon dioxide created from combustion as follows:

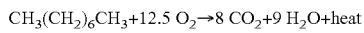

In particular embodiments illustrated herein, although claimed subject matter is not limited in this respect, superoxides may provide a means of capturing $CO_2$, creating oxygen and creating forms of power. Such forms of power may include, for example, both the exothermic heat of reaction of the carbon capture process or an electrochemical cell power (fuel cell), as illustrated above. In particular embodiments, a solid superoxide such as, for example, $KO_2$, $CsO_2$, $RbO_2$, $NaO_2$ and/or other solid superoxides may provide a means for capturing carbon dioxide that is created by the burning of fuel (e.g., hydrocarbon or carbohydrate fuels) in an internal combustion engine (rotary or reciprocating), or external steam engine, or internal turbine process just to name a few examples of combustion processes.

In a particular embodiment, carbohydrates such as monosaccharide can be combusted with high concentration oxygen derived from the reaction of $KO_2$ with $CO_2$, for example. The heat from combustion of the monosaccharide along with the heat of reaction of $KO_2$ with $CO_2$ can be used as a external combustion heat source to drive a water/steam power cycle, for example. Potassium may be found inexpensively and in abundance from several sources such as, for example, in both ocean brine and sylvite, carnallite and langbeinite deposits. Additionally, sodium and potassium are in high abundance (2.6 and 2.4%) in the lithosphere.

According to an embodiment, superoxides and/or peroxides may separate oxygen from nitrogen in air. Accordingly, no use of power consuming air separation unit (ASU) may be necessary. When $2KO_2/K_2O_2$ and $C_nH_{2n}O_n$ are fuels instead coal and air, for example, advantages may include, reduced or eliminated need for air compression, more heat than coal, and a convenient method of $CO_2$ collection and transport.

According to an embodiment, carbonate regeneration to carbon dioxide and potassium oxide may consume heat, but also may be brought to completion by high temperature and carbon dioxide removal, as indicated below.

$$K_2CO_3 + \Delta H_1 \rightarrow K_2O + CO_2(\text{to sequestration})$$

$$\Delta H_1 = +391.5 \text{ kJ/Mole}$$

$$\frac{[K_2O]y_{CO_2}P}{[K_2CO_3]} = \text{Exp}\left(-\frac{\Delta G}{RT}\right)$$

(Facile at high $T$ and low $P$.)

In one embodiment, conversion of potassium oxide back to superoxide and peroxide may be accomplished in a Gibbs Energy favorable process as follows:

$$K_2O+O_2 \rightarrow KO_2 + \tfrac{1}{2}K_2O_2 + \Delta H_2$$

(Process is several steps.)

$$\Delta H_2 = -134 \text{ kJ/mol}$$

$$\Delta G_2 = -133.9 \text{ kJ/mol}$$

Analogous materials, such as, lithium carbonate/hydrate may have a less favorable, positive $\Delta G$, for example, returning Li2O to LiO2/½Li2O2 as illustrated as follows:

$$Li_2O+O_2 \rightarrow LiO_2 + \tfrac{1}{2}Li_2O_2$$

$$\Delta G = +48 \text{ kJ/mol[Ref]}$$

Returning potassium carbonate/hydrate to $KO_2+\tfrac{1}{2}K_2O_2$ may consume air, but may avoid $NO_x$ formation (a concern of high temperature air oxidation). In a particular embodiment, monosaccharide may contain substantially a precise amount of oxygen needed to allow for $KO_2+\tfrac{1}{2}K_2O_2$ oxidation. There are several valid variations of this reaction, including initial endothermic gasification to $CO/H_2$, and formation of bicarbonate. The reactions illustrated below may provide favorable heats of reaction per carbon and per $C_6H_{12}O_6$.

$$nKO_{2(s)} + \frac{n}{2}K_2O_{2(s)} + C_nH_{2n}O_{n(aq)} \rightarrow nK_2CO_3*H_2O$$

$$\Delta H = -681 \text{ kJ/mole C}; \quad \Delta H \approx -4{,}086 \text{ kJ/mole } C_6H_{12}O_6$$

According to an embodiment, sodium metal may be made by electrolysis of fused salts or of low melting eutectics such as $CaCl_2+NaCl$. Since the electrolysis power can in principal be derived from sustainable energy, such as wind, geothermal or nuclear, in principle, the superoxides can be made with no net increase of $CO_2$ into the atmosphere.

Any one of several sodium and potassium oxides can be used to generate extra heat in a monosaccharide external combustion process to drive a water/steam power cycle and sequester $CO_2$ generated from combustion of the monosaccharide, for example. Regarding use of potassium super oxide in a fuel cell power configuration, $KO_2$ has certain collective electronic properties [Journal of Chemical Physics, Vol 63, No. 6, 15 Sep., 1975]. It is known that at above 250 K, $KO_2$ can be a semiconductor with an activation energy of 1.3 eV.

In particular embodiments, a superoxide and/or peroxide may be implemented at an anode of a molten carbonate fuel cell (MCFC). Here, reactions underlined below show the anode reaction and therefore the amount of oxygen that could be gleaned if a molten carbonate fuel cell (MCFC) was used.

$$\tfrac{1}{2}O_2+CO_2+2\ e- \rightarrow [CO_3]^{2-}$$

$$2\ NaO_2+[CO_3]^{2-} \rightarrow Na_2[CO_3]+2\ O_2+2\ e-$$

$$2\ NaO_2+CO_2 \rightarrow Na_2[CO_3]+1.5\ O_2$$

Enthalpy: $-1127.44-[-393.5-2(260.2)]=-213$ exothermic

Entropy: $-1044.1-[394.4-2(218.4)]=-212$ (favorable)

$$\tfrac{1}{2}O_2+CO_2+2\ e- \rightarrow [CO_3]^{2-}$$

$$2\ KO_2+[CO_3]^{2-} \rightarrow K_2[CO_3]+2\ O_2+2\ e-$$

$$2\ KO_2+CO_2 \rightarrow K_2[CO_3]+1.5\ O_2$$

Enthalpy: $-1167-[-393.5-2(284.9)]=-203$ exothermic

Entropy:=(favorable)

$$NaClO_3+6\ e-+3\ H_2O \rightarrow NaCl+6\ OH-$$

$$6(NaO_2+OH- \rightarrow e-+NaOH+O_2)$$

$$6\ NaO_2+NaClO_3+3\ H_2O \rightarrow 6\ NaOH+6\ O_2+NaCl$$

An AFC configuration may produce enough oxygen per $CO_2$ to use ethanol as a fuel in a closed-loop as illustrated above in FIG. 10. Here, with no exhaust, $CO_2$ from ethanol combustion is combined with a fuel cell for capturing power.

According to an embodiment, sodium superoxide ($NaO_2$) may provide a readily available carbon capture substance since it can be made from sustainable energy of electrolysis powered by wind, nuclear or geothermal power and/or the like.

According to an embodiment, potassium superoxide is also good candidate as an oxygen generating $CO_2$ capturing material, since the potassium superoxide is more thermally stable than the sodium counterpart and it has a history of being used in breathing equipment. Using fuel cells with the $CO_2$ capturing and $O_2$ generating properties of superoxides and/or peroxides enables systems for combustion of carbon based fuels that are more efficient than traditional air oxidizing combustion processes by creating increased power per $CO_2$ captured than normal open Brayton Heat to Power Cycles make per $CO_2$ exhausted. Accordingly, in certain implementations, the amount of $CO_2$ needed to be captured is reduced in comparison with external combustion of fossil fuels, such as fuel oil and coal in an Open Brayton Cycle.

According to an embodiment $KO_2$ may be formed from raw material potassium salts (i.e. sylvite) are stable, and often contain chloride, sulfate or nitrate anions. These anions themselves can be sequestered into various solid and rock materials. To make an overall process of not putting carbon dioxide into the air, a process for making the superoxide and the sequestering of the anions may be implemented in a manner that avoids emitting $CO_2$ to the air. Additionally, such a process may also avoid introduction of highly electronegative anions such as chloride in the air or water.

In a particular embodiment, superoxides may be produced in a carbon neutral, environmentally friendly manner, such as in a stationary large plant. Here, emissions of $CO_2$ may be more easily controlled than $CO_2$ emissions from portable power systems, such as transportation vehicles, for example. In one implementation, sodium peroxide may be made by the electrolysis of sodium chloride, creating sodium metal and chlorine. The $Cl_2$ (or sulfate or nitrate anions or other halogen) gas may be sequestered for other uses. Presently, with the abundance of $CO_2$ created in the world, there is no market to sell the $CO_2$. However, markets for the sale and purchase of other materials such as $Cl_2$ remain. A few examples follow, but it should be noted that many minerals, containing silica and alummina, and early transition metals like W, Ta, Zr, Ti, V, Cr, Mo and their metal oxides, can easily add chlorides into their structures. Products can contain either a harmless nitrogen gas, oxygen gas, water, or a sequestered solid only.

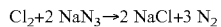
$Cl_2 + 2\ NaN_3 \rightarrow 2\ NaCl + 3\ N_2$

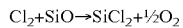
$Cl_2 + SiO \rightarrow SiCl_2 + \tfrac{1}{2}O_2$

$Cl_2 + Si_{(s)} + O_2 \rightarrow Cl_3SiO(SiOCl_2)_n SiCl_3$ where $n=1$ to 4

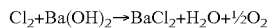
$Cl_2 + Ba(OH)_2 \rightarrow BaCl_2 + H_2O + \tfrac{1}{2}O_2$

$nCl_2 + ZrO_x \rightarrow ZrCl_{2n}O_{(x-2n)} + \tfrac{1}{2}n\ O_2$

The indication is that it would be possible to sequester $CO_2$ with superoxides and peroxides that were themselves produced by sustainable energy and the chlorine by-product would be either used industrially or sequestered itself into solid forms with harmless gases or no gases emitted. The environmental balance if crop-based liquid fuels are used for the engine and sustainable energy is used to make the superoxide or peroxide is that $CO_2$ would be removed from the Earth's atmosphere, and add nothing toxic in return.

If a $2KO_2/K_2O_2$ mixture is used to capture $CO_2$ from combustion and generate high concentration oxygen, as described previously, the resulting carbonate can be regenerated to $2KO_2/K_2O_2$ without generation of any $Cl_2$. Here, if $Cl_2$ is reused several times for carbon capture and then regenerated, the starting cost of making $2KO_2/K_2O_2$ becomes more and more insignificant.

Resulting carbonates can be placed underground, in disused coal mines or empty sections of other mines. Alternatively, upon regenerating $2KO_2/K_2O_2$, the $CO_2$ that removed from the carbonate can be sent to underground brine water or underground salt deposits. In either case, solid land fill or atmospheric pressure $CO_2$ gas sent to underground brine water, there is no requirement of underground pressure worthy geological cavities; the sequestration can happen at or near atmospheric pressure.

Besides solid superoxides and peroxides, other types of solid materials can be used to capture $CO_2$ in vehicles and power plants. Here, for example, mineral sequestration of $CO_2$ is currently under study in the case of coal-fired power plants. Many of these minerals are easier to produce, or just get from the ground and then process, as compared to $KO_2$, for example. But these other materials are normally not as exothermic in reaction with $CO_2$ compared to $KO_2$, the naturally occurring minerals normally carry more weight per unit $CO_2$ absorbed compared to $KO_2$ and they do not create oxygen, which is a highly beneficial trait of the solid superoxides. Below are shown the Serpentinite reactions where the starting materials are substantially heavier than $KO_2$ (MW=71) verses, $Mg_2SiO_4$ (MW=140.6). In certain implementations, weight may be a significant criterion if sequestration is to be applied to mobile transportation engines. For example, Mg-Olivine would weigh twice $KO_2$.

Serpentinite Reactions:

Mg-Olivine+Water+Carbon dioxide→Serpentine+ Magnesite+Silica

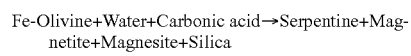
Fe-Olivine+Water+Carbonic acid→Serpentine+Magnetite+Magnesite+Silica

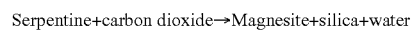
Serpentine+carbon dioxide→Magnesite+silica+water

In particular implementations, superoxides and/or peroxides can be formed into a fuel cell system, and thus greatly increase the power per weight of the engine, by adding both a fuel cell energy component, and a heat of reaction component from the reaction of $CO_2$ with $KO_2$, for example, to processes for generating power from combustion of fuel, which may be vegetation derived fuel, such as crop-derived ethanol or monosaccharide.

According to an embodiment, and as illustrated above an MCFC configuration may be used in a closed-loop power system and may employ any one of several oxidation resistant anodes. Here, $KO_2$ may decompose at 425±2° C. in a vacuum. However, if the atmosphere above the superoxide is substantially oxygen, it may be stable to higher temperatures. Also additives can be used to improve its stability. The onset of mobility of carbonate ions in the best Li/Na/K carbonate membranes is in the range of 400 C. These materials may have the formula Li/Na/K 43.5/31.5/25% with $[CO_3]^{2-}$. As this approaches the stability range of potassium superoxide, pressure above atmospheric pressure above the $KO_2$ may be used to keep the $KO_2$ from decomposing at more typical MCFC temperatures above 500 C. High oxygen pressure may in turn place the anode in an oxidizing environment. While oxidation at the anode may hinder transportation of electrons, several anode materials may address this effect.

Discussed below are anode materials that may be suitable for oxidizing environments such as is to be expected in the presence of superoxides, peroxides and oxygen in the atmosphere. Here, such anode materials may be made into a two-phase mixture with the superoxide solid. Construction of the mixture may be processed in such as way as to avoid or minimize the reaction/decomposition of the superoxide. Such a two-phase mixture may also be porous to allow the liberated oxygen to leave the system.

Anodes materials exist that are stable in oxidizing situations exist for many reasons: (1) anodes are exposed to air at temperature upon start-up shut down of fuel cells, (2) electrochemical processes for the creation of chlorine or other electrochemistry (aluminum electrolysis) has had to address the issue of oxidation resistant anodes, and (3) reforming of hydrocarbons at the anode involves a large amount of steam, sometimes oxygen and sulfur. Accordingly, therefore researchers have been looking to oxidation stable anodes.

Composites composed of oxides of strontium titanate and ceria, which have been shown to provide excellent oxidation resistance (and even sulfur tolerance) [Dr. Olga Marina].

These materials have been developed for SOFC fuel cells, and perform better at higher temperatures than would be available in an AFC, but would likely have suitable performance in a MCFC.

Lanthanum chromites substituted with strontium La[1-x]Sr[x]CrO[3], gadolinium-doped ceria (Ce[0.9]Gd[0.1]O[2]), praseodymium oxide, molybdenum oxide [FOULETIER J.]. Ni/LiNiOx, may provide good anode materials. As with strontium titanate and ceria these Lanthanum chromites would probably work better in a MCFC as opposed to an AFC.

Pt/C and Pt—Pd/C; Pt—Au/C may also be used as anodes, even at AFC temperature. Late transition metals such as Pt do not oxidize as easily as early transition metals, but in the presence of superoxides, the Pt anodes may likely oxidize, as well as the carbon support. The oxidation depends on temperature, and a low temperature AFC will inhibit the oxidation of the Pt anode. Superoxides react very easily so a low temperature AFC would be sufficient for the superoxides to react, but since they are so exothermic, heat will be created, which will challenge the oxidation stability of the Pt/C anodes. Cooling of the stack unit, to keep the AFC at relatively low temperature will inhibit the superoxide reaction with the anodes.

Metal carbides, borides, nitrides, silicides, perovskite-structured oxides [J. Electrochem. Soc., Volume 153, Issue 7, pp. A1302-A1309 (2006)] may also provide good anode materials. Developed recently by Meilin Liu at Georgia Tech for SOFCs that must be sulfur tolerant, these anodes will probably work better with MCFC instead of AFC.

Cobalt tetraphenyl porphin are potential anode materials [Shrini] for combination with superoxides into a two-phase mixture. It is important to use an anode that if it did undergo some degradation that the by products would not be volatile poisons, since this is a dual-purpose device, both creating oxygen and power.

New anode materials said to work between 300 to 600 C in SOFC systems show promise, but still contain carbon. Apparently there is carbon oxidation stability since the SOFC exposed the carbon to hot oxygen and $O_2^-$ ions. A direct quote from their work follows: "A novel anode catalyst, C-MO-SDC(C=activated carbon/carbon black, M=Cu, Ni, Co, SDC=Ce0.9Sm0.1O1.95) was synthesized by employing a citrate/nitrate combustion technique. Carbon materials, e.g., activated carbon and carbon black were first used to improve the solid oxide fuel cell (SOFC) anode properties, especially to improve microstructure and to enhance the anode conductivity and catalyst function for directly operating methanol as the fuel. Resulting anode catalyst C-MO-SDC materials used in a SOFC device have successfully achieved a high power density of 0.25 W cm−2 by directly operating the methanol at 560° C." [Electrochem. Solid-State Lett., Volume 9, Issue 2, pp. A80-A81 (2006)].

Chlor Alkali anodes may also be oxidation resistant, for example, $RuO_2+IrO_2+TiO_2$ coating on Ti substrate [Shrini, Page 111]. These anodes withstand Cl— and $Cl_2$ in high concentration. [Fuel Cells, Supramaniam Srinivasan, Springer, 2006].

Cermet based anodes are also candidates for a two-phase mixture with solid superoxide materials.

Copper-Nickel super alloys have been shown to be stable anodes for aluminum electrolysis at temperatures between 600 to 900 C [November 2003, JOM, Zhaowen Wang]. Super alloys of Cu-10Ni-10Al, Cu-25Ni-15Fe, and Cu-25Ni-10Cr have excellent oxidation and corrosion resistance, while functioning as an anode material. In aluminum electrolysis oxygen is formed between the alloy anode and the electrolyte, which can cause an oxide film on the anode surface. When the resulting oxide coated material show good conductivity and fine structure then it remains a good anode material.

The alloys just described and several of the other anodes discussed are made at high temperature; which needs to be considered in how to construct them in a two-phase mixture with superoxide solids. Superoxides are formed relatively simply by exposing metals K, Rb, or Cs to oxygen at near atmospheric pressure. $NaO_2$ is made by the reaction of $Na_2O_2$ with $O_2$ at 300 atm and 500 C. Solid superoxides may be delicate and the processing conditions to have them intimately mixed is of concern. Methods such as applying them by "wetting" techniques or sublimation of the solid are two approaches. Wetting, does not necessarily mean using water, rather any suitable liquid that will not be easily oxidized by a superoxide. Also putting the superoxides and gels to be applied to the preformed anode is a good technique.

Typically in a MCFC, the cathode could be made of Ni/LiNiOx and since the design in FIG. 10 uses no $NaClO_3$ the cathode material could be reused and only the spent superoxid and/or peroxide solid (which is converted to carbonates) need be dispensed with, for example $K_2CO_3$ would be landfilled. And the anode would be recoated with new $KO_2$. $NaO_2$ would make an even less expensive system needing only $Na_2[CO_3]$ to be land-filled, which is inexpensive. However, additional action may be take to stablize $NaO_2$ at MCFC temperatures.

According to an embodiment, several different helping materials that appear like battery materials may be used to assist cathode operation as illustrated by the following reactions:

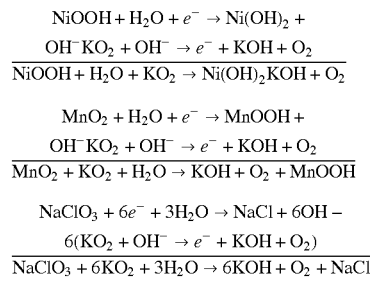

$M_nO_2$ and NiOOH, for example, could be used to react with both the steam and the $CO_2$ that is given off by combustion of liquid fuel, since $Ni(OH)_2$ reacts with $CO_2$ to make nickel carbonate.

Figure 11:
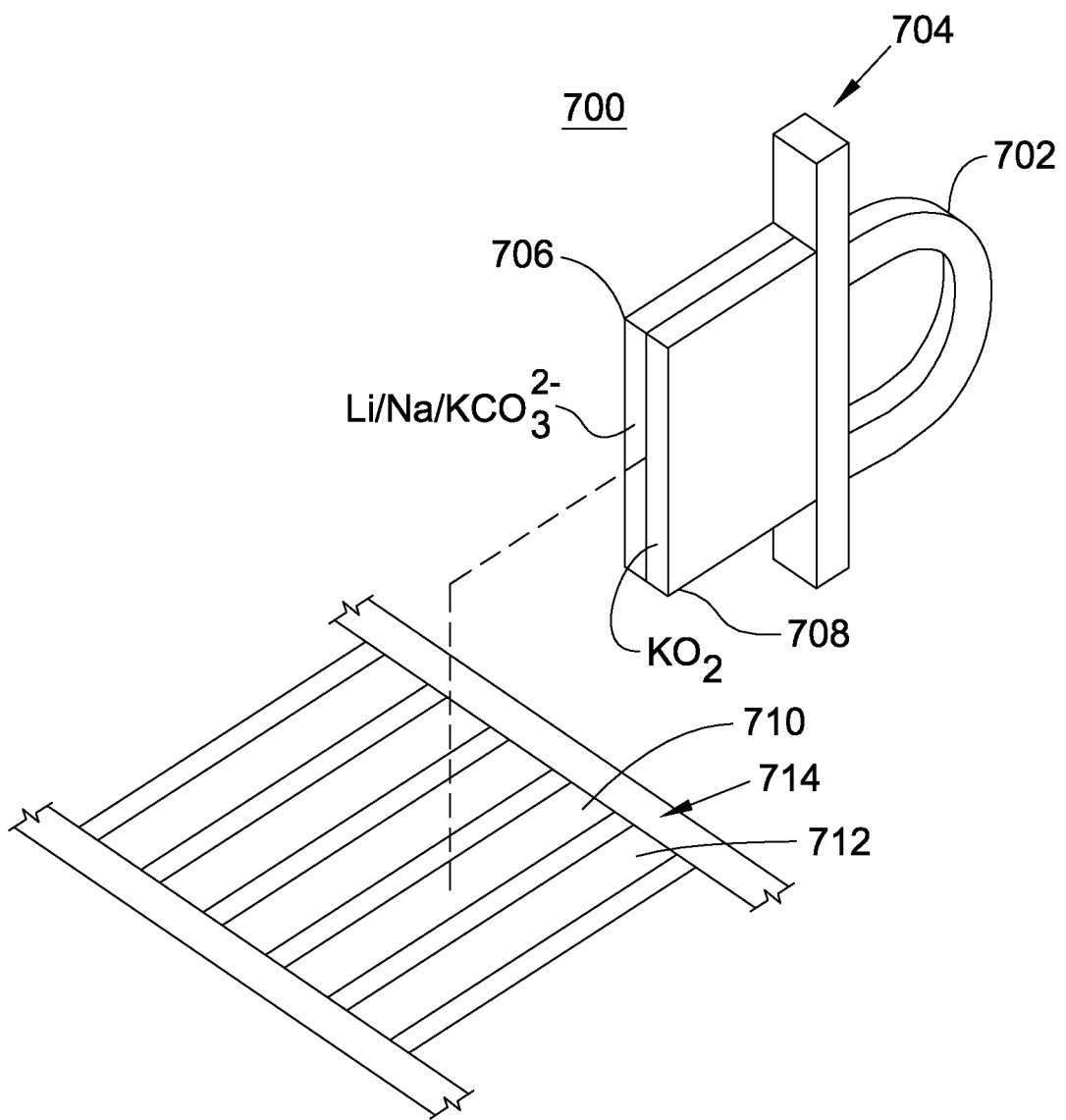
FIG. 11 is schematic diagram of a removable fuel cell module capable of storing captured carbon dioxide in a solid and transportable form.

According to an embodiment, anodes may be selected based, at least in part, on thermal shock resistance and electrical connection with the power supply. According to a particular embodiment, an MCFC $CO_2$ capture system may have removable cells that are placed in a stack as shown in FIG. 11. Here, for example slots 710 and 712 may be adapted to receive a replaceable module comprising a membrane 706 and anode material 708 such as $KO_2$. A mechanic may insert or remove the module manually from handle 702. Cover 704 may form an airtight seal over slot 710. A computer control (not shown) may monitor pressure and temperature in each cell of the stack during operation will add heating and cooling to the interstage-cooling channel near the cell to optimize its performance and to monitor when the cell is completed. The cells can be either in series or in parallel to build the desired voltage and amps.

According to an alternative embodiment, although claimed subject matter is not limited in this respect, power may be generated from the combustion of a carbohydrate in a heat to power process. A reaction of carbon dioxide from combustion with oxygen generating capturing material provides heat which is applied to increase power generated from the heat to power process. In a particular implementation, oxygen may be generated from reaction of carbon dioxide with oxygen generating sequestration material in an amount that is substantially equal to oxygen consumed from combustion.

Figure 12:
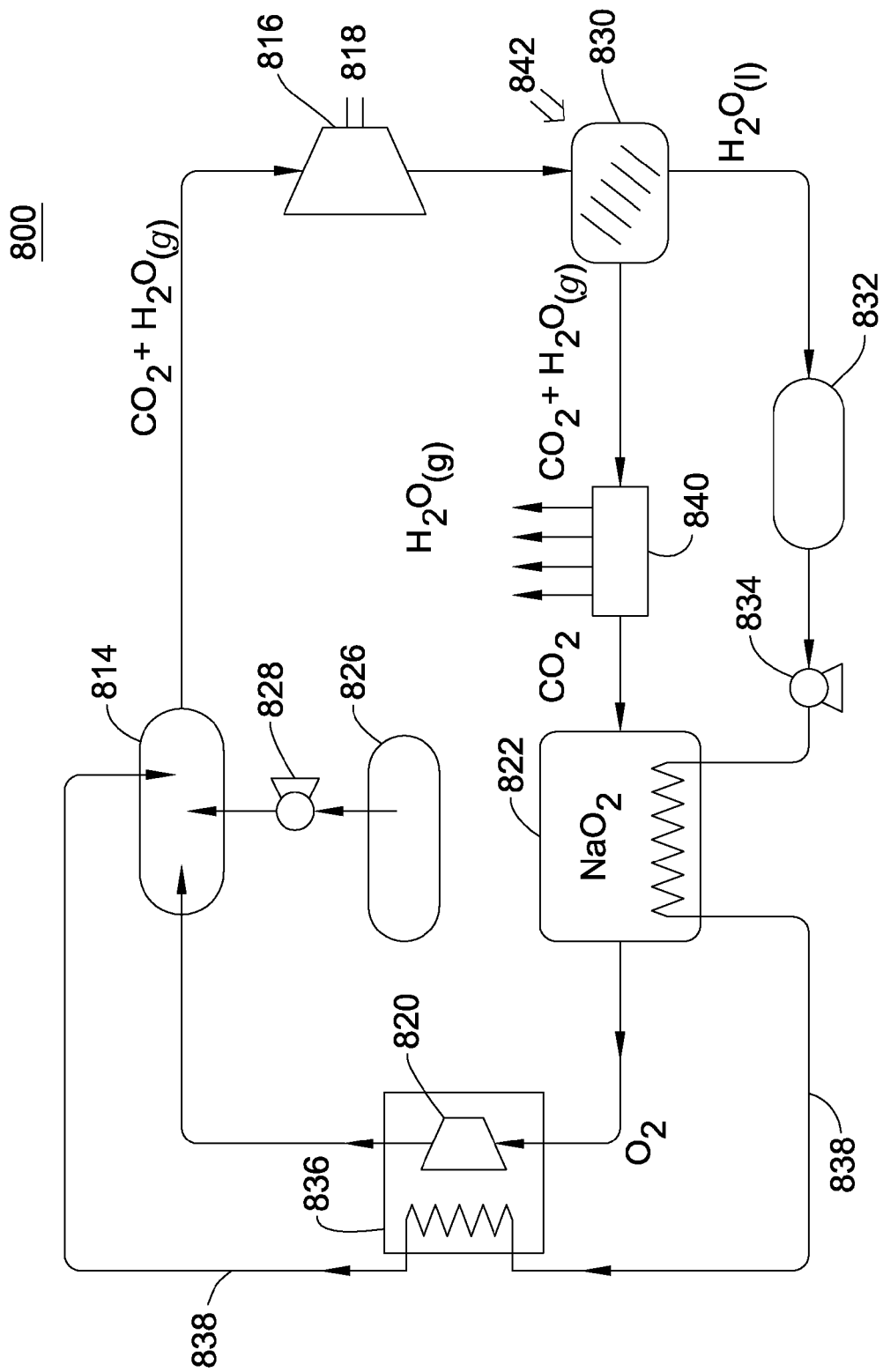
FIG. 12 is a schematic diagram of a heat to power process with $CO_2$ capture according to an embodiment.

System 800 shown in FIG. 12 comprises a fuel tank 826 that may contain a mixture including monosaccharides derived from plant material, such as cellulose, that was recently grown and harvested. A pump 828 may meter the mixture into a combustion stage 814 at pressure at, for example, 2175 psi. A compressor 820 may feed provide substantially pure oxygen into combustion stage 814. Here, substantially no nitrogen is being provided from compressor 820 such that combustion in combustion stage 814 can occur substantially nitrogen free. While sugars may be more difficult to burn than gasoline under some conditions, and sugars can be difficult to ignite, the sugars may readily ignite if in contact with concentrated oxygen. In an alternative embodiment, lignin may also ignite in the presence of high temperature, high concentration oxygen. As such, fuel tank 826 may also contain lignin dust in slurry with methanol, for example. Further, monosaccharides in tank 826 can be decomposed to CO and $H_2$ at the pressure of combustion stage 814, just before being fed to combustion stage 814.

Combustion may be started with actions such as, for example, having compressor 820 bring oxygen into combustion stage 814 normally in the steady state process to be inter-stage cooled. However, if such oxygen is only partially inter-stage cooled, such oxygen will arrive to the combustion chamber hot. Hot oxygen may ignite combustion of the sugars and ethanol to start the process.

Following start up, combustion stage 814 may be hot enough to obviate any need for additional oxidation power. Another way to start up combustion is to have a starter feed of methane gas to react with the concentrated oxygen and have a simultaneous feed of a sugar/methanol solution and extra water injected to the combustion chamber, to maintain temperature properly.

Since air is not used as an oxidant as illustrated above, combustion and oxidation power of $O_2$ is much stronger than it would be as in air, enabling the used of carbohydrates as fuel. Also, since power is generated at turbine power plant by turbine 816, this facilitates the use of multi-fuels in certain embodiments as vapor pressure of the fuel is not as critical for generating power from a turbine power plant as compared to an internal combustion engine, for example.

As shown in FIG. 12, oxygen arrives to combustion stage 814 after passing through compressor 820 (which may comprise a series of compressors) to boost the pressure of oxygen. Inter-stage cooling may be performed by water or steam. Compressor 820 may be cooled by process water pumped by water pump 834 through exchanger 836. In one embodiment, the combination of compressor 820 and exchanger 836 may comprise an alternating series of compressors and exchangers to be used in compressing and cooling oxygen in flow path 838 in successive stages. As such, there may be 1, 2, 3, or 4 heat exchangers used for inter-stage cooling between 4 or 5 compressors in series to build pressure without a high temperature increase, for example. Alternatively, compressor 820 may be directly cooled by water-cooling loop jackets on individual compressors.

Since compressor 820 compresses may compress substantially pure oxygen and not diluents (e.g., nitrogen in high concentrates in other engines) the power consumed by such compression is small compared to other engines. In on embodiment, individual compressor(s) of compressor 820 may and individual turbine(s) of turbine 816 may share axels (not shown). Since isentropic expanders after a combustion stage may expand a mixture of combustion products and steam, turbine 816 (which may comprise a plurality of gas turbines) may derive power from many more moles of gas than what may flow through compressor 820. Compression may consume power to move and pressurize gas. Accordingly, a smaller amount of moles of oxygen in the compressor compared to the greater amount of moles of steam in the gas turbine may decrease parasitic power loss of an overall power process.

In the presently illustrated embodiment, oxygen is derived from a reaction of carbon dioxide with an oxygen generating sequestration material, such as sodium super oxide or $Na_2O_{2.68}$ (or the lithium or potassium counterparts, such as $KO_2$ or even still $NaNO_3$). However, other oxygen generating $CO_2$ sequestration materials may be used without deviating from claimed subject matter.

Although $NaO_2$ may not very stable above 120 C, the temperature of carbon dioxide capture reactor 822 may be maintained at 100 C or lower, since it will be cooled by recently condensed water, at or below 100 C that emerges from water tank 832. $NaO_2$ or $Na_2O_{2.68}$ are good materials to use because they both can be made by zero carbon processes, since they both derive from the electrolysis of a sodium salt to make first sodium metal then reaction of the sodium metal with oxygen using processes starting from low cost materials.

Prior to the carbon dioxide capture reactor 822 a partial condenser 830 may be adapted to separate liquid water from carbon dioxide and gaseous water. Here, partial condenser 830 may be cooled by coolant 842 which may comprise, for example, air or river water, just to name two examples. The carbon dioxide and gaseous water may pass through a membrane 840 that allows for some of the water to pass through the membrane 840 and go into the atmosphere as water. To enable the process, gas exiting turbine 816 and entering condenser 830 may be slightly above atmospheric pressure, for example, 25 psig. Work 818 may be generated from one or more turbines at turbine 816, that may be converted to electric power. The shaft work can be converted to electric power.

According to an embodiment, although claims are not limited in this respect, carbon dioxide from combustion in combustion stage 814 and some gaseous water may enter carbon dioxide capture reactor 822, where the following three exothermic reactions may take place:

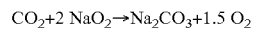

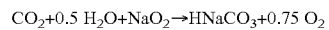

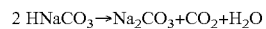

These reactions and their potassium analogues are known to take place near room temperature. Reactor 822 may contain an inexpensive form of a superoxides or superoxide/peroxide mixture, such as $2KO_2/K_2O_2$. For example, the form may be simple small pellets. The small pellets may be placed in the shell of a shell and tube vessel, and the pressurized water that emerges from 834 may be directed to the tubes of the shell and tube vessel, thereby adsorbing the exotherm of the reactions listed above. Pellets in the shell of the shell and tube vessel can be at low pressure, whereas the hot water in the tubes is pressurized by pump 834. However, this is merely an example of how a carbon dioxide capture reactor may use a superoxide to capture carbon dioxide according to a particular embodiment and claimed subject matter is not limited in this respect.

Here, some $CO_2$ and $H_2O$ may exit carbon dioxide capture reactor 822, but the amount that exits may be minimized by the pre-removal of water in the membrane. Furthermore, any $CO_2$ and $H_2O$ that exits carbon dioxide capture reactor 822 and goes to combustion stage 814 may merely be recycled in the process, creating a trace amount of gas more that may both increase the compressor demand for power and increase the turbines ability to make power.

In the presently illustrated embodiment, FIG. 12 shows that partial condenser 830 deposits liquid water into a reservoir tank 832 that is then pumped by pump 834 to the pressure of combustion stage 814. Here, such pumping of liquid may incur much less power consumption then compression of gas, such as the cost of compressing nitrogen as a dilutents, instead of water. Here, water may be pumped in cooling tubes through carbon dioxide capture reactor 822 and compressor 820, before the water, that becomes preheated by heat exchange at reactor 822 and compressor 820, enters combustion stage 814 to decrease the temperature in combustion stage 814 and increase an amount of gas available for isoentropic expansion. Although FIG. 12 shows $NaO_2$, other materials that can be used in carbon dioxide capture reactor 822 such as, for example, $KO_2$ or $2\ KO_2/K_2O_2$, and claimed subject matter is not limited in this respect.

In one embodiment, air-cooling demand on partial condenser 830 may be in a range of cubic feet per minute (CFM) comparable with the need of cooling air in automobile radiators of similar horsepower. Furthermore, the power generating process of the currently illustrated embodiment does not intake air for use as an oxidant.

According to an embodiment, turbine 816 may comprise a series of turbines adapted to collectively expand gases exiting combustion stage 814 to create power. An example will be given of the power created per mole. Such isoentropic expanders may cool combustion gases. Enthalpy contained in gases that exit turbine 816 as compared to enthalpy of starting materials may constitute a main loss in a process of heat energy. However, it can be shown that high efficiencies can be obtained assuming, in at least one particular embodiment, expander deviation from ideal behavior is not greater than 20% and compressor deviation from ideal behavior is not greater than 20%. One reason that high efficiencies are achieved is the lack of compression losses, since air is not being compressed and the oxygen is pre-put in the system by the carbohydrate and superoxide and/or other oxygen generating $CO_2$ capturing material. Additionally, efficiency of power made divided by heating value of carbon fuel, for example monosaccharide, may be much increased because of additional heat supplied by the reaction of $CO_2$ with an oxide generating carbon dioxide capturing material such as solid superoxide or superoxide/peroxide.

A start temperature before entrance into a first turbine after combustion stage 814 may be at a temperature that turbine blades can withstand. For choice as an example, 1700 K is a likely good temperature to exit combustion stage 814. Lower temperatures, to use more conventional turbine blade materials are possible but may decrease efficiency of system 800.

Combustion stage 814 may be hotter at the at an oxygen inlet of combustion stage 814. Temperature in combustion stage 814 may then drop by the injection of water (liquid, gas or a mixture thereof) to absorb some of heat of combustion. The higher the temperature allowed to go to a first turbine, the higher the amount of turbine power made in the process. However, this may increase a requirement of coolant 842 to cool partial condenser 830, for example. A detail not shown in FIG. 12 is the staging of combustion stage 814. Here, combustion stage 814 may comprise a combustion chamber that initially receives oxygen enter, but then has an alternating additions of fuel and steam. An increment of fuel may be burned and steam may be raised in temperature. Steam may further suppress carbon fouling of the combustion chamber. After an addition of fuel and steam, temperature in the combustion chamber may rise. However, such rise in temperature may be kept substantially under control, and the generation of high temperature products, such as free radicals may be kept under control. Then traveling along an axial length of the combustion chamber, a new addition of fuel may be made, followed by a new addition of steam. As oxygen transverses the combustion chamber from inlet to exist along the length, it meets alternating portions of fuel and steam, so as to control the temperature and free radical production. It is therefore expected that the shape of the combustion chamber may comprise a substantially elongated shape.

To start a process of combustion, any number of oxygen sources could be used to prime combustion, such as the thermal decomposition of $NaClO_3/Cr_2O_3$ (including $NaClO_3$, $KClO_3$, $NaClO_3/Cr_2O_3$) or the thermal decomposition of the sodium superoxide in carbon dioxide capture reactor 822, for example. A battery may also be used to heat up the oxygen generating $CO_2$ recapture material in carbon dioxide capture reactor 822, to operate compressor 820, and in some instances to unfreeze water needed in the process.

An advantage of not using air on start-up is that the nitrogen of air is compressed up to the combustion chamber pressure it will contain hot nitrogen that may not be able to absorb the heat of reaction without getting into temperature ranges that cause the formation of NOx; or if the compressors are inter-staged cooled, the air will come in to the combustion chamber with not enough oxidation power.

Combustion may be designed to take place in stages along combustion stage 814 in such a way that oxygen, fuel and steam along the axial length some are all added in staged increments down combustion stage 814 so as to keep the temperature of combustion stage 814 below the temperature that substantial free radicals are formed. In this example, oxygen may also be added incrementally along the length of the reactor so as to control the fuel to oxygen ratio throughput of the combustion process. Accordingly, a series introduction of oxygen, then fuel, then steam could be repeated in the same combustion chamber, several times so as to add fuel incrementally, and not allow the temperature in combustion stage to go into ranges that make excessive free radicals formation and substantially keep the fuel to oxygen to dilutents ratio stable.

Hot water and/or steam may be injected at the pressure of combustion stage 814 by the pumping of liquid water. Here, liquid pumping takes considerably less power than compressing gas typically. In this way, a dilutents may be added to the system without using nitrogen in the air as a dilutent. In this way, a dilutent may be added at combustion chamber pressure without the energy and efficiency losses associated with the compression of nitrogen.

Exit of process gas out of a last turbine may be done efficiently when close to the dew point of water, so that condenser 830 may have a minimal heat transfer requirement. One way to achieve this is by taking advantage of the cooling that happens when gases are expanded. In order to absorb a substantial amount of 1700 K, higher pressures can be used in the combustion stage 814.

Water injected may increase overall power generated by system 800, since it adds moles of gas that pass through turbine 816. Although sodium superoxide may decompose at a relatively low temperature (393 K), literature shows that a mixture species having the formula $Na_2O_{2.68}$ decomposes at about 250° C. (523 K) to Na$_2$O$_2$. After that slight decomposition of Na$_2$O$_2$ is observed in the solid state from 380° C. (653 K) upward. At 510° C. Na$_2$O$_2$ melts. At 545° C. (818 K) there is vigorous decomposition of residual liquid peroxide with formation of solid Na$_2$O. Between 510° C. and 545° C. Na2O2 melts and solid Na$_2$O is being formed.

Na$_2$O may react with stainless steel, but does not react with nickel. Nickel lined walls may be used in a vessel to be used as reactor 822. In one implementation, combustion stage may be operated at 148 atmospheres (2175 psig) pressure and 1700 K. However, other operating temperatures and pressures may be selected for operation without deviating from claimed subject matter.

With an oxidant as powerful as hot pure oxygen, even fuels such as cellulose, hemicellulose and lignin may be used as a fuel (e.g., transportation fuel), without pretreatment. These solid fuels could be added into combustion stage 814 as solids, in slurries of ethanol, methanol and/or water, and/or gasified to CO and H$_2$. Nitrogen and sulfur in hetero-atom Biomass may be collected either in condenser 830 or carbon dioxide capture reactor 822. Here, carbon dioxide capture reactor 822 may have an added absorbent to remove the minerals and nitrogen bearing and sulfur bearing molecules in combusted hetero-atom Biomass, for example. It should be observed that a particular embodiment described herein may only exhaust humid air, providing a zero emissions power generator.

As pointed out above, sugars may make suitable fuels, such as C$_6$H$_{12}$O$_6$ and C$_{12}$H$_{22}$O$_{11}$. Other fuels may include, for example, carbon, or turbostatic carbon that is derived from a process of removing oxygen from a plant carbon source that has its oxygen removed as H$_2$O instead of CO$_2$. Fuels such as C$_6$H$_{12}$O$_6$ and C$_{12}$H$_{22}$O$_{11}$ are practical since they can be made from a minimum, low cost processing of materials by saccharification. Saccharification may comprise a more simple process, and the fuels that derive from it such as C$_6$H$_{12}$O$_6$ and C$_{12}$H$_{22}$O$_{11}$ maintain most of their CO$_2$.

Since the plants absorbed CO$_2$ from the atmosphere and the C$_6$H$_{12}$O$_6$ and C$_{12}$H$_{22}$O$_{11}$ was derived at minimum CO$_2$ evolution and low cost compared to making ethanol, and power plant processes described herein enable underground sequestration of the CO$_2$ made from the burning of C$_6$H$_{12}$O$_6$ and C$_{12}$H$_{22}$O$_{11}$ then the overall effects may reduce an amount of CO$_2$ in the atmosphere.

Combustion stage 814 may be constructed to tolerate the use of supercritical water, which may allow for pressures as high as 5000 psig in combustion stage 814 in certain implementations. Steam turbines may be used at that pressure [Perry's Handbook of Chemical Engineering 6th Addition, Page 24-18]; a more practical pressure requiring thinner walled material would be at around 148 Atm (2175 psi), which is also in line with pressures currently used in truck internal combustion [Internal Combustion Engine Fundamentals, John Heywood, 1988]. A higher pressure combustion stage 814 may allow for more cooling power in the expansion of the combustion gases and steam that enters turbine 816, thus, letting the "exhaust" of a last turbine contain less enthalpy and be closer to it start state as liquid water at around 373 K.

It is important to note that the specific heat enthalpy of the gaseous water exiting the last turbine may be only a small fraction, in the range of 10 to 20% of latent heat of the condensation of the gaseous water to liquid water in condenser 830. Therefore since fewer moles of water are needed in combustion stage 814, if temperature of combustion stage 814 is higher, efficiency loss associated with the condensation of water will be lessened at higher temperatures of combustion stage 814. The specific heat loss of cooling steam coming out of the last turbine is a smaller loss than the gains from using less water and having higher temperatures at combustion stage 814.

One material used in high combustion temperature regions is silicon nitride (Si$_3$N$_4$). System 800 may take up a small volume and weight. In one particular implementation, although claimed subject matter is not limited in this respect, condenser 830 may comprise the vessel in system 800 having the largest volume. In particular implementations, the power density of system 800 may be similar to or less than that of an equivalent horsepower IC engine. Unit operations of system 800 may be similar in proportion or smaller in relation to the size of a typical SI engine block for an automobile of similar horsepower.

Injection of water both in combustion stage 814 may also offers an advantage in discouraging the formation of carbon deposits according the equation below and becomes a favorable reaction at greater than 900 K [Page 390, Smith and Van Ness, McGraw-Hill, Chemical Engineering Thermodynamics, 1975].

$$C+2H_2O \rightarrow CO_2+2H_2$$

$$C+H_2O \rightarrow CO+H_2 \tag{13}$$

Although trace amounts of hydrogen could exit combustion stage 814 and go to turbine 816, this is not a problem since hydrogen reacts easily with oxygen, so long at there is a slight excess of oxygen available. The closed circuit nature of system 800 in the particular illustrated embodiment does not provide significant exhaust other than water. Any small amount of "off-script" combustion products, such as CO and H$_2$, and free radicals, or trace nitrous oxides in the case of solid biomass that contains sulfur and nitrogen may be absorbed or further reacted in a closed loop system. CO, H$_2$ and NO may react with NaO$_2$ and remain trapped in system 800. Such products may never be exhausted to the air. They can eventually be reacted or in the case of NOx, SOx, absorbed at carbon dioxide capture reactor 822. Here, carbon dioxide capture reactor 822 may operate at temperatures below 120 C, whereas normal truck exhaust is much higher than that, making it difficult to absorb NOx and SOx. Also the closed loop nature of system 800 enables the NOx and SOx to have many passes through carbon dioxide capture reactor 822, allowing them to be absorbed with more residence time with the absorber.

Na$_2$CO$_3$ is very stable and doesn't melt until 1121 K. Therefore it would pose no health threat to the consumer, also C$_6$H$_{12}$O$_6$ and C$_{12}$H$_{22}$O$_{11}$ are no health threat. This is in large contrast to gasoline, which is highly explosive. Sugars or lignin might also be able to be delivered to home or supermarket, making the distribution of fuel not a problem since it is non-explosive and non-toxic.

The following reactions may bring in enthalpy to a process performed in system 800, discounting reactions to make carbon monoxide. Since there will be a large amount of water injected in combustion stage 814, CO will be reacted out of the process by reaction with steam to make CO$_2$. However, if CO remains in trace, it causes no particular problem, since it is a close circuit combustion and no CO will escape into the atmosphere.

$$[C_6H_{12}O_6+6\ O_2 \rightarrow 6\ CO_2+6\ H_2O+2536.7\ kJ/Mol]=-2536.7\ kJ/Mol$$

$$[C_{12}H_{22}O_{11}+12\ O_2 \rightarrow 12\ CO_2+11\ H_2O+5{,}155.7\ kJ/Mol]=-5{,}155.7\ kJ/Mol$$

$$C_2H_5OH_{(liquid)} + 3\, O_2 \rightarrow 2\, CO_2 + 3\, H_2O + 1234.8 \text{ kJ/mol}$$

$$[2\, NaO_2 + CO_2 \rightarrow Na_2CO_3 + 3/2\, O_2 + 214 \text{ kJ}]\, 2/3 = 142 \text{ kJ/mol } O_2$$

$$CO_2 + 0.5\, H_2O + NaO_2 \rightarrow HNaCO_3 + O_2 + 177 \text{ kJ/mol } O_2$$

$$CO_2 + 0.5\, H_2O + NaO_2 \rightarrow HNaCO_3 * H_2O + O_2 + 289 \text{ kJ/mol } O_2$$

Assuming the carbonate is the main species.
At 80% glucose and 20% sucrose the heat input to the system per carbon atom is only $$3060.5 + 2080 = -5,141.3 \text{ kJ}/7.2\, C = -714 \text{ kJ/C}$$

The heat from gasoline is −5,250.3 kJ/mol and −656 kJ/C
At 64% glucose, 16% sucrose, 20% EtOH $$2,695.4 + 1866.9 = 4,562.3 \text{ kJ}/6.16\, C = -740.6 \text{ kJ/C}$$

In order to use ethanol the sequestration reactions should comprise some carbonate formation and some bicarbonate formation; methanol makes the same ratio of $CO_2$ to $O_2$ as sugars so it is beneficial. Production of hydrated bicarbonate may give the most enthalpy to the process. It may be therefore of value to use the minimum ethanol needed to keep the fuel as a flowing liquid, or to introduce the sugars as solids into the combustion reactor or to use methanol with sugars as a fuel.

In order to increase the enthalpy added to the system from a non-carbon source, and to be able to absorb carbon monoxide and nitrogen, and sulfur oxides more readily oxygen generating sequestration material in carbon dioxide capture reactor 822 may contain other materials. Such materials may include, for example, $Li_2O$ (to react with $CO_2$ and make heat which will increase the work made by the process) and NaOH (to react with CO), or analogs such as $Na_2O$, LiOH, and KOH.

The reaction of $Na_2O$ with water and $CO_2$ has two steps as shown:

$$Na_2O + H_2O \rightarrow 2\, NaOH$$

$$2\, NaOH + 2\, CO_2 \rightarrow 2\, HNaCO_3$$

Sodium bicarbonate is prone to decomposition to become:

$$2\, HNaCO_3 \rightarrow Na_2CO_3 + CO_2 + H_2O$$

$Na_2CO_3$ is very stable and the $CO_2$ will tend to populate itself as $Na_2CO_3$ although some could escape.

$HLiCO_3$ is more temperature stable than $HNaCO_3$. $HKCO_3$ is prone to decomposition and $K_2O$ is also prone to disproportionation. $Li_2O$ is reported to have a melting point of 1570 C. It is not flammable but has a 4 rating on MSDS for health. Lithium Carbonate ($Li_2CO_3$) melts at 723° C. Sodium oxide is also nonflammable and has a 3 on MSDS health. Li2O will form lithium hydroxide in-situ and yield more heat doing so. The Gibbs free energy of transformation for the following two reactions are both favored and negative.

$$Li_2O + H_2O + CO_2 \rightarrow 2\, HLiCO_3 \text{ delta } G = -581.5 \text{ kJ/Mol}$$

$$Li_2O + CO_2 \rightarrow Li_2CO_3 \text{ delta } G = -163 \text{ kJ/Mol}$$

Lithium oxide may provide a suitable oxygen generating $CO_2$ capture material to use for portable power, for example, since it is light-weight. Lithium carbonate is a relatively safe material and is used in medicine. These reactions would add the following enthalpy to the sequestration process, which in turn would increase the efficiency of the process. However, as there is reactivity between $Li_2O$ and $NaO_2$, they need to be physically separated.

$$Li_2O + H_2O + CO_2 \rightarrow 2\, HLiCO_3 + 700 \text{ kJ/mol}$$

In one embodiment, lithium oxide may give more enthalpy to system 800 than sodium oxide. If we make the following assumptions for the process and exothermic sequestration one can derive the enthalpy per carbon atom added into the power plant compared to a SI engine using gasoline.

$$[C_6H_{12}O_6 + 6\, O_2 \rightarrow 6\, CO_2 + 6\, H_2O + 2536.7 \text{ kJ/Mol}] = -2536.7 \text{ kJ/Mol}$$

$$[C_{12}H_{22}O_{11} + 12\, O_2 \rightarrow 12\, CO_2 + 11\, H_2O + 5,155.7 \text{ kJ/Mol}] = -5,155.7 \text{ kJ/Mol}$$

Exothermic Sequestration $$[Li_2O + H_2O + CO_2 \rightarrow 2\, HLiCO_3 + 700 \text{ kJ/mol}]7.2 = -5,040 \text{ kJ/mol}$$

Endothermic Decomposition Reaction $$[10 \text{ kJ/Mol (heat of fusion)} + 96 \text{ kJ/mol} + 2\, Na_2O_{2.68} \rightarrow Na_2O + 3/2\, O_2]7.2 = +763.2$$

At 80% glucose and 20% sucrose the heat input to the system per carbon atom is only $$-3060.5 - 4277 = -7,337 \text{ kJ}/7.2\, C = -1,019 \text{ kJ/C}$$

The heat from gasoline is −5,250.3 kJ/mol and −656 kJ/C

As has been shown, process 800 can be more enthalpy rich than gasoline both per carbon atom and by mole. These numbers are estimates as several factors can effect the enthalpy, including heat of solution for $HLiCO_3$ and the tendency of $HLiCO_3$ to decompose to carbonate and the amount of sugar that is burnt to carbon monoxide.

Other materials for exothermic $CO_2$ absorption include, BeO, MgO, CaO, $Mg(OH)_2$, $Al_2O_3$, $Al(OH)_3$. However, this is merely a partial list of materials and additional such materials are listed in previous examples.

According to embodiment, carbon dioxide capture reactor 822 may be made of mixtures or two zones containing oxygen generation and $CO_2$ sequestration of one material that performs both functions. And can also include a NOx and SOx absorber if solid biomass that contains sulfur and nitrogen atoms is used, for example.

Particular embodiments illustrated herein with reference to system 800 may have one or more of the following advantages: (1) the nitrogen in air is not compressed, saving energy, (2) minimal exhaust (majority liquid water and gaseous water), (3) extra heat is brought into the system by the exothermic sequestration of $CO_2$ on-board at carbon dioxide capture reactor 822, (4) high oxidation power of concentrated oxygen allows for the use of solids with little vapor pressure as fuels, (5) the use of a turbine instead of an SI engine configuration allows for the use of fuels with no vapor pressure, (6) carbon dioxide is captured and conveniently formed for transportation and sequestered, (7) since the fuel derived from plants that sequestered $CO_2$ from the air, carbon dioxide is removed from the air by operating this vehicle, (8) may use sugar as fuels, since they carry with them a lot of oxygen and make the same amount of $CO_2$ as they consume $O_2$ and are better than ethanol which released some heat and $CO_2$ into the atmosphere on formation, (9) the fuels may be non-reactive with air, (10) in an automobile configuration with no muffler needed to run almost silently, (12) the power device enables the use of lignin as a fuel—lignin maybe inexpensive and currently often wasted.

While no battery is shown in system 800, such a battery may be used to start system to, for example, initiating ignition in combustion stage 822, provide power to compressor 820 and pumps 828 and 834, for example.

If $CO_2$ is sequestered by a separate material in the sequestration unit, such as $Li_2O$, then the gas phase water will also be enough to create a large amount of oxygen from the reaction of water with superoxide, by the equations below. The sodium superoxide adds enthalpy to the process if reacting with water.

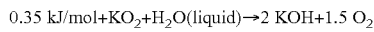
0.35 kJ/mol+KO$_2$+H$_2$O(liquid)→2 KOH+1.5 O$_2$

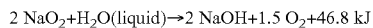
2 NaO$_2$+H$_2$O(liquid)→2 NaOH+1.5 O$_2$+46.8 kJ

Certain implementations of system 800 may incorporate the use of O$_2$ compressors such as compressor 820. However, since compression is only of oxygen and not air, the compression cost is less than if air was used, since the majority component in air is nitrogen. In the particularly illustrated embodiment, system 800 both sequesters CO$_2$ and generates oxygen in the same carbon dioxide capture reactor 822, which may be maintained at a pressure slightly above 14.7 psig in a particular embodiment. Such near atmospheric pressure vessels may be constructed to have thinner walls that are low weight compared to pressure vessels. Low pressure containers for captured carbon are more convenient for the removal and replacement of carbonate with solid superoxide.

In one embodiment, carbon dioxide capture reactor 822 is not pressurized. Here, it would be possible to keep carbon capture material, such as NaO$_2$ in the form of removable cartridges, for example. Such cartridges of NaO$_2$ material may be changed as needed in a simple way, by the consumer or at a service station.

Heats of reaction of some reactions are shown in Table II. The reaction to make potassium bicarbonate creates 177.4 kJ/mol (see reaction 2 therein).

KO$_2$ may be more stable, up to at least 698 K [E. I. Skovnin, 1962, Inorganic Academy of Sciences, USSR] and some researchers reported a higher stability of KO$_2$ (only melting at 763 to 803 K [I. V. Aksenova, 1965, Inorganic Academy of Sciences, USSR]), but HKCO$_3$ is not very stable about 140 C. Since system 800 may transfer CO$_2$ entering carbon dioxide capture reactor 522 accompanied by some gaseous water, bicarbonate may form. However, such bicarbonate may be produced in equilibrium with its own decomposition to carbonate, water and CO$_2$. One way to retain CO$_2$ in carbon dioxide capture reactor 822 more completely would be to include some LiOH together with the KO$_2$. Another approach is to not worry about the escape of some CO$_2$ from the sequestration unit, since such gas that leaves the unit may return to combustion stage 814, essentially recycled together with the oxygen that is formed by reactions 1 and 2 of Table II. To accommodate some escaping CO$_2$ from the sequestration the compressors before combustion stage 814 may be sized in a way to handle variable flow rate that includes the flow rate of leaking CO$_2$ and gaseous water from carbon dioxide capture reactor 822 to combustion stage 814.

TABLE II

Exotherms of Reactions

| Reaction # | Reaction | Exotherm |
|---|---|---|
| 1 | CO$_2$ + 2 KO$_2$ → K$_2$CO$_3$ + 1.5 O$_2$ | 183.6 kJ |
| 2 | CO$_2$ + 0.5 H$_2$O + KO$_2$ → HKCO$_3$ + 0.75 O$_2$ | 177.4 kJ/mol |
| 3 | H$_2$O(g) + 2KO$_2$ → 2KOH + 1.5 O$_2$ | 41.4 kJ |
| 4 | KOH + CO$_2$ → HKCO$_3$ | 141.1 |
| 5 | LiOH + CO$_2$ → HLiCO$_3$ $_{(aq)}$ | 85.66 |

Compressor 820 used in system 800 may be inter-stage cooled by process water to reduce the power needed to operate them. However, it may be advantageous limit cooling of oxygen so that hot oxygen enters combustion stage 814.

According to an embodiment, system 800 may bring high concentration oxygen into combustion stage 814 and fuel reservoir 826 may be thermally isolated from one another. Fuel may be added to combustion stage 814 at the pressure of combustion stage 814. Cellubiose, one of the fuels suggested, may decompose by itself at 498 K. Accordingly, introduction of cellubiose as a solid may be done in such a way does not decompose before being feed into combustion stage 814.

One way to keep the solids below their decomposition temperatures upon feeding them to combustion stage 814 is to use process water to cool and isolate the source of sugars from combustion stage 814. If fuel is introduced as a liquid solution or slurry, for example, then the speed of flowing to the chamber may be faster than solids introduction and be less vulnerable to decomposing in the feeding process. In some configurations, monosaccharide may be encouraged to decompose in a controlled manner so as to introduce into combustion stage 814 a mixture of carbon monoxide and hydrogen.

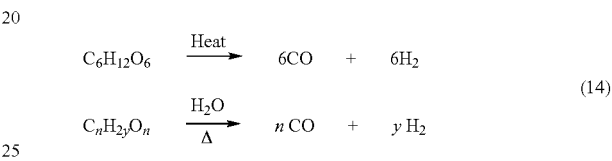

$$C_6H_{12}O_6 \xrightarrow{\text{Heat}} 6CO + 6H_2$$

$$C_nH_{2y}O_n \xrightarrow[\Delta]{H_2O} n\,CO + y\,H_2 \quad (14)$$

Monosaccharides, $C_nH_{2y}O_n$, in the presence of high temperature water or steam can be easily converted to syn gas at low temperatures [J. A. Dumesic, Applied Catalysis B: Environmental 56, 171-186, 2005]. Syn gas is a useful combustion fuel. The monosaccharide conversion to syn gas may take place such that solid sugar converts to gas at the pressure of combustion stage 814, so as to avoid the need for compression of the CO and H$_2$.

Unlike sugars, carbon or lignin, or to a lesser extent hemicellulose, as a fuel does not self-decompose. Carbon that is derived from plants and contains no inorganic species can also be used as a fuel for system 800. Carbon may be formed in a process that employs dehydration of sugars. Otherwise, the process of making the fuel may be adding CO$_2$ to the air.

In one example, concentrated sulfuric acid (H$_2$SO$_4$) may be used to dehydrate sugar, for example. Sucrose may be dehydrated to carbon and water. Such water produced by sugar may hydrate the sulfuric acid. Formation of strong hydrogen bonds between the acid and the water makes the process strongly exothermic.

A small amount of enthalpy in the fuel may be lost if carbon is used instead of sugar, since it has the following exotherm. However the number of moles of gas it generates, one mole CO$_2$ per mole solid C, whereas sugars produce about 12 moles of and water for every one mole of solid sugar. However the heat of the carbon combustion can still be used to make turbines create power, with the assistance of water injection to combustion stage 814 to make gaseous water, which drives the turbines.

C+O$_2$→CO$_2$+393.5 kJ

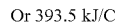
Or 393.5 kJ/C

This compares well to glucose and sucrose at 422.78 and 429.6 kJ/C

In one alternative, fuel in system 800 may comprise carbon powder made into a solution with water and pumped as a liquid into combustion stage 814. This may be particularly useful since water is being added to combustion stage 814; or in a slurry with ethanol to avoid freezing. Pumping liquids may be one way to administer fuel. Although there may be concern about an ability to burn fuel if it is in a water solution, in the case of the power process described above, substantially pure oxygen may be compressed to combustion stage 814 and arrive at a relatively high temperature. The high temperature of the inlet temperature of the water may vaporize the water solution holding the fuel, and then go on to combust the fuel.

Monosaccharide solutions can also be made to inject the fuel as liquid. Sucrose and Glucose and Xylose may be readily put into solution. Glucose is very soluble in water and can be pumped into combustion stage 814 as a liquid solution, instead of as a solid in all the designs discussed in this patent. If the sugars are premixed with water, their flammability will be decreased, but there are several answers to that limitation. First, the oxygen entering combustion stage 814 will be hot from being compressed, and secondly a starter fuel like pressurized methane can be used to initiate combustion stage 814 to high temperature, which may immediately vaporize the water if it enters combustion stage 814.

The heat to power process of system 800 has two heat inputs, (1) combustion of fuel and (2) the heat of reaction between $CO_2$ and superoxide, or $CO_2$ and a mixture of superoxide and peroxide or $CO_2$ and a mixture of superoxide and other non-oxygen generating absorbents. This dual heat source may increase efficiency of the carbon bearing fuel to power.

A membrane 840 may separate water from $CO_2$ that is provided to carbon dioxide capture reactor 822. Several membranes are water permeable selective. An amine membrane may be used for $CO_2$ at low temperature. Also, many hydrophilic membranes separate water, such as cellulose acetate.

Glucose has a freezing point depression of about 5 Celsius for water, but at the temperature approaches freezing the viscosity of the sugar water mixture increases. Methanol will not freeze in combination with sugars or by itself. Here, system 800 may also use direct injection of solid sugar instead of aqueous solution to avoid the freezing issue. Such solid fuel may be injected pneumatically. Here, pneumatics may have the advantage of adding solids faster so that they have no time to decompose in the injection process; oxygen could be the pneumatic gas.

In another embodiment, fuel may be maintained as a liquid solution of plant derived ethanol and sugars. An amount of ethanol used may be a minimum amount of ethanol needed to keep the fuel solution flowing at winter temperatures, for example.

Ethanol has a heat of combustion per carbon atom of about 616.9 kJ/mol whereas glucose has a heat of combustion per mole of about 422.8 per carbon atom, therefore the ethanol will assist in the power of the process by adding more enthalpy per carbon atom. Unlike glucose water mixtures, glucose ethanol mixtures will burn when in contact with high concentration hot oxygen. However ethanol needs more oxygen than the $CO_2$ it makes, so oxygen generating sequestration material in carbon dioxide capture reactor 822 may generate more than one mole $O_2$ per mole $CO_2$, sequestration to carbonate, as opposed to bicarbonate does that at 1.5 mole $O_2$ per mole $CO_2$.

Although small amounts of ethanol may assist the fuel to resist freezing, sugars may still be excellent fuels for the processes in particular embodiments since each sugar consumes in combustion about 1 mole of oxygen for every mole of carbon in the fuel to combust, whereas ethanol needs 1.5 moles of external oxygen for every mole of carbon and gasoline needs 1.56 oxygen to carbon. Methanol mixed with monosaccarides may also be used as a fuel mixture, since methanol can assist the flow of monosaccharide and does not freeze at typical terrestrial temperatures. Generating oxygen in-situ becomes a viable option as the fuel brings more of its oxygen into combustion stage 814, such as sugars do. Reactions that can be used for generating oxygen and making heat are shown in the equations below.

$$CO_2 + 2\,KO_2 \rightarrow K_2CO_3 + 1.5\,O_2 \quad O_2/M = 1.5/2$$
$$O_2/CO_2 = 1.5$$

$$CO_2 + Na_2O_2 \rightarrow Na_2CO_3 + 1\,O_2 \quad O_2/M = \tfrac{1}{2} \quad O_2/CO_2 = 1$$

$$CO_2 + Na_2O_{2.68} \rightarrow Na_2CO_3 + 1.68\,O_2 \quad O_2/M = 1.68/2$$
$$O_2/CO_2 = 1.68 \qquad \text{Equation (15)}$$

$$Na_2O_{2.68} \rightarrow Na_2O + 1.68\,O_2 \quad O_2/M = 1.68/2 \quad O_2/CO_2 = \infty\ \&$$
Endothermic $\qquad$ Equation (16)

$$2\,KO_2 + 2\,OH^- \rightarrow 2\,e^- + 2\,KOH + 2\,O_2 \quad O_2/M = 2/2$$
$$O_2/CO_2 = \infty$$

$$CO_2 + 2\,NaO_2 \rightarrow Na_2CO_3 + 1.5\,O_2 \quad O_2/M = 1.5/2$$
$$O_2/CO_2 = 1.5$$

$$CO_2 + 0.5\,H_2O + NaO_2 \rightarrow HNaCO_3 + O_2 \quad O_2/M = 1/1$$
$$O_2/CO_2 = 1$$

M=K or Na (or Rb, Cs, Li)

For in-situ oxygen generation and sequestration it may be desired to not make excessive $CO_2$ compared to the oxygen created in system 800 if the above reactions are used for the creation of oxygen. Combustion of cellubiose, glucose, hemicellulose, carbohydrates or carbon adhere to this requirement, those fuels have less oxygen needs, whereas combustion of isooctane and methane do not.

Reactions of equations 17 and 18 consume more oxygen than could be generated by the conversion of $CO_2$ to oxygen through reactions of equations above. Reaction of equation 7 may potentially be used with gasoline at a limited range of fuel to air.

$$C_{12}H_{22}O_{11} + 12\,O_2 \rightarrow 12\,CO_2 + 11\,H_2O \quad O_2/CO_2 = 1$$

$$C_6H_{12}O_6 + 6\,O_2 \rightarrow 6\,CO_2 + 6\,H_2O \quad O_2/CO_2 = 1$$

$$C + O_2 \rightarrow CO_2 \quad O_2/CO_2 = 1$$

$$C_8H_{18} + 12.5\,O_2 \rightarrow 8\,CO_2 + 9\,H_2O \quad O_2/CO_2 = 1.56 \qquad \text{Equation (17)}$$

$$CH_4 + 2\,O_2 \rightarrow CO_2 + 2\,H_2O \quad O_2/CO_2 = 2 \qquad \text{Equation (18)}$$

Sugars such as Xylose, Glucose and Cellubiose are excellent fuels for a an in-situ oxygen generation, closed circuit power process, since their oxygen requirement is 1 to 1 with their oxygen generation potential when combined with superoxides, peroxides and semi-peroxides, $Na_2O_{2.68}$.

$CO_2$ captured from system 800 may be shipped, trained and/or conveyed in some way to a permanent sequestration site. Carbonates may be landfilled or carbonates can be heated to liberate $CO_2$ and place the $CO_2$ in a geological formation, for example. Suitable geological formations include underground saline or underground salts that react in the presence of $CO_2$. If a mixture of two moles $KO_2$ and one $K_2O_2$ is used in carbon dioxide capture reactor 822 to capture $CO_2$ in the form of carbonate, the carbonate can later be converted back to $CO_2$.

Returning potassium carbonate/hydrate to $KO_2 + \tfrac{1}{2}K_2O_2$ may require air, but conveniently side-steps NOx formation (a concern of high temperature air oxidation).

A 55% efficiency system process starting with 681 kJ/C monosaccharide with 257 kJ/C heat requirement to regenerate carbonate to $KO_2 + \tfrac{1}{2}K_2O_2$ may make a net power positive and $CO_2$ removal process. The higher the inlet temperature to gas turbine 816, the higher the overall efficiency of the power process, so long as sufficient pressure is used to accommodate the turbine expansion required to utilize the temperature.

The overall process of system 800 together with regeneration of two moles $KO_2$ and one mole $K_2O_2$ and sequestration of $CO_2$ may be net power positive and $CO_2$ removing from the atmosphere. Removing $CO_2$ from the atmosphere may decrease the concentration of $CO_2$ in the atmosphere. Decreasing the concentration of $CO_2$ in the atmosphere may reverse Global Warming.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method comprising:
    adsorbing a paramagnetic gas and/or magnetic gas on a magnetically susceptible adsorbent facilitated by application of a magnetic field;
    removing said magnetic field thereby desorbing at least a portion of said gas from said adsorbent into a limited void space of a pressure worthy vessel thereby pressurizing said desorbed gas;
    heating said pressurized gas by directing said pressurized gas into a heat exchanger, said heat exchanger receiving heat from a heat source; and
    driving a turbine generator with said heated and pressurized gas.

2. The method of claim 1, and further comprising adsorbing ambient heat to maintain said pressure worthy vessel isothermal during said desorption.

3. The method of claim 1, and further comprising applying a current to a superconductive electric magnet to generate said magnetic field.

4. The method of claim 1, wherein said magnetic field is permanently associated with a solid material.

5. The method of claim 1, wherein said heat source comprises a geothermal heat source.

6. The method of claim 5, wherein said geothermal heat source imparts heat to the said pressurized desorbed gas using a downhole heat exchanger (DHE).

7. The method of claim 5, wherein said geothermal heat source imparts heat to the said pressurized desorbed gas using an aboveground heat exchanger that is heated by hot water emerging from underground.

8. A method comprising:
    adsorbing a paramagnetic gas and/or magnetic gas on a magnetically susceptible adsorbent thereby forming an adsorbent/adsorbate pair;
    changing a magnetic field applied to said adsorbent/adsorbate pair thereby desorbing at least a portion of said adsorbed gas into a limited void space of a pressure worthy isothermal vessel thereby pressurizing said desorbed gas;
    directing said pressurized gas over a heat source thereby heating said pressurized gas; and
    driving a turbine generator to with said heated and pressurized gas.

9. The method of claim 8, wherein said turbine expels said gas at an exit temperature below or equal to the temperature of the surroundings.

10. The method of claim 8, wherein said heat source derives from solar energy concentrated using concave mirrors to generate high temperature from sun light.

11. The method of claim 8, wherein the desorption or absorption energy applied from said magnetic field is in part given back to the process by the adsorption of heat into said pressure worthy vessel during isothermal desorption.

* * * * *